(12) United States Patent
Silverbrook

(10) Patent No.: US 7,207,654 B2
(45) Date of Patent: Apr. 24, 2007

(54) INK JET WITH NARROW CHAMBER

(75) Inventor: Kia Silverbrook, Balmain (AU)

(73) Assignee: Silverbrook Research Pty Ltd, Balmain, NSW (AU)

( * ) Notice: Subject to any disclaimer, the term of this patent is extended or adjusted under 35 U.S.C. 154(b) by 150 days.

(21) Appl. No.: 10/698,374

(22) Filed: Nov. 3, 2003

(65) Prior Publication Data

US 2004/0090493 A1  May 13, 2004

Related U.S. Application Data

(63) Continuation-in-part of application No. 10/160,273, filed on Jun. 4, 2002, now Pat. No. 6,746,105, which is a continuation of application No. 09/112,767, filed on Jul. 10, 1998, now Pat. No. 6,416,167.

(30) Foreign Application Priority Data

Jul. 15, 1997 (AU) .................................. PO7991
Mar. 25, 1998 (AU) .................................. PP2592

(51) Int. Cl.
 *B41J 2/04* (2006.01)
(52) U.S. Cl. .......................... 347/54; 347/65
(58) Field of Classification Search ................. 347/20, 347/44, 47, 54, 56, 63, 65, 67, 94, 61; 60/527–529; 310/306–307; 337/139–141
See application file for complete search history.

(56) References Cited

U.S. PATENT DOCUMENTS

| | | | |
|---|---|---|---|
| 1,941,001 A | 12/1933 | Hansell | 346/97 |
| 3,373,437 A | 3/1968 | Sweet et al. | 347/74 |
| 3,596,275 A | 7/1971 | Sweet | 347/74 |
| 3,683,212 A | 8/1972 | Zoltan | 310/328 |
| 3,747,120 A | 7/1973 | Stemme | 347/70 |
| 3,946,398 A | 3/1976 | Kyser et al. | 347/78 |
| 4,423,401 A | 12/1983 | Mueller | 337/401 |
| 4,459,601 A | 7/1984 | Howkins | 347/68 |
| 4,490,728 A | 12/1984 | Vaught et al. | 347/60 |
| 4,553,393 A | 11/1985 | Ruoff | 60/527 |
| 4,584,590 A | 4/1986 | Fischbeck et al. | 347/69 |
| 4,672,398 A | 6/1987 | Kuwabara et al. | 347/58 |

(Continued)

FOREIGN PATENT DOCUMENTS

DE  1 648 322  3/1971

(Continued)

OTHER PUBLICATIONS

Noworolski, J. Mark et al, "Process for in-plane and out-of-plane single-crystal-silicon thermal microactuators". Sensors and Actuators, A, CH, Elsevier Sequoia S.A., Lausanne, vol. 55, no. 1, Jul. 15, 1996, pp 65-69, XP004077979 ISSN: 0924-4247. *

(Continued)

*Primary Examiner*—Juanita D. Stephens

(57) ABSTRACT

A nozzle arrangement with an actuator disposed in an ink chamber. An ink inlet supplies ink, and an ink ejection port allows ink to be ejected selectively. The ink inlet is located to refill the ink chamber at a position that is radially displaced from the axis of the ink ejection port.

15 Claims, 42 Drawing Sheets

U.S. PATENT DOCUMENTS

| | | | |
|---|---|---|---|
| 4,737,802 A | 4/1988 | Mielke | 347/54 |
| 4,864,824 A | 9/1989 | Gabriel et al. | 60/528 |
| 4,899,181 A | 2/1990 | Hawkins et al. | 347/63 |
| 5,029,805 A | 7/1991 | Albarda et al. | 251/11 |
| 5,258,774 A | 11/1993 | Rogers | 347/40 |
| 5,666,141 A | 9/1997 | Matoba et al. | |
| 5,719,604 A | 2/1998 | Inui et al. | 347/54 |
| 6,007,187 A * | 12/1999 | Kashino et al. | 347/65 |
| 6,416,167 B1 | 7/2002 | Silverbrook | 347/54 |
| 6,435,667 B1 * | 8/2002 | Silverbrook | 347/54 |

FOREIGN PATENT DOCUMENTS

| | | |
|---|---|---|
| DE | 29 05 063 | 8/1980 |
| DE | 32 45 283 | 6/1984 |
| DE | 34 30 155 | 2/1986 |
| DE | 37 16 996 | 12/1988 |
| DE | 39 34 280 | 4/1990 |
| DE | 43 28 433 | 3/1995 |
| DE | 195 16 997 | 11/1995 |
| DE | 195 17 969 | 11/1995 |
| DE | 195 32 913 | 3/1996 |
| DE | 196 23 620 | 12/1996 |
| DE | 196 39 717 | 4/1997 |
| EP | 0 092 229 | 10/1983 |
| EP | 0 398 031 | 11/1990 |
| EP | 0 427 291 | 5/1991 |
| EP | 0 431 338 | 6/1991 |
| EP | 0 478 956 | 4/1992 |
| EP | 0 506 232 | 9/1992 |
| EP | 0 510 648 | 10/1992 |
| EP | 0 627 314 | 12/1994 |
| EP | 0 634 273 | 1/1995 |
| EP | 0 713 774 | 5/1996 |
| EP | 0 737 580 | 10/1996 |
| EP | 0 750 993 | 1/1997 |
| EP | 0 882 590 | 12/1998 |
| FR | 2 231 076 | 12/1974 |
| GB | 792 145 | 3/1958 |
| GB | 1 428 239 | 3/1976 |
| GB | 2 007 162 | 5/1979 |
| GB | 2 262 152 | 6/1993 |
| JP | 58 112747 | 7/1983 |
| JP | 58 116165 | 7/1983 |
| JP | 61 025849 | 2/1986 |
| JP | 61 268453 | 11/1986 |
| JP | 01 105746 | 4/1989 |
| JP | 01 115639 | 5/1989 |
| JP | 01 128839 | 5/1989 |
| JP | 01 257058 | 10/1989 |
| JP | 01 306254 | 12/1989 |
| JP | 02 050841 | 2/1990 |
| JP | 2-92643 | 4/1990 |
| JP | 2-108544 | 4/1990 |
| JP | 02 158348 | 6/1990 |
| JP | 02 162049 | 6/1990 |
| JP | 2-265752 | 10/1990 |
| JP | 03 65348 | 3/1991 |
| JP | 03065348 | 3/1991 |
| JP | 03 112662 | 5/1991 |
| JP | 03 180350 | 8/1991 |
| JP | 404001051 A | 1/1992 |
| JP | 04 118241 | 4/1992 |
| JP | 04 126255 | 4/1992 |
| JP | 04 141429 | 5/1992 |
| JP | 4-353458 | 12/1992 |
| JP | 04 368851 | 12/1992 |
| JP | 05 284765 | 10/1993 |
| JP | 05284765 A | 10/1993 |
| JP | 05 318724 | 12/1993 |
| JP | 6-91865 | 4/1994 |
| JP | 6-91866 | 4/1994 |
| JP | 07 314665 | 12/1995 |
| WO | WO 94 18010 | 8/1994 |
| WO | WO 97 12689 | 4/1997 |
| WO | WO 99/03681 * | 1/1999 |

OTHER PUBLICATIONS

Ataka, Manabu et al, "Fabrication and Operation of Polymide Bimorph Actuators for Ciliary Motion System". Journal of Microelectromechanical Systems, US, IEEE Inc. New York, vol. 2, no. 4, Dec. 1, 1993, pp 146-150, XP000443412, ISSN: 1057-7157. *

Yamagata, Yutaka et al, "A Micro Mobile Mechanism Using Thermal Expansion and its Theoretical Analysis". Proceedeing of the workshop on micro electro mechanical systems (MEMS), US, New York, IEEE, vol. Workshop 7, Jan. 25, 1994, pp 142-147, XP000528408, ISBN: 0 7803 1834 X. *

* cited by examiner

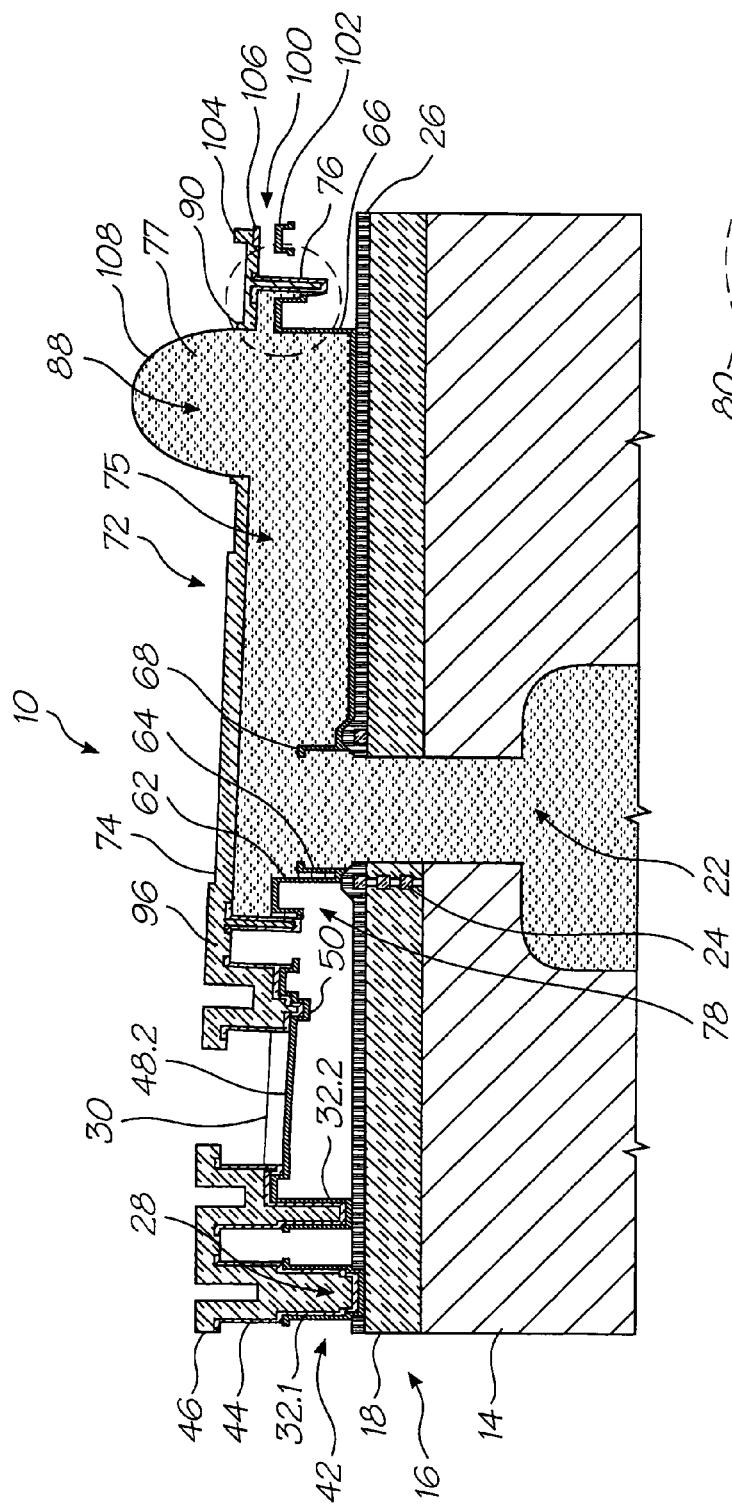
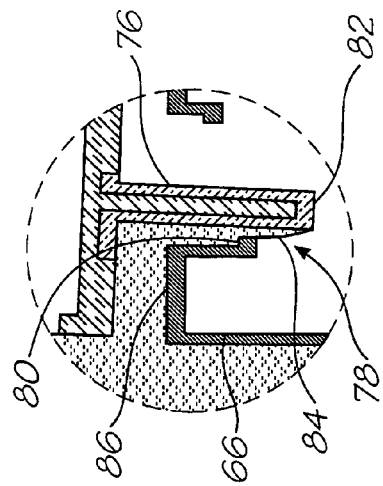
FIG. 3A
FIG. 3B

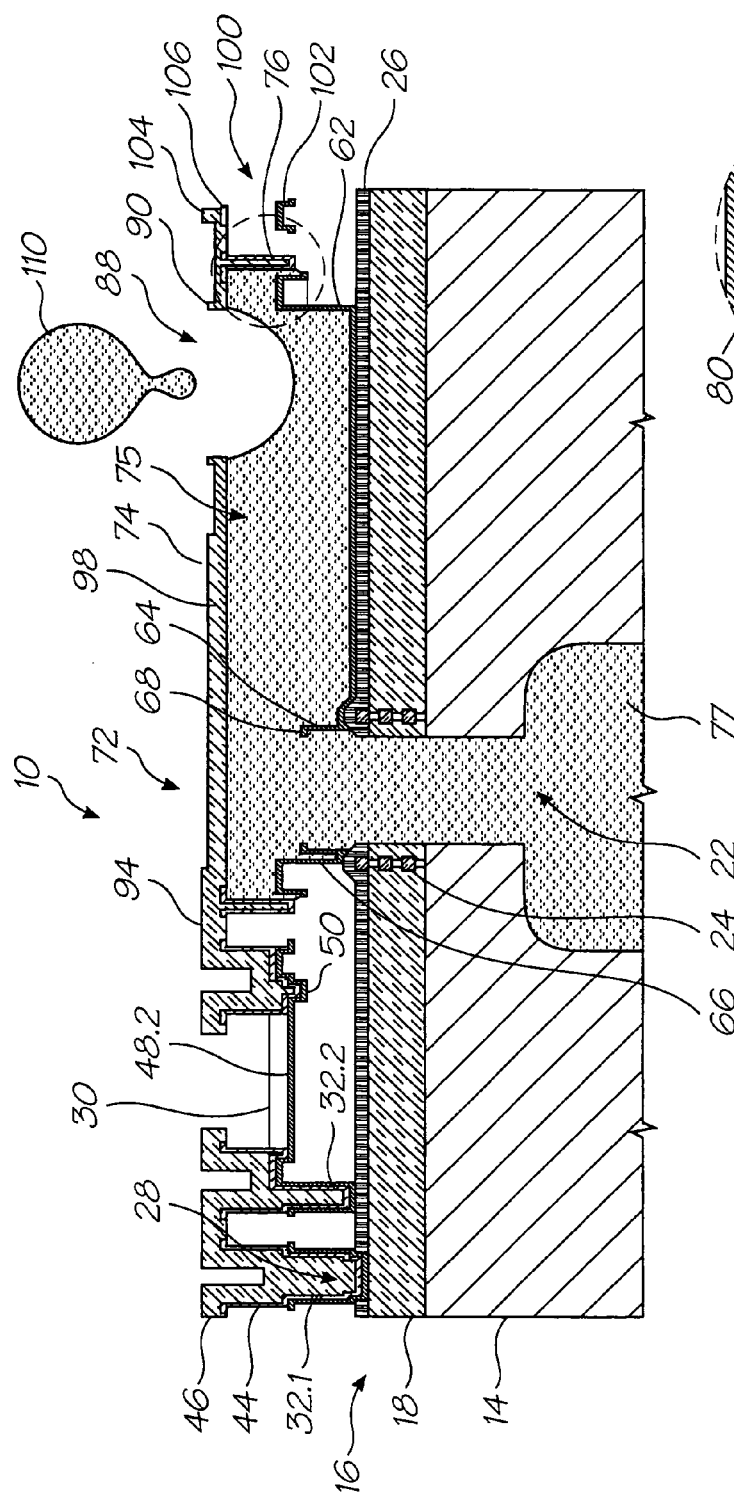
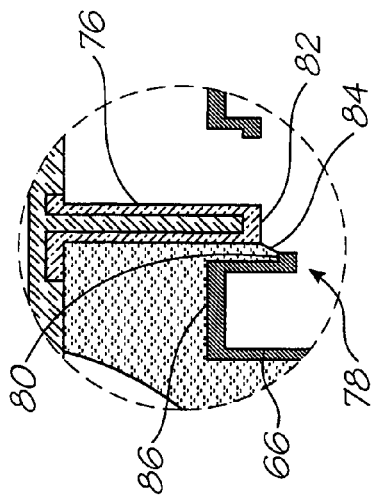
FIG. 5A
FIG. 5B

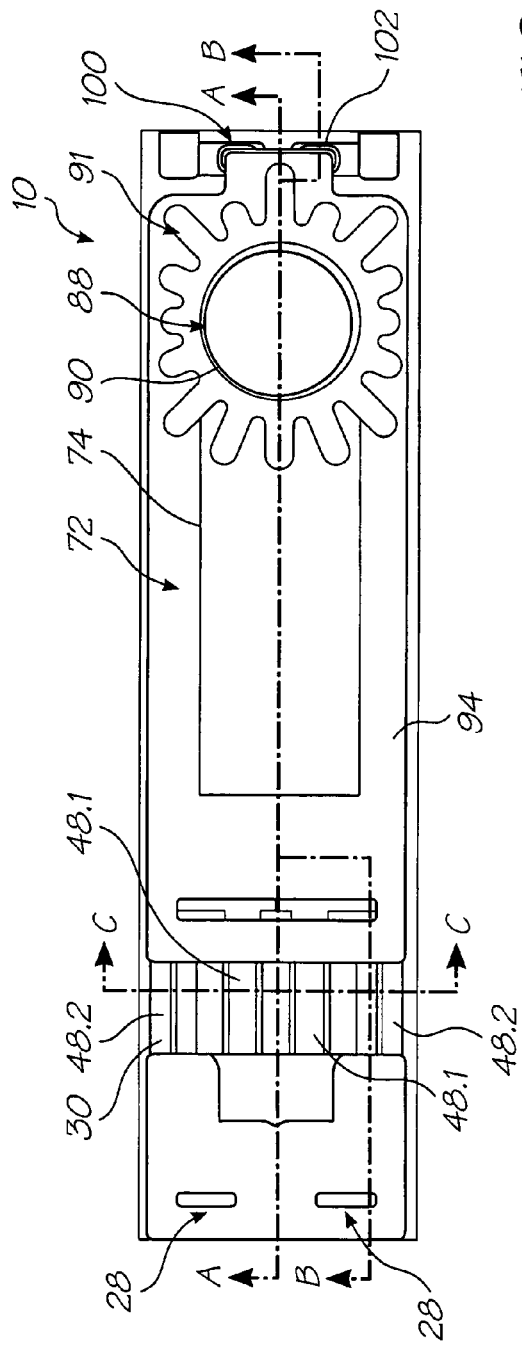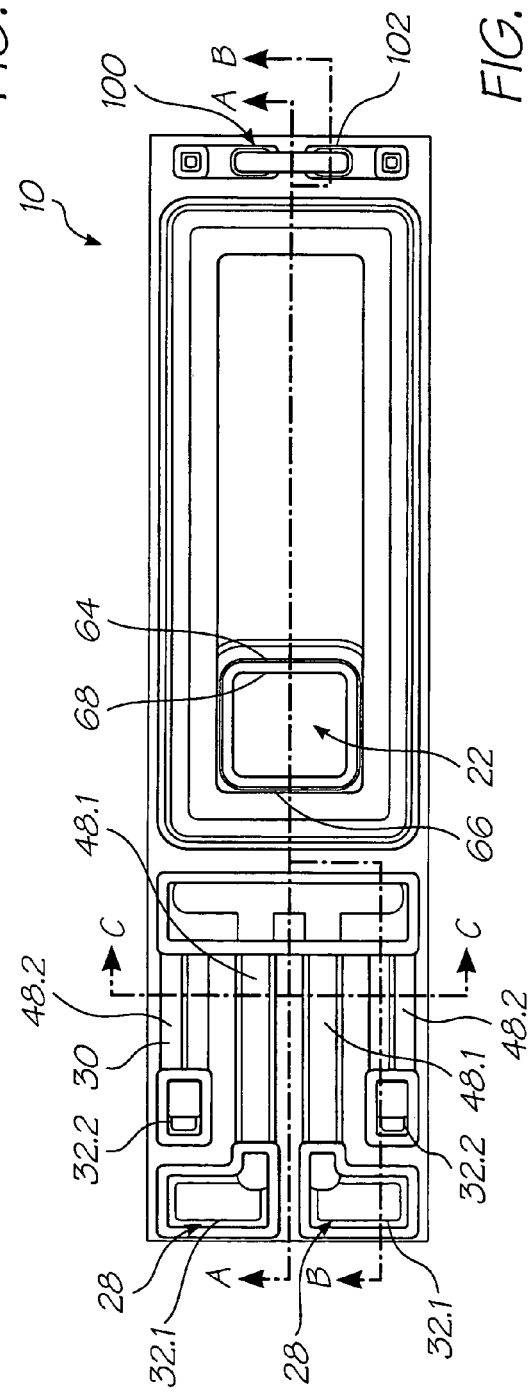

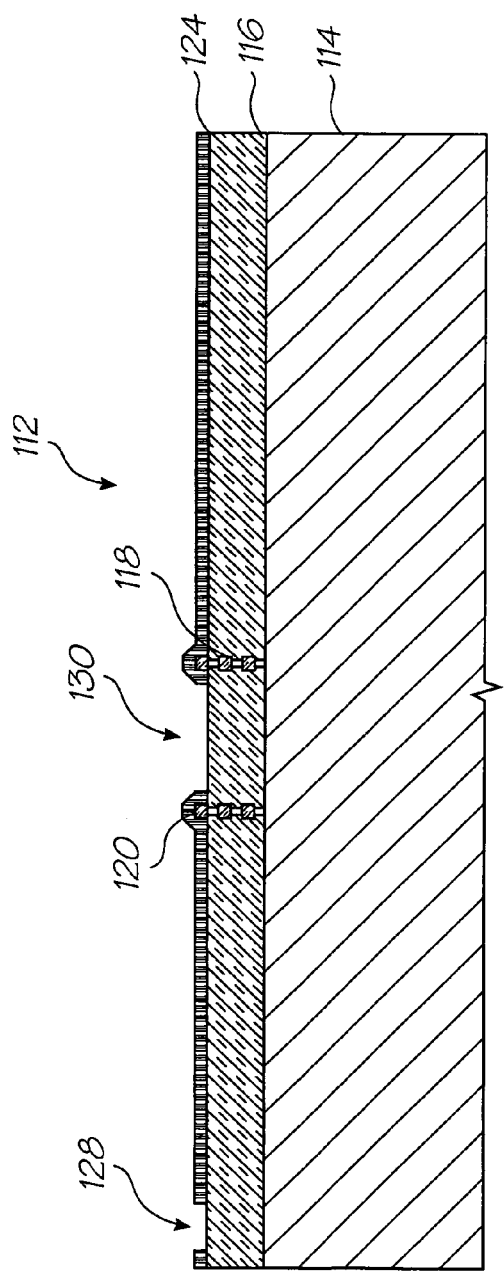
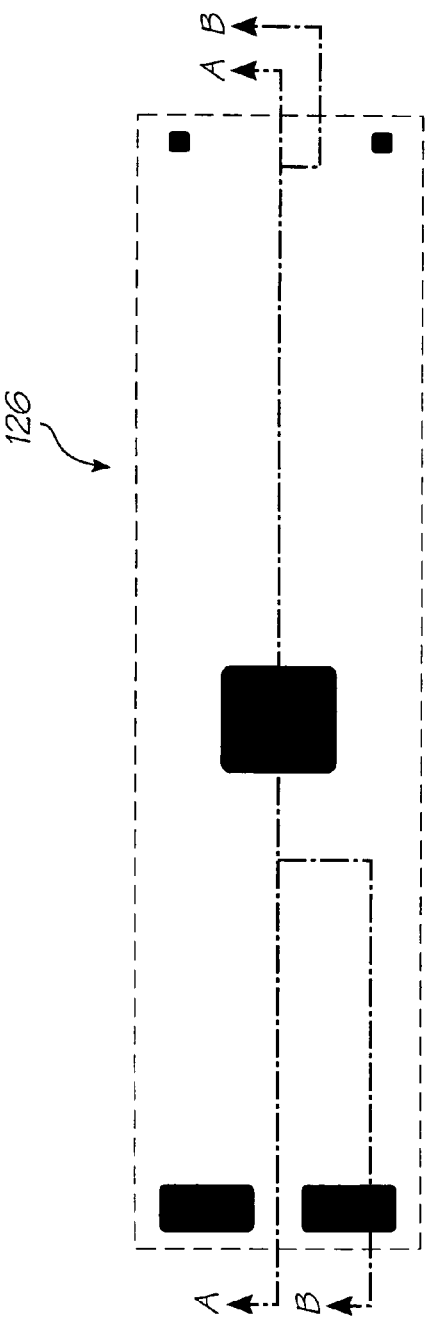

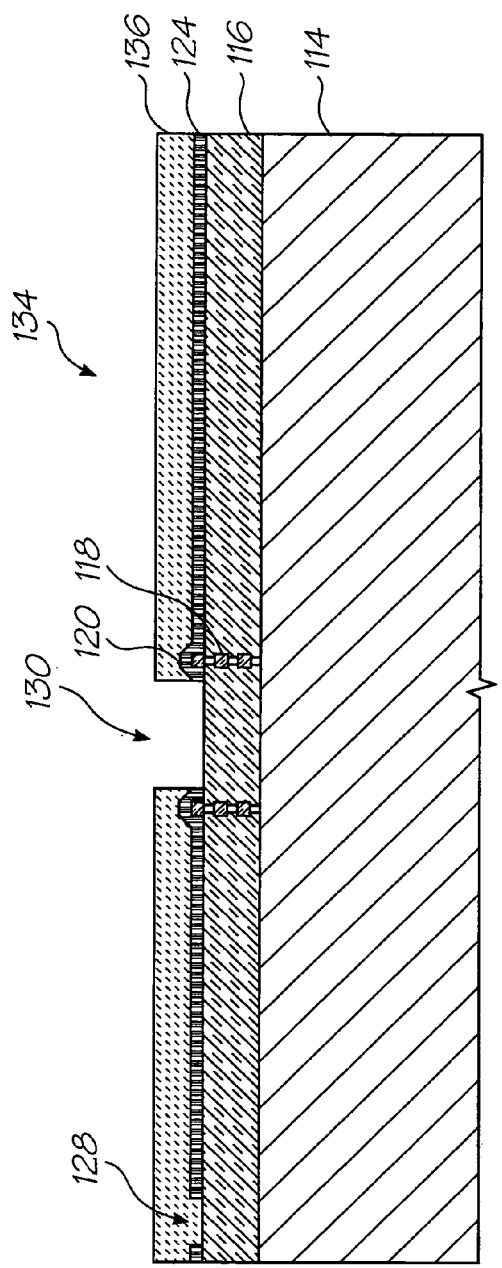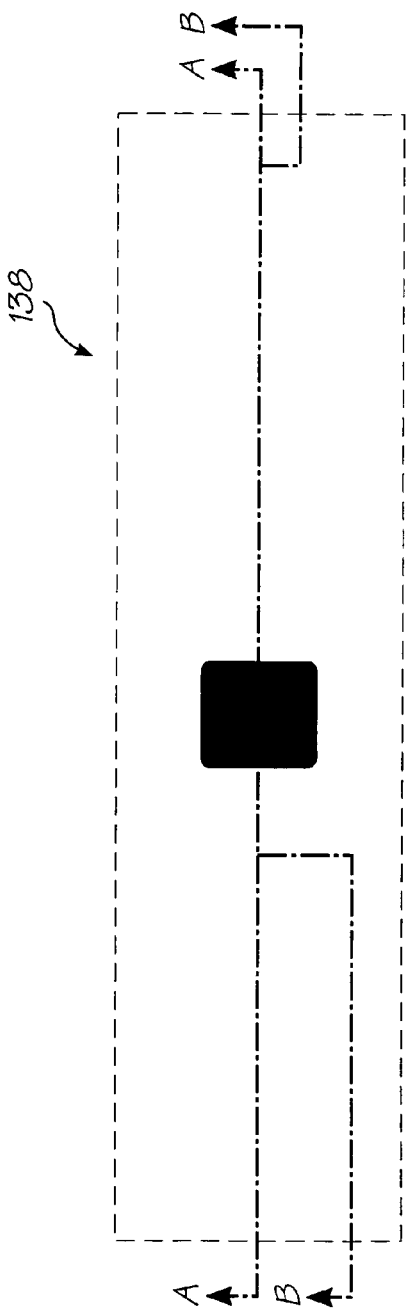
FIG. 13
FIG. 14

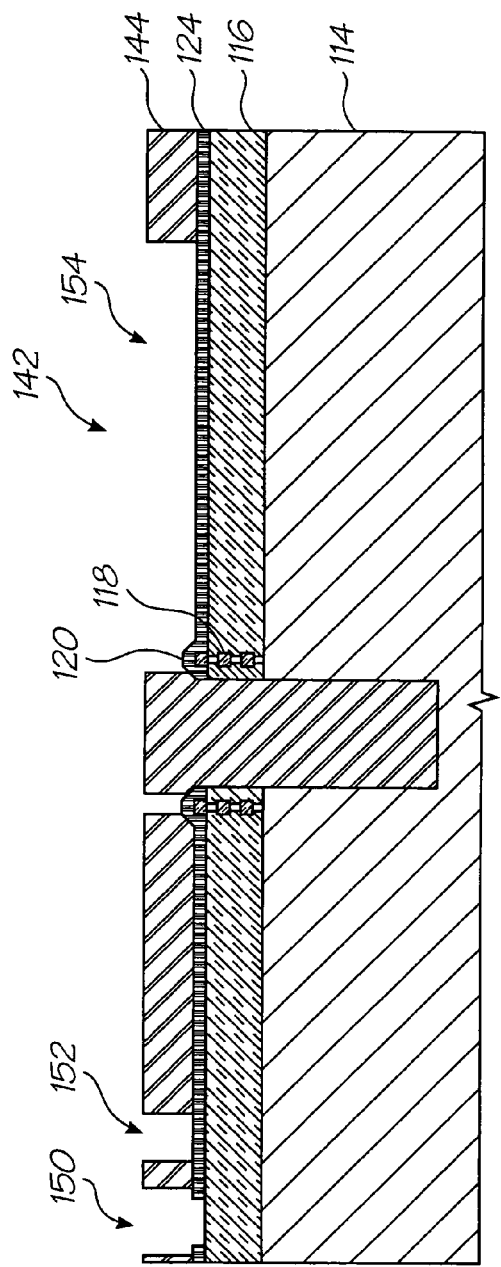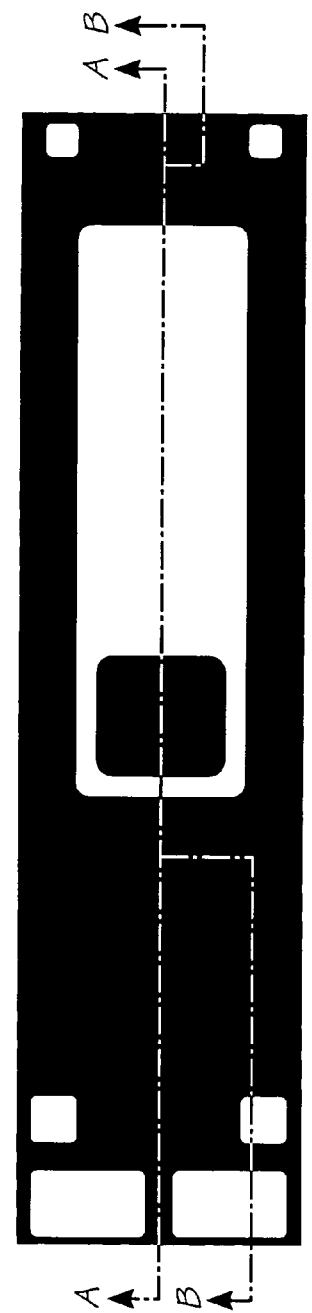

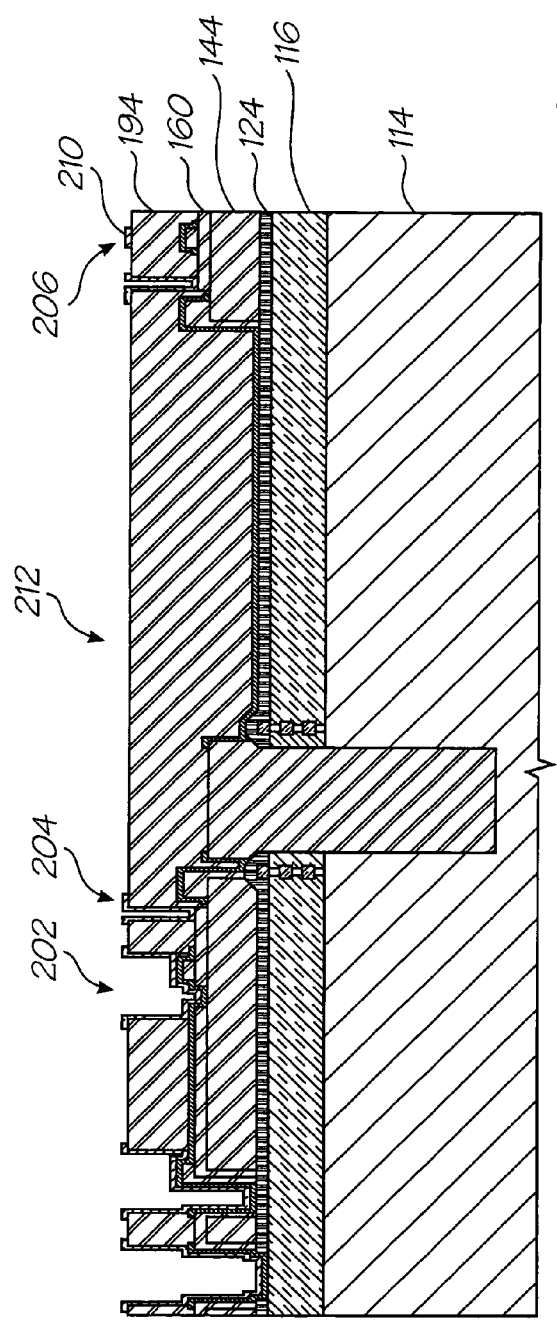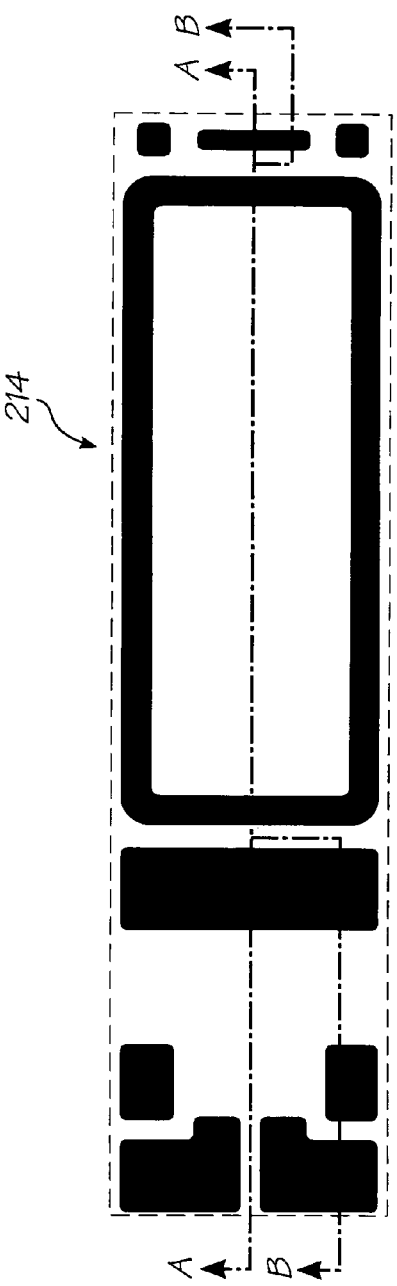

INK JET WITH NARROW CHAMBER

The present application is a continuation-in-part of U.S. application Ser. No. 10/160,273 filed on Jun. 4, 2002, now issued as U.S. Pat. No. 6,746,105, which is a continuation of U.S. application Ser. No. 09/112,767 filed on Jul. 10, 1998, now issued as U.S. Pat. No. 6,416,167.

FIELD OF INVENTION

The present invention relates to a nozzle arrangement for a microelectromechanical system ('MEMS') inkjet printhead.

BACKGROUND OF THE INVENTION

In the MEMS nozzle arrangement described in U.S. Pat. No. 6,243,113 "Image Creation Method and Appartus"(the contents of which are incorporated herein by cross reference), an ink chamber is provided with an ink inlet and an ink ejection port, which are coaxial. The ink ejection port is provided through thermal actuator that incorporates a paddle mounted to a substrate by a passive anchor and an active anchor. The active anchor includes a resistive element that heats up upon application of a current. This heating causes expansion of the active anchor, whilst the passive anchor is sufficiently shielded from the generated heat that it remains the same length. The change in relative lengths of the anchors is amplified by the geometric position of the anchors with respect to each other, such that the paddle can selectively be displaced with respect to the ink chamber by applying a suitable drive current to the active anchor.

Upon actuation, the paddle is urged towards the ink chamber, causing an increase in pressure in the ink in the chamber. This in turn causes ink to bulge out of the ink ejection port. When the drive current is removed, the active anchor quickly cools, which in turn causes the paddle to return to its quiescent position. The inertia of the moving ink bulge causes a thinning and breaking of the ink surface adjacent the ink ejection port, such that a droplet of ink continues moving away from the port as the paddle moves back to its quiescent position. As the quiescent position is reached, surface tension of a concave meniscus across the ink ejection port causes ink to be drawn in to refill the ink chamber via the ink inlet. Once the ink chamber is full, the process can be repeated.

One difficulty with the arrangement described in this nozzle arrangement (and similar systems) is optimising resistance of the ink inlet to ink ingress. If it is too high, then the ink chamber will refill relatively slowly and the rate at which the nozzle can be fired will drop. If the resistance is too low, then the increase in ink pressure within the ink chamber will cause backflow of ink from the chamber to the inlet, thereby hampering ejection efficiency. Two ways in which resistance has been controlled to date is length and diameter of the ink supply inlet.

SUMMARY OF INVENTION

In accordance with the invention, there is provided a nozzle arrangement for an inkjet printhead, the nozzle arrangement including:
(a) a nozzle chamber for holding ink;
(b) an actuator in fluid communication with the nozzle chamber, the actuator being moveable with respect to the nozzle chamber upon actuation;
(c) a fluid ejection port in fluid communication with the nozzle chamber for allowing ejection of ink upon movement of an operative portion of the actuator relative to the nozzle chamber during actuation, the fluid ejection port defining an ejection axis generally perpendicular to a plane within which the fluid ejection port is disposed; and
(d) an inlet channel in fluid communication with the nozzle chamber for supplying ink thereto from an ink supply;
wherein the inlet channel is positioned for supplying ink to refill the nozzle chamber at a position radially displaced from the ejection axis.

Preferably, the inlet channel is orientated such that the ink enters the nozzle chamber along an inlet axis that is substantially parallel to, but displaced from, the ejection axis.

In a preferred form, the fluid ejection port is formed in a roof portion that at least partially defines the nozzle chamber. The nozzle arrangement is configured such that, upon actuation, an operative portion of the actuator is moved relative to the fluid ejection port, causing the ink to be ejected from the fluid ejection port.

In a preferred embodiment, at least part of the operative portion of the actuator defines a roof portion that at least partially defines the nozzle chamber. The fluid ejection port is formed in the roof portion. In this embodiment, the nozzle arrangement is configured such that, upon actuation, the roof portion, and thereby the fluid ejection port, are moved relative to the nozzle chamber, thereby causing the ink to be ejected from the fluid ejection port.

Preferably, the nozzle chamber is refilled with ink via the inlet channel upon return of the actuator to a quiescent position after actuation. More preferably, the nozzle chamber is refilled with ink from the inlet channel due to a reduction in pressure within the nozzle chamber caused by surface tension of a concave ink meniscus across the fluid ejection port after ink ejection.

In a preferred embodiment, the actuator is a thermal actuator. More preferably, the actuator comprises at least one passive anchor and at least one active anchor, wherein the active anchor is resistively heatable by means of an electric current to cause thermal expansion relative to the passive anchor.

Preferably, the actuator is moveable within a plane upon actuation, the plane intersecting and being parallel with the ejection axis. More preferably, the actuator is mounted to flex about an anchor point upon actuation. It is particularly preferred that the inlet channel is located in a plane that is parallel to both the inlet channel axis and the ejection axis and which intersects both axes.

In a preferred embodiment, the nozzle arrangement further includes a raised rib formation disposed on a floor or wall of the nozzle chamber adjacent the inlet channel, for impeding backflow of ink during the actuation. Preferably, the rib formation at least partially encircles the inlet channel. More preferably, the rib formation comprises a collar that encircles the inlet channel. It is particularly preferred in this embodiment that the rib formation comprise a radially inward-extending lip.

Preferably, the actuator is rotatably moved about a pivot region upon actuation and the inlet channel is disposed closer to the pivot region than to the ejection port.

Other preferred aspects, features and embodiments of the invention are described in the detailed description below.

BRIEF DESCRIPTION OF THE DRAWINGS

A preferred embodiment of the invention will now be described, by way of example only, with reference to the accompanying drawings, in which:

FIG. 3A shows a side sectioned view of the nozzle arrangement of FIG. 2.

FIG. 3B shows a side sectioned view of the circled portion of FIG. 3A.

FIG. 5A shows a side sectioned view of the nozzle arrangement of FIG. 4.

FIG. 5B shows a side sectioned view of the circled portion of FIG. 5A.

FIG. 6 shows a plan view of the nozzle arrangement of FIG. 2.

FIG. 7 shows a cut away plan view of the nozzle arrangement of FIG. 2.

FIG. 10 shows a sectioned view through B—B in FIG. 11 of the stage of FIG. 9.

FIG. 11 shows a mask used for patterning the ink passivation (silicon nitride) layer of the CMOS wafer.

FIG. 13 shows a side sectioned view through B—B in FIG. 11 of the stage of FIG. 12.

FIG. 14 shows a mask used for patterning the resist layer of FIG. 12.

FIG. 18 shows a side sectioned view through B—B in FIG. 19 of the stage of FIG. 17.

FIG. 19 shows a mask used for patterning the first sacrificial layer.

FIG. 37 shows a side sectioned view through B—B of FIG. 38 of the stage of FIG. 36.

FIG. 38 shows a mask used for the selective etching of the second conductive layer.

DETAILED DESCRIPTION OF THE PREFERRED EMBODIMENT

Figure 1:
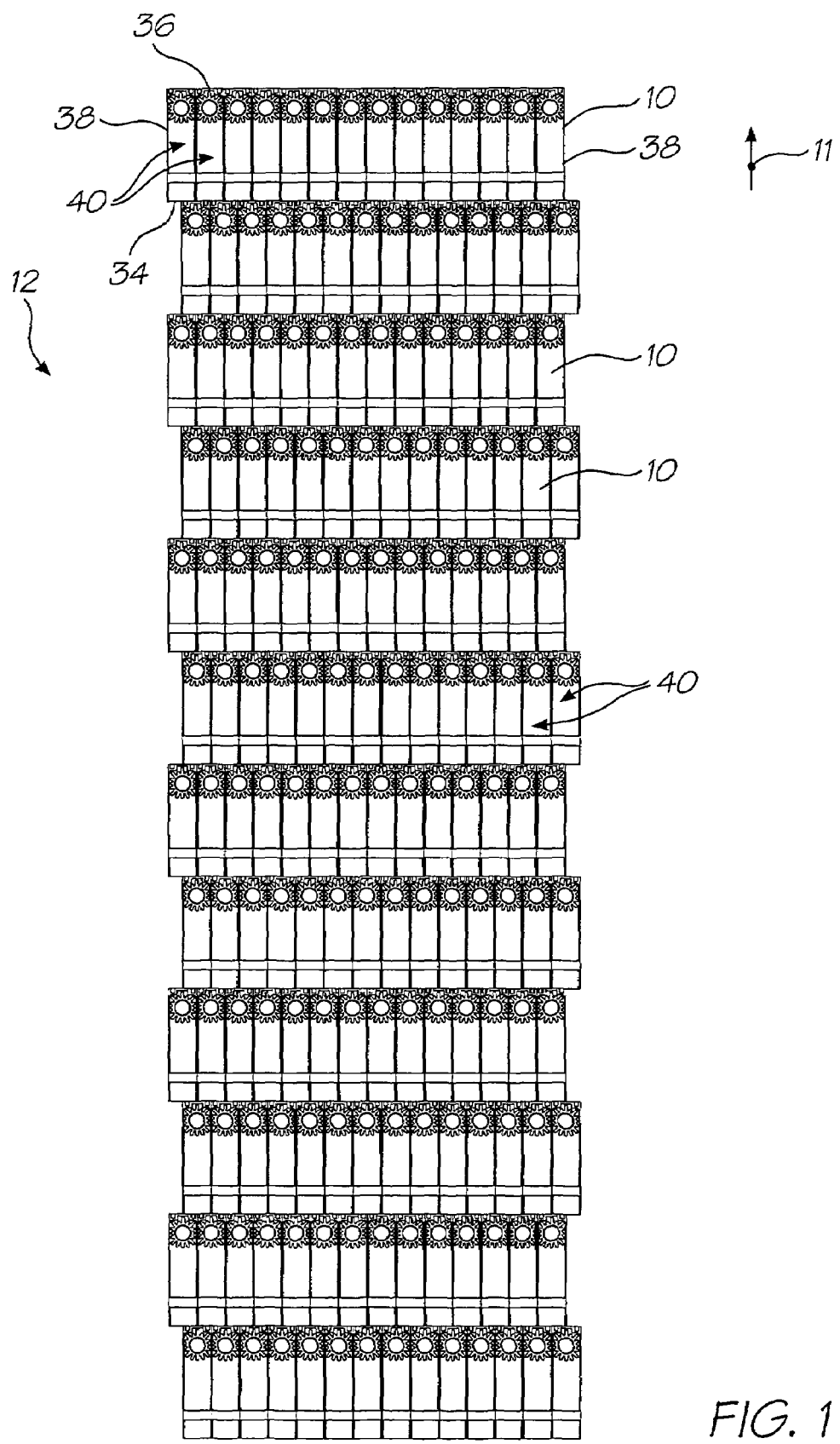
FIG. 1 shows a plan view of an inkjet printhead chip incorporating nozzle arrangements, the nozzle arrangements being in accordance with the invention.
Figure 2:
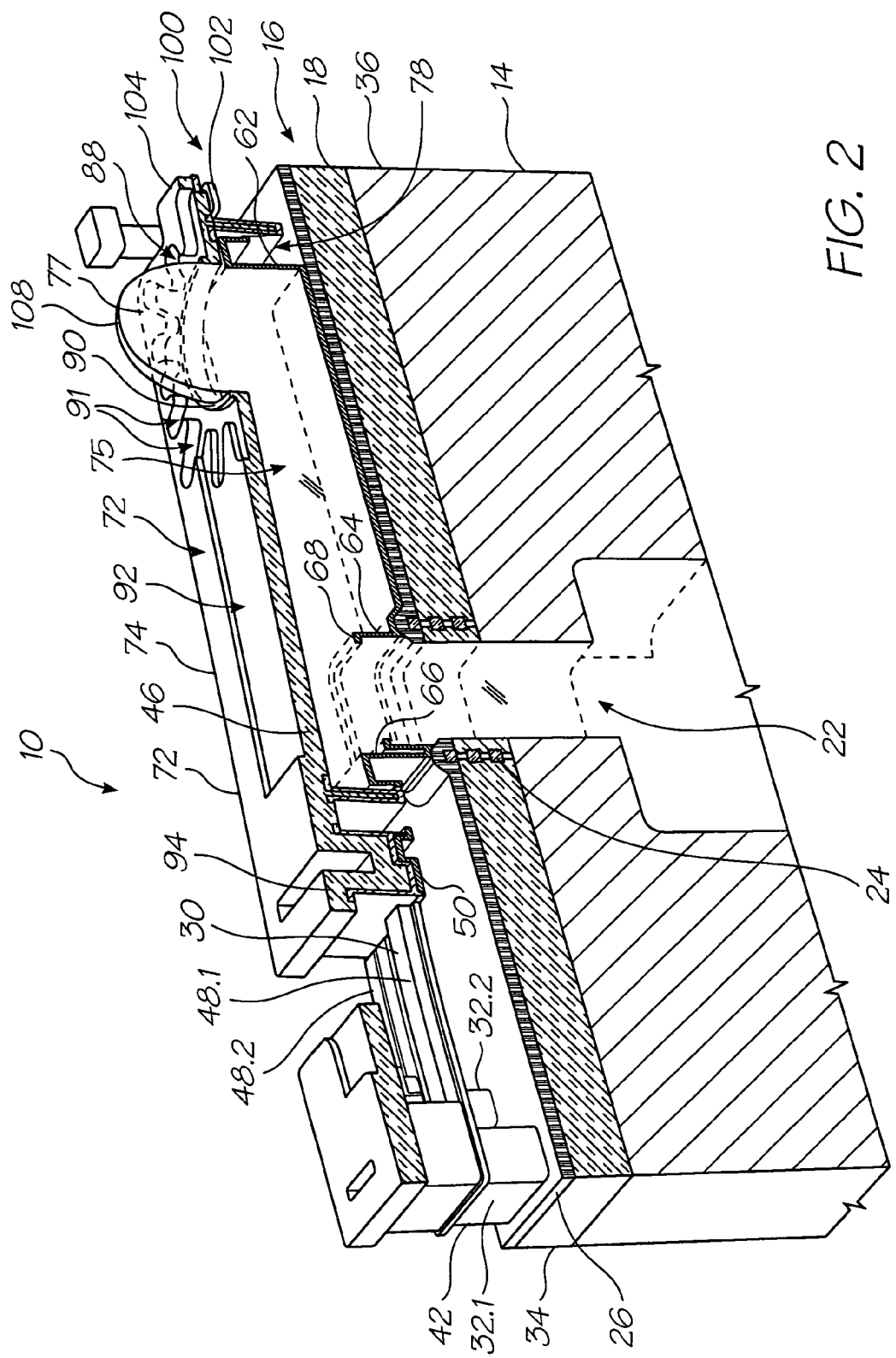
FIG. 2 shows a three-dimensional sectioned view of one nozzle arrangement of the inkjet printhead chip in an operative condition.
Figure 4:
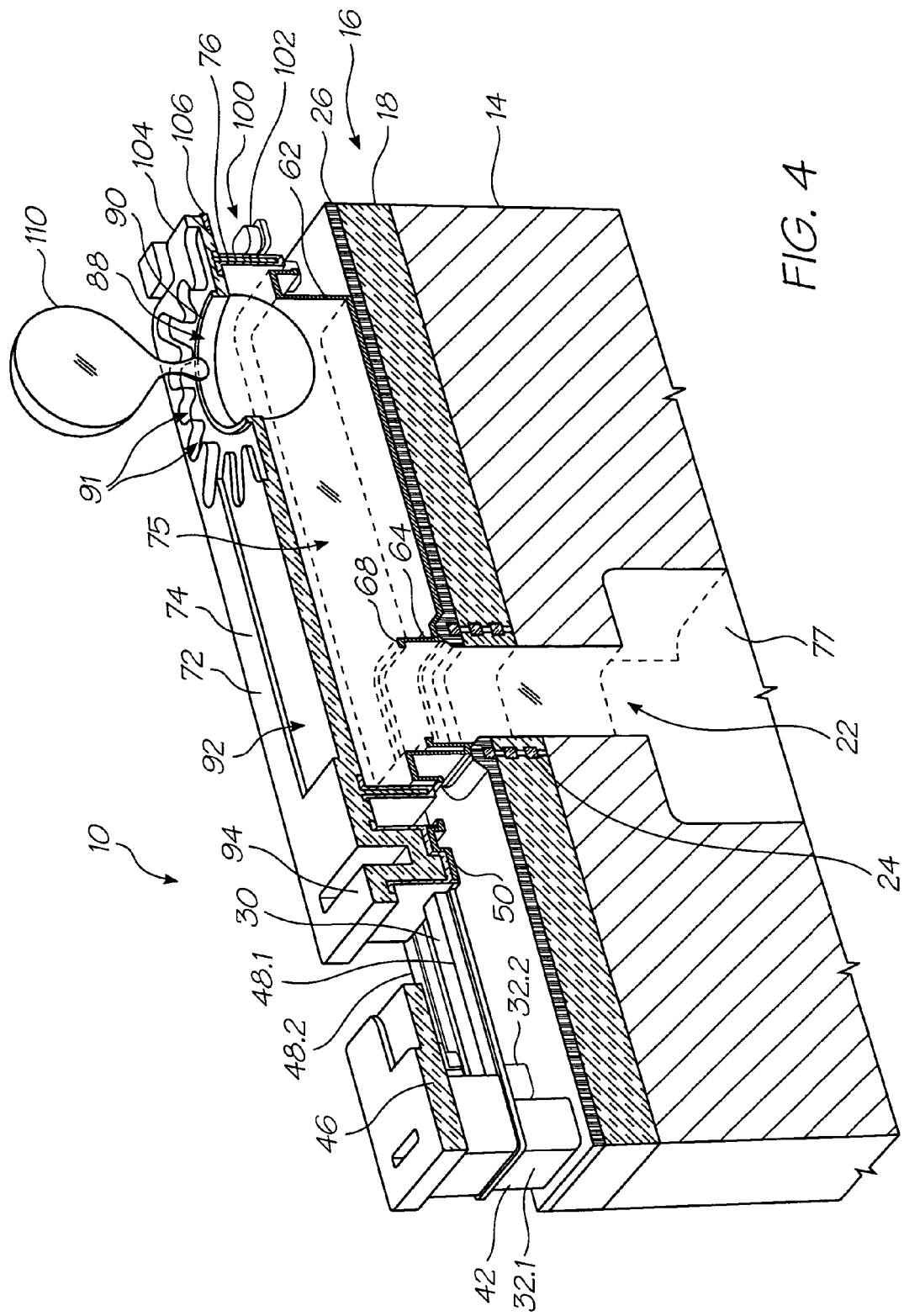
FIG. 4 shows a three-dimensional sectioned view of the nozzle arrangement of FIG. 2 in a post-ejection quiescent condition.

In FIGS. 1 to 7, reference numeral 10 generally indicates a nozzle arrangement for an ink-jet printhead chip 12, part of which is shown in FIG. 1.

The nozzle arrangement 10 is the product of an integrated circuit fabrication technique. In particular, the nozzle arrangement 10 defines a micro-electromechanical system (MEMS).

In this description, only one nozzle arrangement 10 is described. This is simply for clarity and ease of description. A printhead having one or more printhead chips 12 can incorporate up to 84000 nozzle arrangements 10. Further, as is clear from FIG. 1, the printhead chip 12 is a multiple replication of the nozzle arrangement 10. It follows that the following detailed description of the nozzle arrangement 10 adequately describes the printhead chip 12.

The inkjet printhead chip 12 includes a silicon wafer substrate 14. 0.35 Micron 1 P4M 12 volt CMOS microprocessing circuitry is positioned on the silicon wafer substrate 14. The circuitry is shown as a drive circuitry layer 16.

A silicon dioxide or glass layer 18 is positioned on the wafer substrate 14. The layer 18 defines CMOS dielectric layers. CMOS top-level metal defines a pair of aligned aluminum electrode contact layers (not shown) positioned on the silicon dioxide layer 18. Both the silicon wafer substrate 14 and the silicon dioxide layer 18 are etched to define an ink inlet channel 22 having a circular cross section. A diffusion barrier 24 of CMOS metal 1, CMOS metal 2/3 and CMOS top level metal is positioned in the silicon dioxide layer 18 about the ink inlet channel 22. The diffusion barrier 24 serves to inhibit hydroxyl ions from diffusing through CMOS oxide layers of the drive circuitry layer 16.

A portion of the diffusion barrier 24 extends from the silicon dioxide layer 18. An ink passivation layer in the form of a layer of silicon nitride 26 is positioned over the aluminum contact layers and the silicon dioxide layer 18, as well as the diffusion barrier 24. Each portion of the layer 26 positioned over the contact layers has an opening 28 defined therein to provide access to the drive circuitry layer 16.

Each nozzle arrangement 10 has a rectangular, elongate configuration as shown in the drawings. FIG. 1 shows the manner in which the nozzle arrangements 10 are positioned. Each nozzle arrangement uses an area 40 of the wafer substrate 14 that has a first end 34, a second end 36 and a pair of opposed sides 38.

The printhead chip 12 is configured to generate text and images having a resolution of 1200 dpi (dots per inch). Furthermore, as can be seen in FIG. 1, the nozzle arrangements 10 are arranged in an aligned, side-by-side manner in each row so that the ink ejection ports 88 extend rectilinearly along a length of the substrate 14. It follows that a distance between consecutive ink ejection ports 88 is approximately 21 microns. It can therefore be deduced that a width of each nozzle arrangement 10 is also approximately 21 microns or slightly less, since clearance between consecutive nozzle arrangements 10 should be taken into account. A length of each nozzle arrangement 10 is approximately 84 microns. It follows that, for a column of ink dots on a print medium moving in the direction of an arrow 11 shown in FIG. 1, 1770 microns square of chip real estate is required.

A thermal actuator 30 is electrically connected to both the contact layers at the openings 28, proximate the first end 34 of the area 40. The thermal actuator 30 is of titanium aluminum nitride. Further, the thermal actuator 30 has four anchor portions 32 that extend from the silicon nitride layer 26 to a predetermined point spaced from the silicon nitride layer 26. The anchor portions 32 define a pair of spaced active anchor portions 32.1 and a pair of spaced passive anchor portions 32.2. The active anchor portions 32.1 are aligned across the area 40. The passive anchor portions 32.2 are also aligned across the area 40. The passive anchor portions 32.2 are positioned inwardly, lengthwise, of the active anchor portions 32.1.

Each of the active anchor portions 32.1 is positioned at respective openings 28. Further, each active anchor portion 32.1 is electrically connected to the drive circuitry layer 16 to define vias 42. Each via 34 includes a titanium layer 44 and the active anchor portion 32.1 sandwiched between a layer 46 of dielectric material in the form of low temperature silicon nitride and the drive circuitry layer 16.

Each of the passive anchor portions 32.2 is retained in position by being sandwiched between the layer 46 of low temperature silicon nitride and the silicon nitride layer 26. Generally, the structure of the active anchor portions 32.1 and the vias 34 are similar to the structure of the layer 46 in combination with the passive anchor portions 32.2. However, the absence of the openings 28 at the passive anchor portions 32.2 ensures that electrical contact between the thermal actuator 30 and the drive circuitry layer 16 is not made. This is enhanced by the fact that silicon nitride is a dielectric material.

Figure 8:
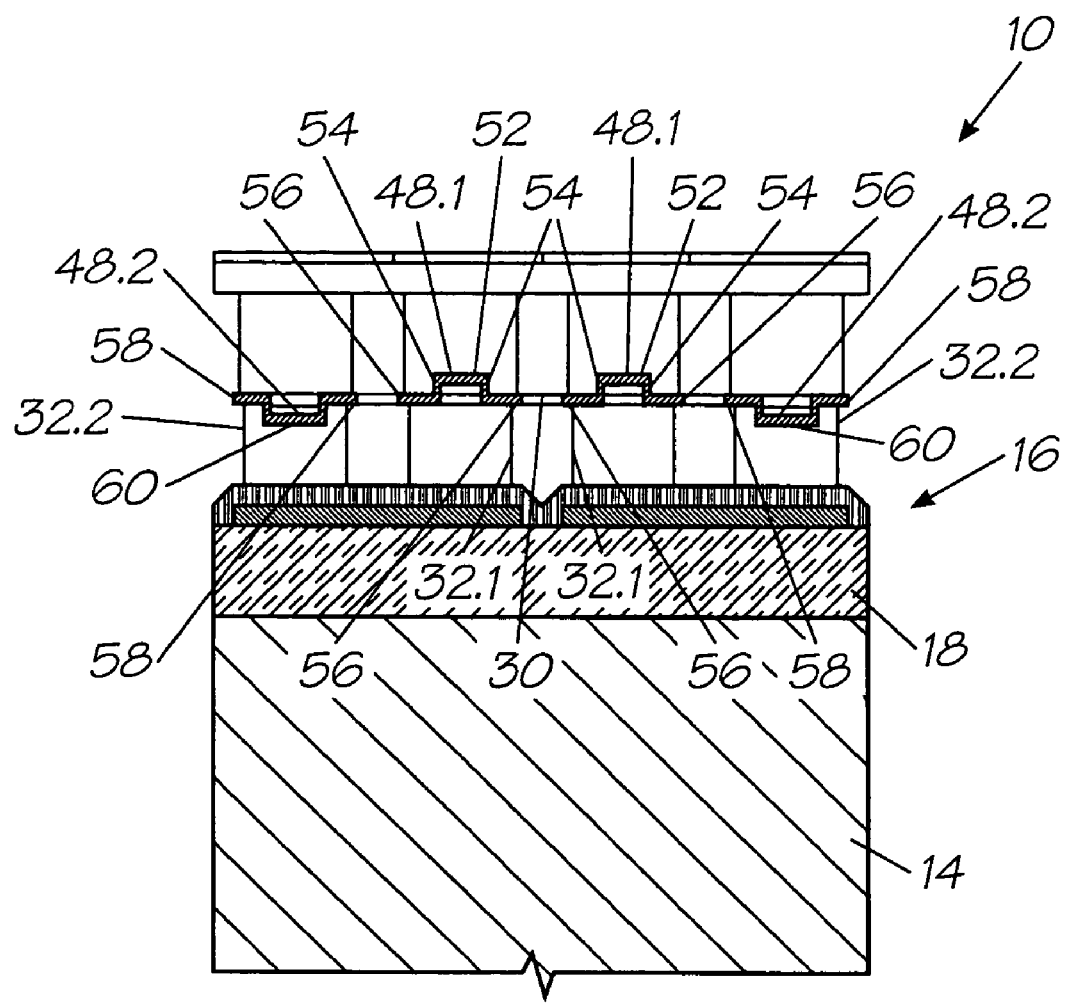
FIG. 8 shows a sectioned view through C—C in FIG. 6 of the nozzle arrangement of FIG. 2.

Details of the thermal actuator 30 are shown in FIGS. 6 to 8. The thermal actuator 30 includes a pair of inner actuator arms 48.1 and a pair of outer actuator arms 48.2. Each inner actuator arm 48.1 is connected to a free end of a respective active anchor portion 32.1. Similarly, each outer actuator arm 48.2 is connected to a free end of a respective passive anchor portion 32.2. The actuator arms 48 extend from the anchor portions 32 in a plane that is generally parallel to a plane of the wafer substrate 14, towards a longitudinal axis of the ink inlet channel 22. The actuator arms 48 terminate at a common bridge portion 50.

Each inner actuator arm 48.1 includes a central planar section 52 that is positioned in a plane parallel to that of the wafer substrate 14. A pair of opposed intermediate planar sections 54 are connected to respective sides of the central section 52 to extend towards the wafer substrate 14. A pair of opposed, outer planar sections 56 extend from each of the intermediate sections 54, parallel to the wafer substrate 14, at a position intermediate the central section 52 and the wafer substrate 14.

Each of the outer actuator arms 48.2 has a similar configuration that is simply an inverse of the configuration of the inner actuator arms 48.1. It follows that outer planar sections 58 of each outer actuator arm 48.2 are co-planar with the outer sections 56 of the inner actuator arms 48.1. A central planar section 60 of each outer actuator arm 48.2 is positioned intermediate the outer planar sections 58 and the wafer substrate 14.

The arms 48 and the bridge portion 50 are configured so that, when a predetermined electrical current is applied to the inner actuator arms 48.1 the inner actuator arms 48.1 are heated to the substantial exclusion of the outer actuator arms 48.2. This heating results in an expansion of the inner actuator arms 48.1, also to the exclusion of the outer actuator arms 48.2. As a result, a differential expansion is set up in the actuator arms 48. The differential expansion results in the actuator arms 48 bending towards the layer 26 of silicon nitride.

A nozzle chamber wall 62 of titanium aluminum nitride is positioned on that portion of the layer 26 of silicon nitride that is positioned over the diffusion barrier 24. The nozzle chamber wall 62 has an inner wall portion 64 and an outer wall portion 66. The inner wall portion 64 defines part of the ink inlet channel 22. A radially inwardly directed ledge 68 is positioned on the inner wall portion 64.

The outer wall portion 66 is spaced from the inner wall portion 64 and extends past the inner wall portion 64 away from the wafer substrate 14.

The nozzle arrangement 10 includes a roof structure 72. The roof structure 72 has a roof member 74 that is positioned above the nozzle chamber wall 62. A complementary nozzle chamber wall 76 depends from the roof member 74 towards the wafer substrate 14. The complementary nozzle chamber wall 76 overlaps the outer wall portion 66.

As can be seen in the drawings, the nozzle chamber wall 62 and the complementary nozzle chamber wall 76 together define a nozzle chamber 75. The nozzle chamber 75 and the ink inlet channel 22 are in fluid communication to be filled with ink 77, in use.

The outer wall portion 66 and the complementary nozzle chamber wall 76 define an ink sealing structure 78. In particular, the outer wall portion 66 includes a radially extending rim 80. The complementary nozzle chamber wall 76 is configured so that, when the nozzle arrangement 10 is in a quiescent condition, a free edge 82 of the complementary nozzle chamber wall 76 is generally aligned with the rim 80 and spaced from the rim 80.

When the nozzle chamber 75 is filled with the ink 77, an ink meniscus 84 forms between the free edge 82 and the rim 80. As can be seen in the drawings, the outer wall portion 66 includes a re-entrant section 86, the rim 80 depending from the re-entrant section 86.

As can be seen in FIG. 5B, when the nozzle arrangement 10 is in a quiescent condition, the meniscus 84 extends from the free edge 82 to an outer edge of the rim 80. As can be seen in FIG. 3B, when the nozzle arrangement 10 is in an initial stage of operation, the meniscus 84 extends from the free edge 82 to an inner edge of the rim 80. The re-entrant section 86 inhibits an inner edge of the meniscus 84 from moving further than the inner edge of the rim 80. Thus, wetting of a remaining portion of the outer wall portion 66 and subsequent leaking of ink is inhibited.

It follows that when the nozzle chamber 75 is filled with the ink 77, the sealing structure 78 defines a fluidic seal.

An ink ejection port 88 is defined in the roof member 74. A nozzle rim 90 bounds the ink ejection port 88. A plurality of radially extending recesses 91 is defined in the roof member 74 about the rim 90. These serve to contain radial ink flow as a result of ink escaping past the nozzle rim 90. A rectangular recess 92 is defined in the roof member 74 in communication with the recesses 91.

The roof structure 72 includes a mounting formation 94 that is positioned on the bridge portion 50 of the thermal actuator 30. The mounting formation 94 includes a layer 96 of titanium in contact with the bridge portion 50. Instead of titanium, any other inert metal, such as tantalum, would be suitable. A layer 98 of silicon nitride is positioned on the layer 96 of titanium and extends away from the mounting formation 94 to define the roof member 74. The ink sealing structure 78 is also of titanium.

The nozzle arrangement 10 includes a test switch arrangement 100. The test switch arrangement 100 includes a pair of titanium aluminum nitride contacts 102 that is connected to test circuitry (not shown) and is positioned at a predetermined distance from the wafer substrate 14. The roof structure 72 includes an extended portion 104 that is opposed to the mounting formation 94 with respect to the roof member 74. A titanium bridging member 106 is positioned on the extended portion 104 so that, when the roof structure 72 is displaced to a maximum extent towards the wafer substrate 14, the titanium bridging member 106 abuts the contacts 102 to close the test switch arrangement 100. Thus, operation of the nozzle arrangement 100 can be tested.

In use, a suitable voltage, typically 3V to 12V depending on the resistivity of the TiAlNi and the characteristics of the drive circuitry is set up between the active anchor portions 32.1. This results in a current being generated in the inner actuator arms 48.1 and a central portion of the bridge portion 50. The voltage and the configuration of the inner actuator arms 48.1 are such that the current results in the inner actuator arms 48.1 heating. As a result of this heat, the titanium aluminum nitride of the inner actuator arms 48.1 expands to a greater extent than the titanium aluminum nitride of the outer actuator arms 48.2. This results in the actuator arms 48 bending as shown in FIG. 3A. Thus, the roof structure 72 tilts towards the wafer substrate 14 so that a portion 108 of the ink 77 is ejected from the ink ejection port 88.

A voltage cut-off results in a rapid cooling of the inner actuator arms 48.1. The actuator arms 48.1 subsequently contract causing the actuator arms 48.1 to straighten. The roof structure 72 returns to an original condition as shown in FIG. 5. This return of the roof structure 72 results in the required separation of a drop 110 of the ink 77 from a remainder of the ink 77 within the nozzle chamber 75.

The walls 62, 76 are dimensioned so that a length of the nozzle chamber 75 is between approximately 4 and 10 times a height of the nozzle chamber 75. More particularly, the length of the nozzle chamber 75 is approximately seven times a height of the nozzle chamber 75. It is to be understood that the relationship between the length of the nozzle chamber 75 and the height of the nozzle chamber 75 can vary substantially while still being effective for the purposes of this invention.

A difficulty to overcome in achieving the required ink ejection pressure was identified by the Applicant as being backflow towards the ink inlet channel 22 along the ink flow path. In order to address this problem, a length of the nozzle chamber 75 is between 3 and 10 times a height of the nozzle chamber 75, as described above. Thus, while the roof member 74 is displaced towards the substrate 14, viscous drag within the nozzle chamber 75 retards backflow of ink towards the ink inlet channel 22, since the ink inlet channel 22 and the ink ejection port 88 are positioned at opposite ends of the nozzle chamber 75. The fact that the inner wall portion 64 extends towards the roof member 74 also serves to inhibit backflow.

There is also a requirement that the nozzle chamber 75 be refilled with ink sufficiently rapidly so that a further ink drop can be ejected. It follows that, with such factors as ink viscosity and structural materials taken as constant, the optimal relationship between the length of the nozzle chamber 75 and the height of the nozzle chamber 75 is a function of the required ink ejection pressure and a required maximum refill time. Thus, once these factors are known, it is possible to determine an optimum relationship between the nozzle chamber length and the nozzle chamber height.

The printhead chip 12 incorporates a plurality of nozzle arrangements 10 as shown in FIG. 1. It follows that, by connecting the nozzle arrangements 10 to suitable micro processing circuitry and a suitable control system, printing can be achieved. A detail of the manner in which the nozzle arrangements 10 are connected to such components is described in the above referenced patents/patent applications and is therefore not set out in any detail in this specification. It is to be noted, however, that the inkjet printhead chip 12 is suitable for connection to any micro processing apparatus that is capable of controlling, in a desired manner, a plurality of nozzle arrangements. In particular, since the nozzle arrangements 10 span the print medium, the nozzle arrangements 10 can be controlled in a digital manner. For example, a 1 can be assigned to an active nozzle arrangement 10 while a 0 can be assigned to a quiescent nozzle arrangement 10, in a dynamic manner.

In the following paragraphs, the manner of fabrication of the nozzle arrangement 10 is described, by way of example only. It will be appreciated that the following description is for purposes of enablement only and is not intended to limit the broad scope of the preceding summary or the invention as defined in the appended claims.

Figure 9:
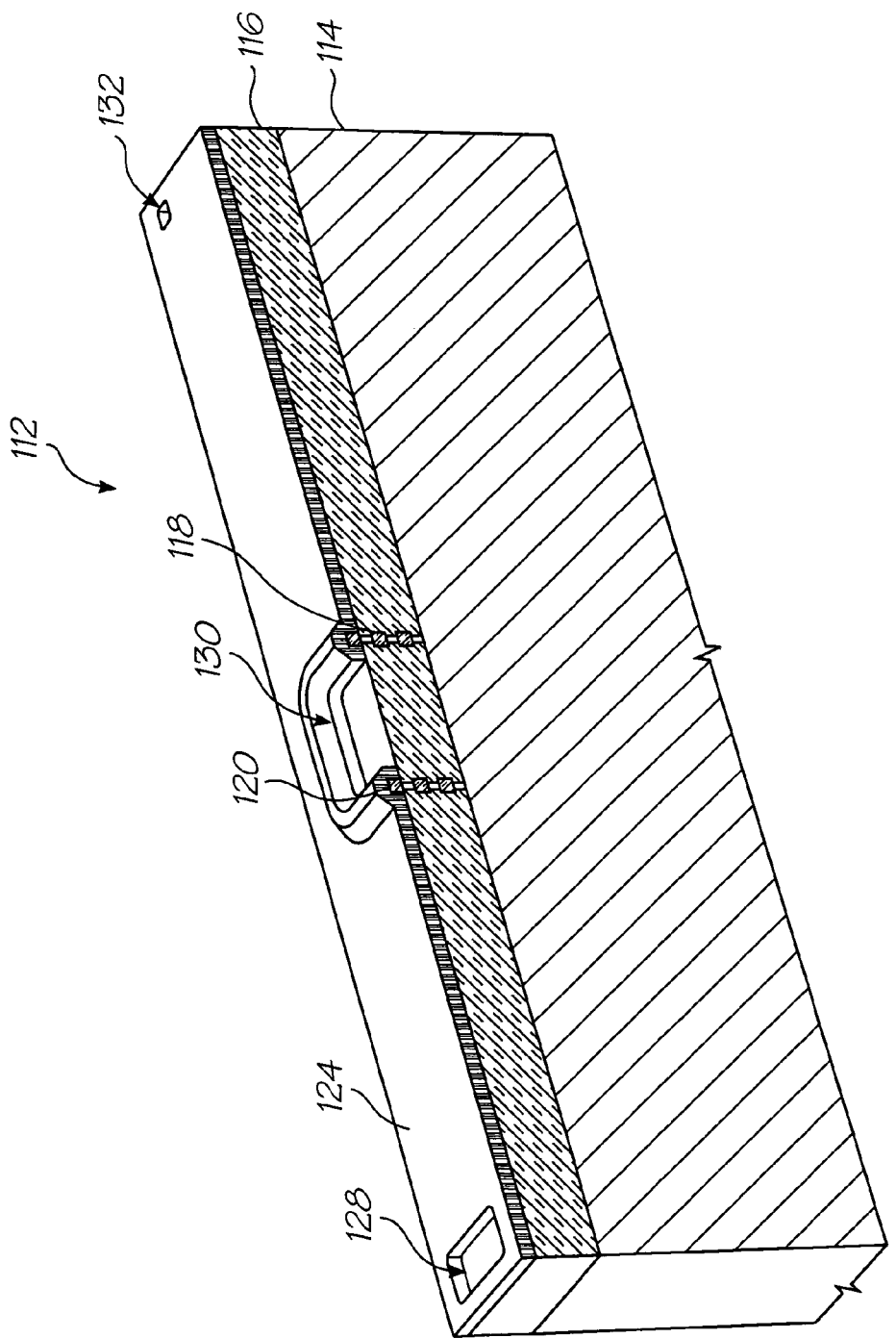
FIG. 9 shows a three-dimensional sectioned view through A—A in FIG. 11 of a wafer substrate, a drive circuitry layer and an ink passivation layer for a starting stage in the fabrication of each nozzle arrangement of the printhead chip.

In FIGS. 9 and 10, reference numeral 112 generally indicates a complete 0.35 micron 1P4M 12 Volt CMOS wafer that is the starting stage for the fabrication of the nozzle arrangement 10. It is again emphasized that the following description of the fabrication of a single nozzle arrangement 10 is simply for the purposes of convenience. It will be appreciated that the processing techniques and the masks used are configured to carry out the fabrication process, as described below, on a plurality of such nozzle arrangements. However, for the purposes of convenience and ease of description, the fabrication of a single nozzle arrangement 10 is described. Thus, by simply extrapolating the following description, a description of the fabrication process for the inkjet printhead chip 12 can be obtained.

The CMOS wafer 112 includes a silicon wafer substrate 114. A layer 116 of silicon dioxide is positioned on the wafer substrate 114 to form CMOS dielectric layers. Successive portions of CMOS metal 1, CMOS metal 2/3 and CMOS top level metal define an aluminum diffusion barrier 118. The diffusion barrier 118 is positioned in the layer 116 of silicon dioxide with a portion 120 of the barrier 118 extending from the layer 116. The barrier 118 serves to inhibit hydroxyl ions from diffusing through oxide layers of the layer 116. The CMOS top level metal defines a pair of aluminum electrode contact layers (not shown) positioned on the layer 116.

A layer 124 of CMOS passivation material in the form of silicon nitride is positioned over the layer 116 of silicon dioxide and the portion 120 of the diffusion barrier 118. The silicon nitride layer 124 is deposited and subsequently patterned with a mask 126 in FIG. 11. The silicon nitride layer 124 is the result of the deposition of a resist on the silicon nitride, imaging with the mask 126 and subsequent etching to define a pair of contact openings 128, an opening 130 for an ink inlet channel to be formed and test switch openings 132.

The silicon dioxide layer 116 has a thickness of approximately 5 microns. The layer 124 of silicon nitride has a thickness of approximately 1 micron.

Figure 12:
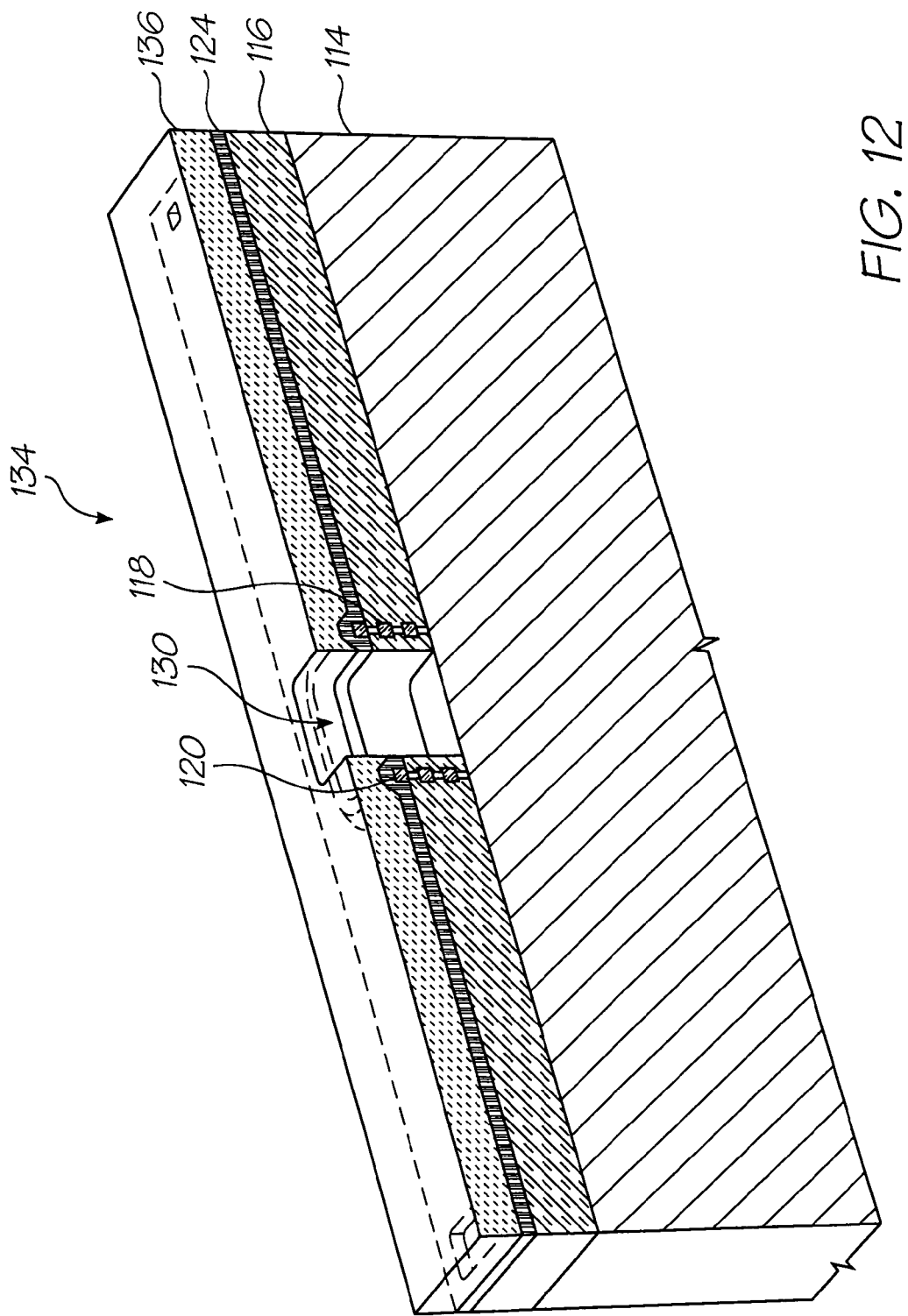
FIG. 12 shows a three-dimensional view through A—A in FIG. 11 of the stage of FIG. 9 with a resist layer deposited and patterned on the ink passivation layer.

In FIGS. 12 to 14, reference numeral 134 generally indicates a further fabrication step on the CMOS wafer 112. With reference to FIGS. 9 to 11, like reference numerals refer to like parts, unless otherwise specified.

The structure 134 shows the etching of the CMOS dielectric layers defined by the layer 116 of silicon dioxide down to bare silicon of the layer 114.

Approximately 3 microns of resist material 136 is spun onto the silicon nitride layer 124. The resist material 136 is a positive resist material. A mask 138 in FIG. 14 is used for a photolithographic step carried out on the resist material 136. The photolithographic image that is indicated by the mask 138 is then developed and a soft bake process is carried out on the resist material 136.

The photolithographic step is carried out as a 1.0 micron or better stepping process with an alignment of +/−0.25 micron. An etch of approximately 4 microns is carried out on the silicon dioxide layer 116 down to the bare silicon of the silicon wafer substrate 114.

Figure 15:
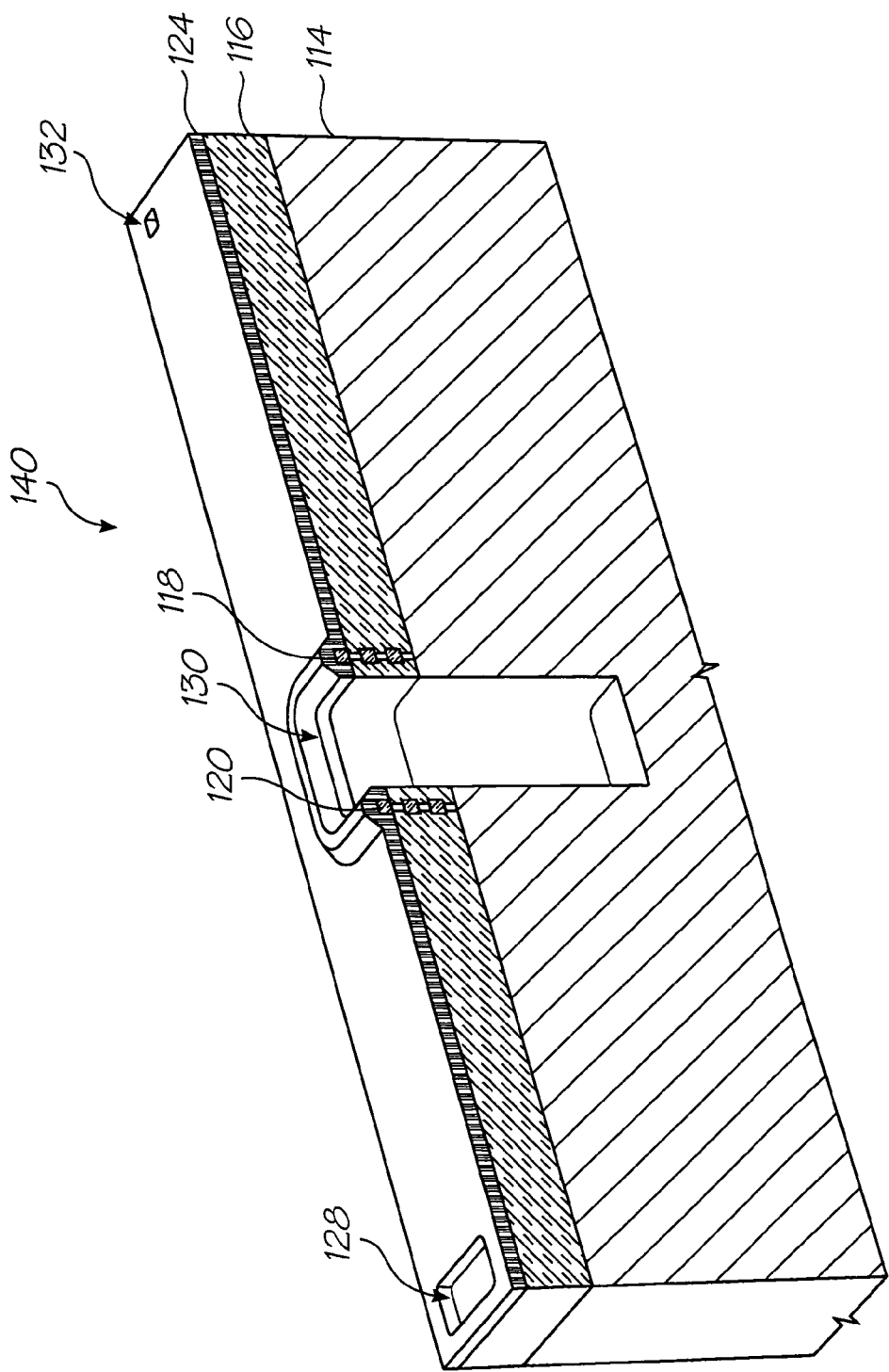
FIG. 15 shows a three-dimensional sectioned view of the stage of FIG. 12, with the resist layer removed and the wafer substrate etched to a predetermined depth to define an inlet channel of the nozzle arrangement.
Figure 16:
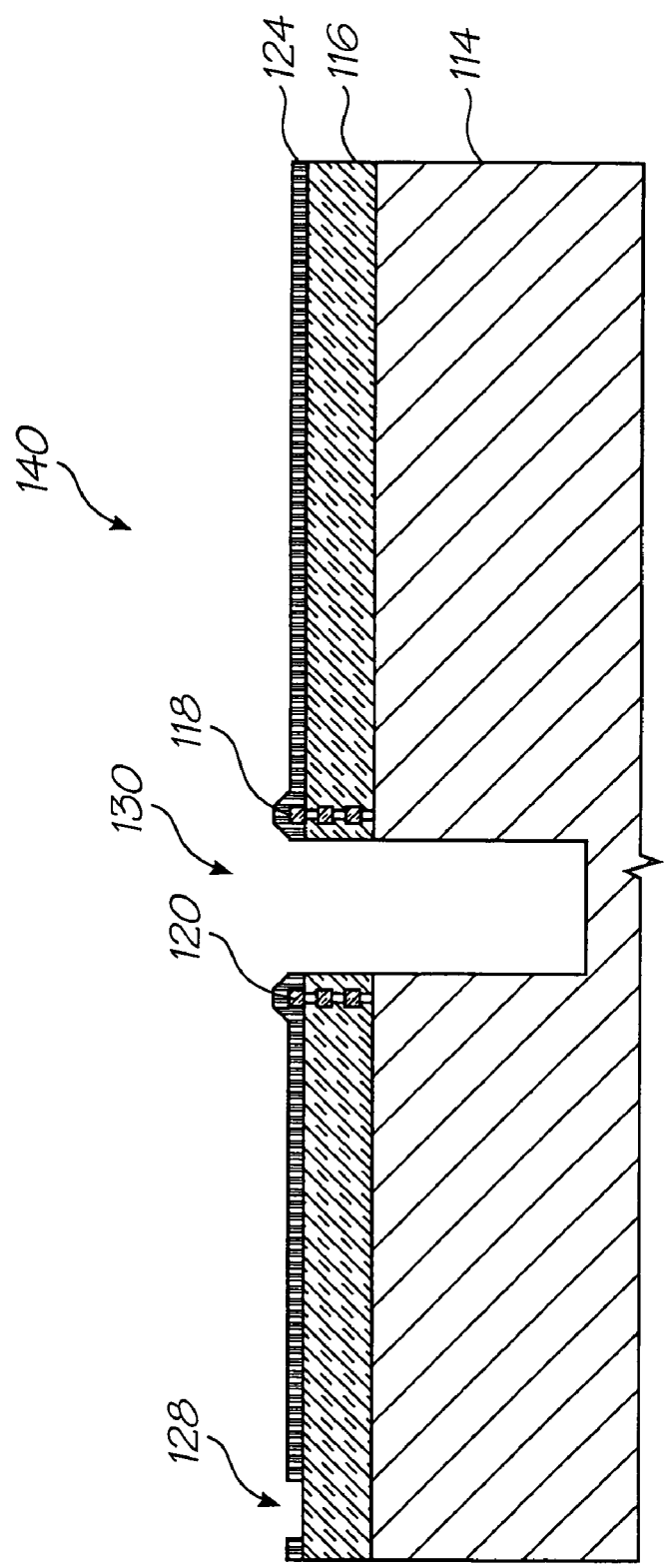
FIG. 16 shows a side sectioned view of the stage of FIG. 15.

In FIGS. 15 and 16, reference numeral 140 generally indicates the structure 134 after a deep reactive ion etch (DRIE) is carried out on the silicon wafer substrate 114.

The etch is carried out on the bare silicon of the substrate 114 to develop the ink inlet channel 22 further. This is a DRIE to 20 microns (+10/−2 microns). Further in this step, the resist material 136 is stripped and the structure is cleaned with an oxygen plasma cleaning process.

The etch depth is not a critical issue in this stage. Further, the deep reactive ion etch can be in the form of a DRAM trench etch.

Figure 17:
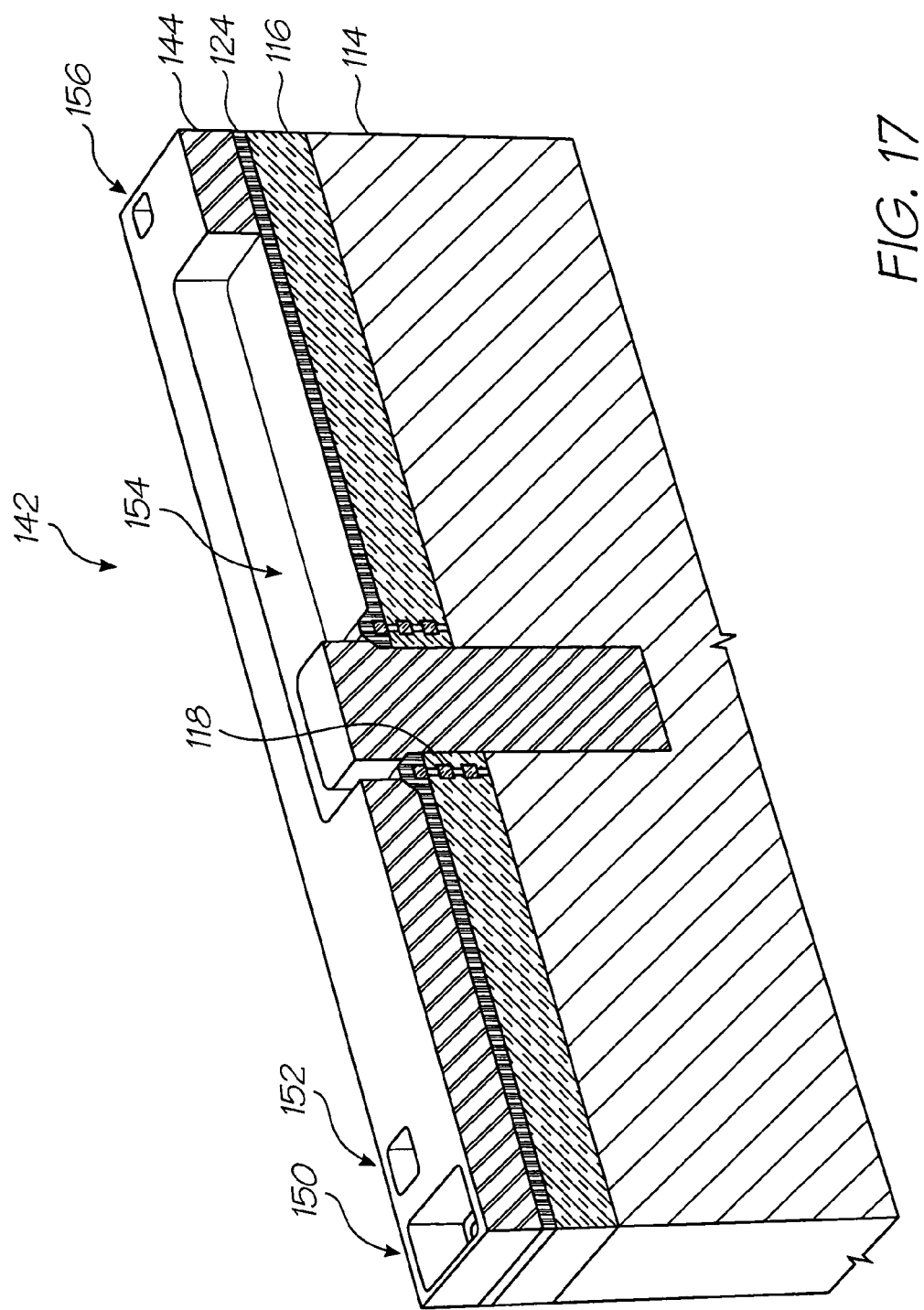
FIG. 17 shows a three-dimensional sectioned view through A—A in FIG. 16 of the stage of FIG. 15 with a first sacrificial layer deposited and patterned on the ink passivation layer.

In FIGS. 17 to 19, reference numeral 142 generally indicates the structure 140 with a first layer 144 of sacrificial resist material positioned thereon. With reference to the preceding Figures, like reference numerals refer to like parts, unless otherwise specified.

In this stage, approximately 3.5 microns of the sacrificial resist material 144 is spun on to the front surface of the structure 140. A mask 148 in FIG. 19, is used together with a photolithographic process to pattern the first layer 144 of the sacrificial material.

The photolithographic process is a 1.0 micron stepping process or better. The mask bias is +0.3 micron and the alignment is +/−0.25 micron.

The sacrificial material 144 is a positive resist material. The sacrificial material 144 can be in the form of a polyimide.

Being a positive resist, the first layer 144, when developed, defines a pair of contact openings 150 which provide access to the aluminum electrode contact layers 122 and a pair of inwardly positioned openings 152 which are aligned with the contact openings 150 and terminate at the layer 124 of silicon nitride. As can be seen in the drawings, a region that was previously etched into the silicon wafer substrate 114 and through the silicon dioxide layer 116 to initiate the ink inlet channel 22 is filled with the sacrificial material 144. A region 154 above the portion 120 of the diffusion barrier 118 and the layer 124 is cleared of sacrificial material to define a zone for the nozzle chamber 75. Still further, the sacrificial material 144 defines a pair of test switch openings 156.

The sacrificial material 144 is cured with deep ultraviolet radiation. This serves to stabilize the sacrificial material 144 to increase the resistance of the sacrificial material 144 to later etching processes. The sacrificial material 144 shrinks to a thickness of approximately 3 microns.

Figure 20:
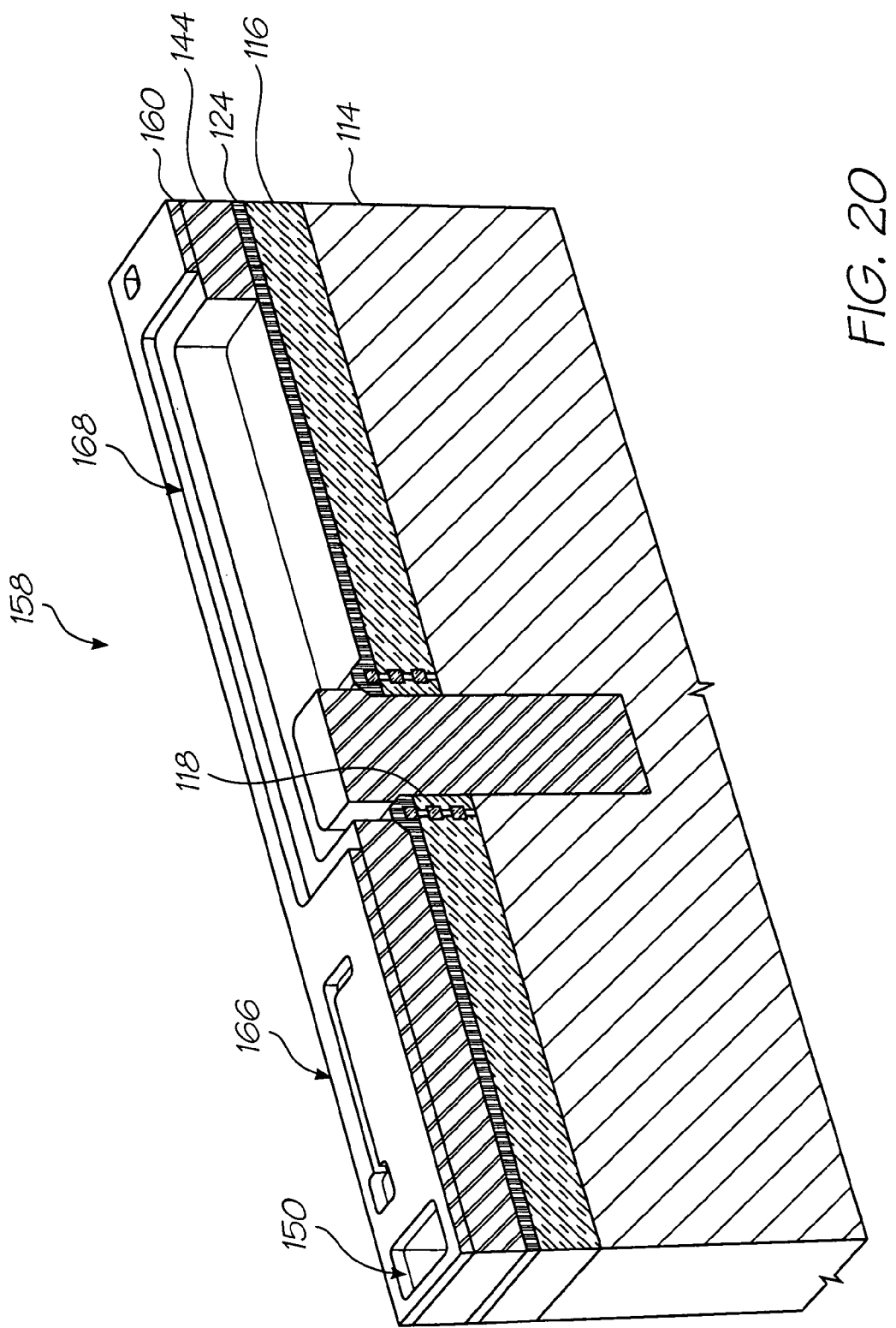
FIG. 20 shows a three-dimensional sectioned view through A—A in FIG. 22 of the stage of FIG. 17 with a second sacrificial layer deposited and patterned on the first sacrificial layer.
Figure 21:
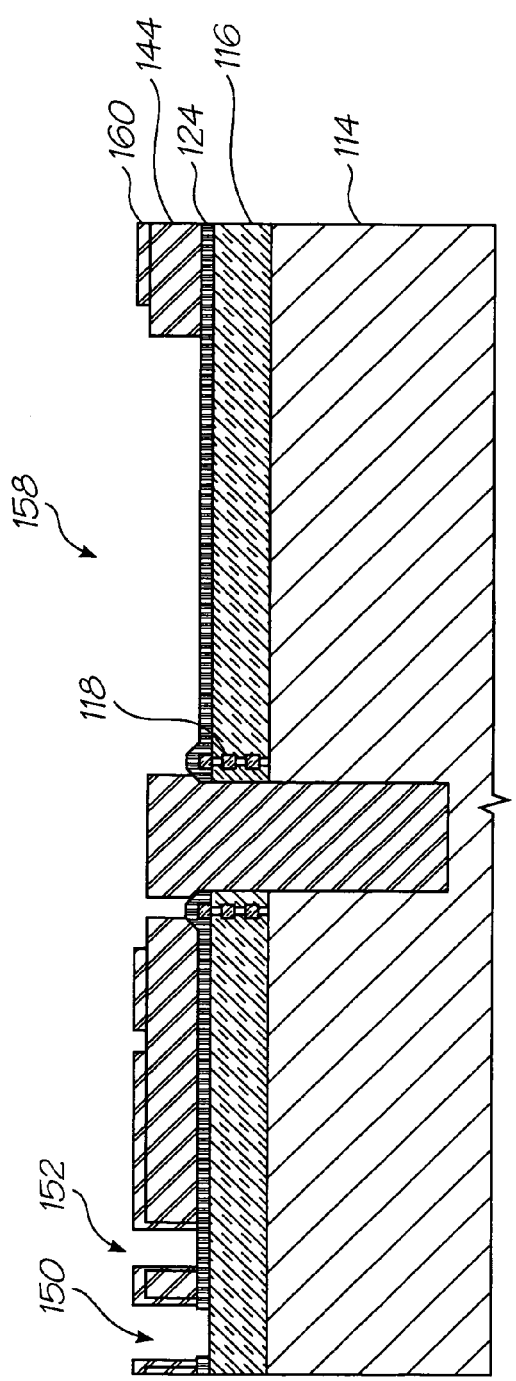
FIG. 21 shows a side sectioned view through B—B in FIG. 22 of the stage of FIG. 20.
Figure 22:
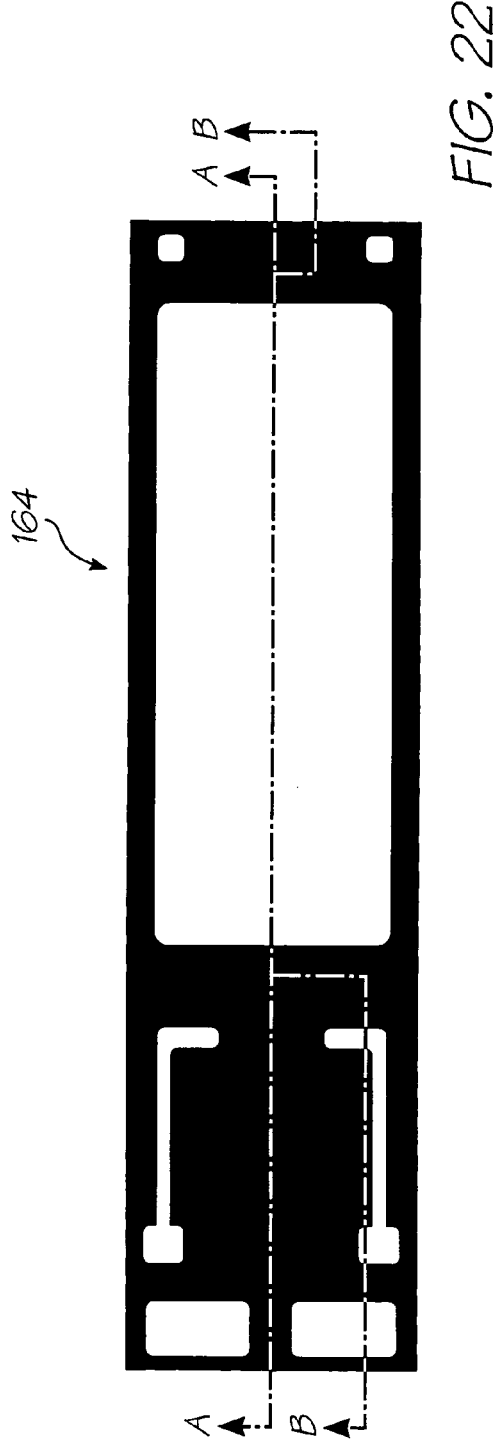
FIG. 22 shows a mask used for patterning the second sacrificial layer.

In FIGS. 20 to 22, reference numeral 158 generally indicates the structure 142 with a second layer 160 of sacrificial resist material developed thereon. With reference to the preceding figures, like reference numerals refer to like parts, unless otherwise specified.

In this stage, approximately 1.2 microns of the sacrificial resist material 160 in the form of a positive resist material are spun onto the structure 142. The sacrificial material 160 can be in the form of a polyimide.

A mask 164 shown in FIG. 22 is used together with a photolithographic process to pattern the sacrificial material 160. The photolithographic process is a 1.0 micron stepper or better process. Further, the mask bias is +0.2 micron for top features only. The alignment during the photolithographic process is +/−0.25 micron.

It should be noted that, in the previous stage, a relatively deep hole was filled with resist. The sacrificial material 160 serves to fill in any edges of the deep hole if the sacrificial material 144 has shrunk from an edge of that hole.

Subsequent development of the sacrificial material 160 results in the structure shown in FIGS. 20 and 21. Of particular importance is the fact that the openings 150, 152 are extended as a result of the mask 164. Further, deposition zones 166 are provided for the central planar sections 60 of the outer actuator arms 48.2. It will also be apparent that a further deposition zone 168 is formed for the titanium aluminum nitride nozzle chamber wall 62. The mask 164 also provides for extension of the test switch openings 156.

Once developed, the sacrificial material 160 is cured with deep ultraviolet radiation. This causes the layer 160 to shrink to 1 micron.

Figure 23:
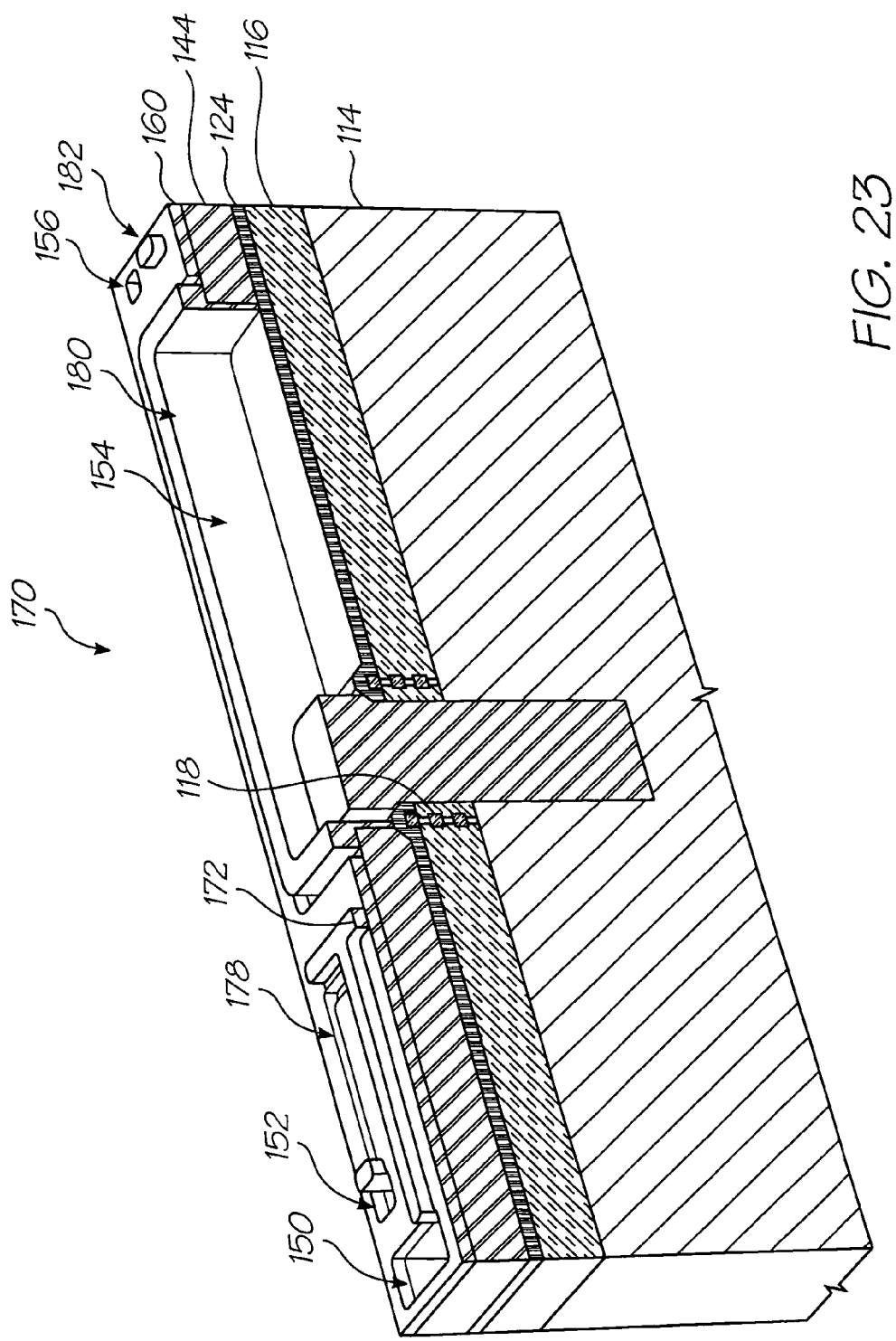
FIG. 23 shows a three-dimensional view through A—A in FIG. 25 of the stage of FIG. 20 after a selective etching of the second sacrificial layer.
Figure 24:
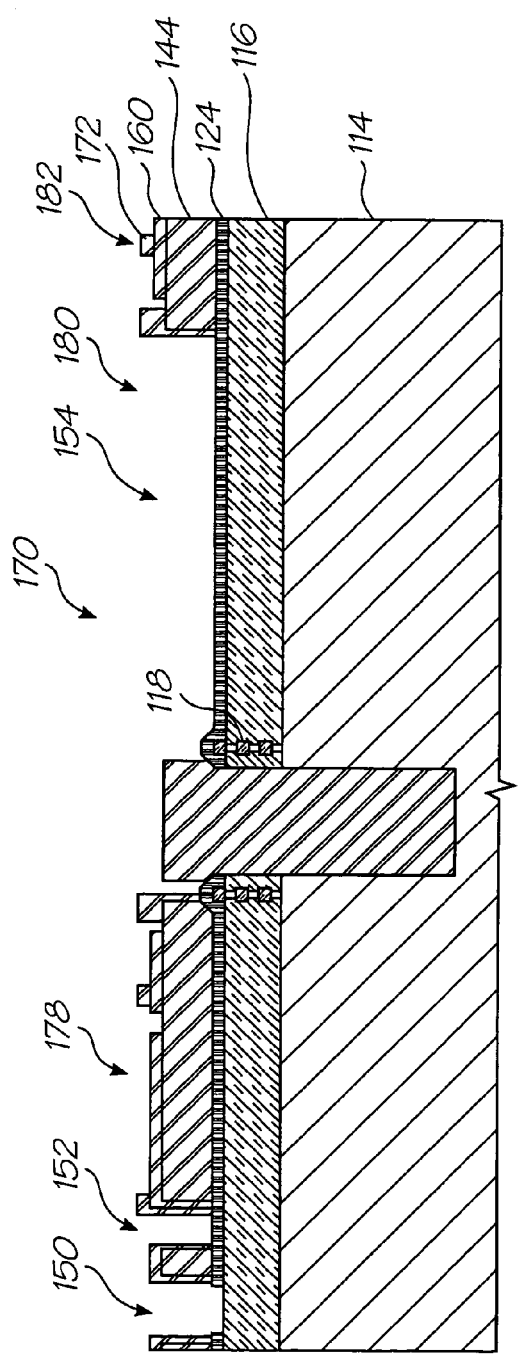
FIG. 24 shows a side sectioned view through B—B in FIG. 25 of the stage of FIG. 23.
Figure 25:
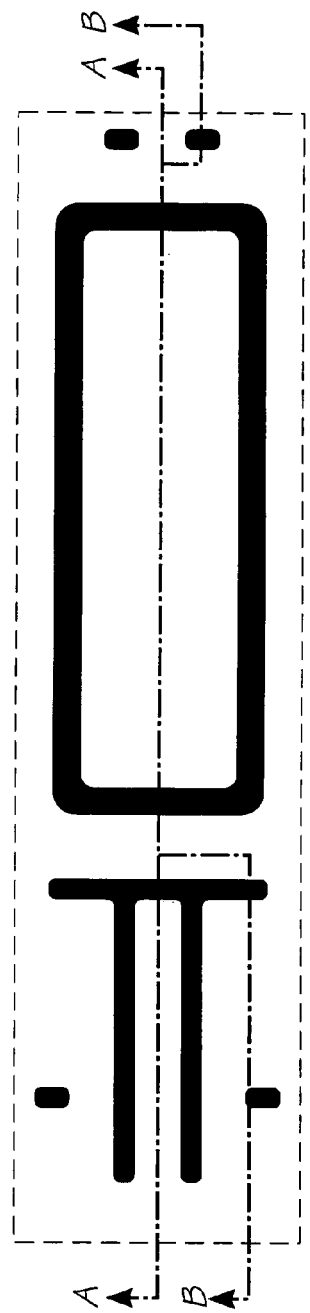
FIG. 25 shows a mask used for the selective etching of the second sacrificial layer.

In FIGS. 23 to 25, reference numeral 170 generally indicates the structure 158 with a third layer 172 of sacrificial resist material positioned thereon. With reference to the preceding figures, like reference numerals refer to like parts, unless otherwise specified.

At this stage, approximately 1.2 microns of the sacrificial material 172 are spun onto the structure 158. The sacrificial material 172 is a positive resist material. The sacrificial material 172 can be in the form of a polyimide.

A mask 176 in FIG. 25 is used to carry out a photolithographic imaging process on the sacrificial material 172.

The photolithographic process is a 1.0 micron stepper or better process. Further, the mask bias is +0.2 micron for the top features only. The alignment of the mask 176 is +/−0.25 micron.

Subsequent development of the sacrificial material 172 results in the structure 170 shown in FIG. 23 and FIG. 24.

During this step, the layers 144, 160 and 172 of sacrificial material are hard baked at 250 degrees Celsius for six hours in a controlled atmosphere. The sacrificial material 172 shrinks to 1.0 micron.

It is of importance to note that this step results in the formation of deposition zones 178 for the titanium aluminum nitride of the thermal actuator 30. Further, deposition zones 180 for the nozzle chamber wall 62, in particular the ink sealing structure 78, are provided. Still further, deposition zones 182 for the contacts 102 for the test switch arrangement 100 are provided.

Figure 26:
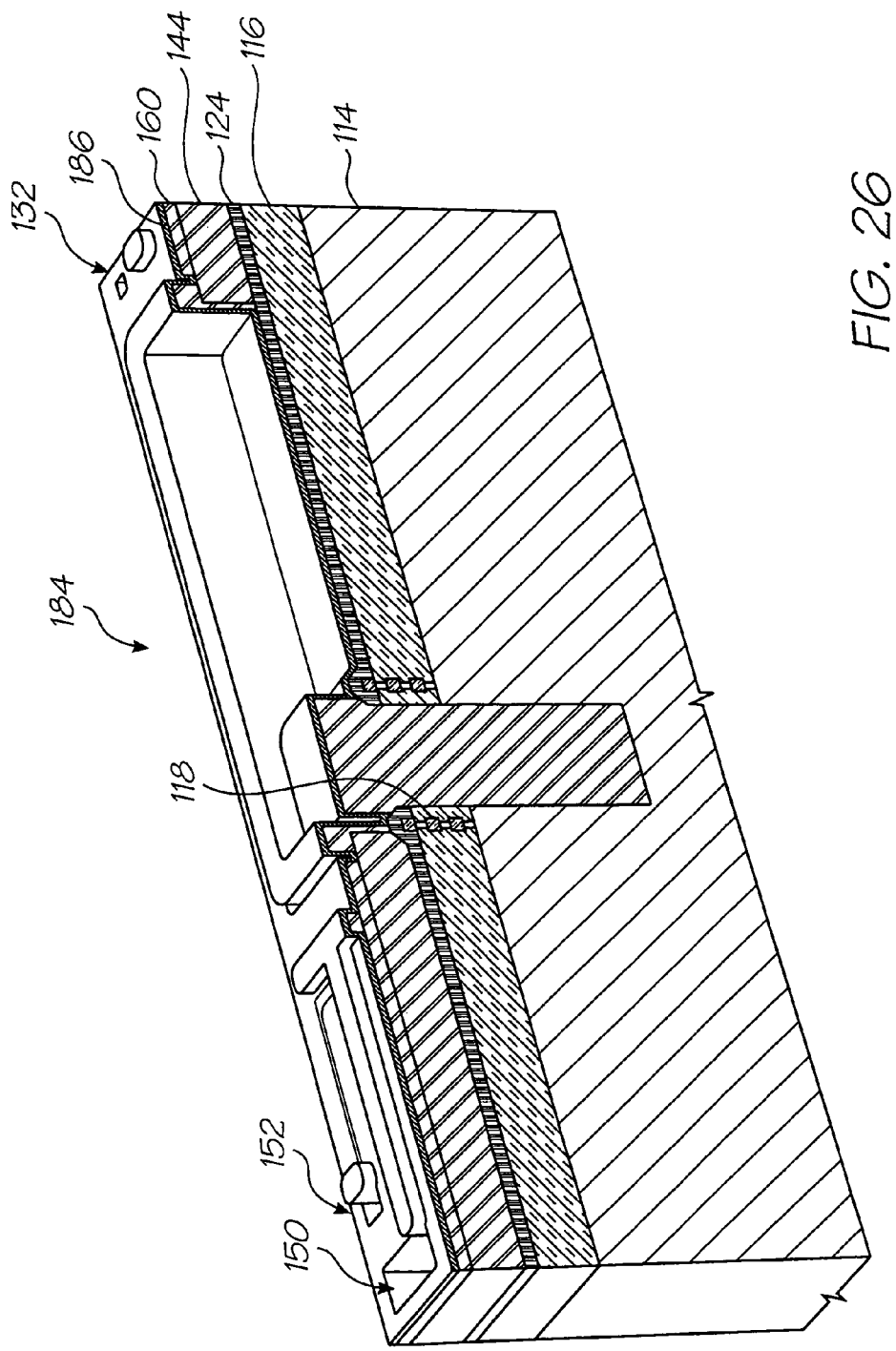
FIG. 26 shows a three-dimensional sectioned view of the stage of FIG. 23 with a first conductive layer deposited on the second sacrificial layer and the ink passivation layer.
Figure 27:
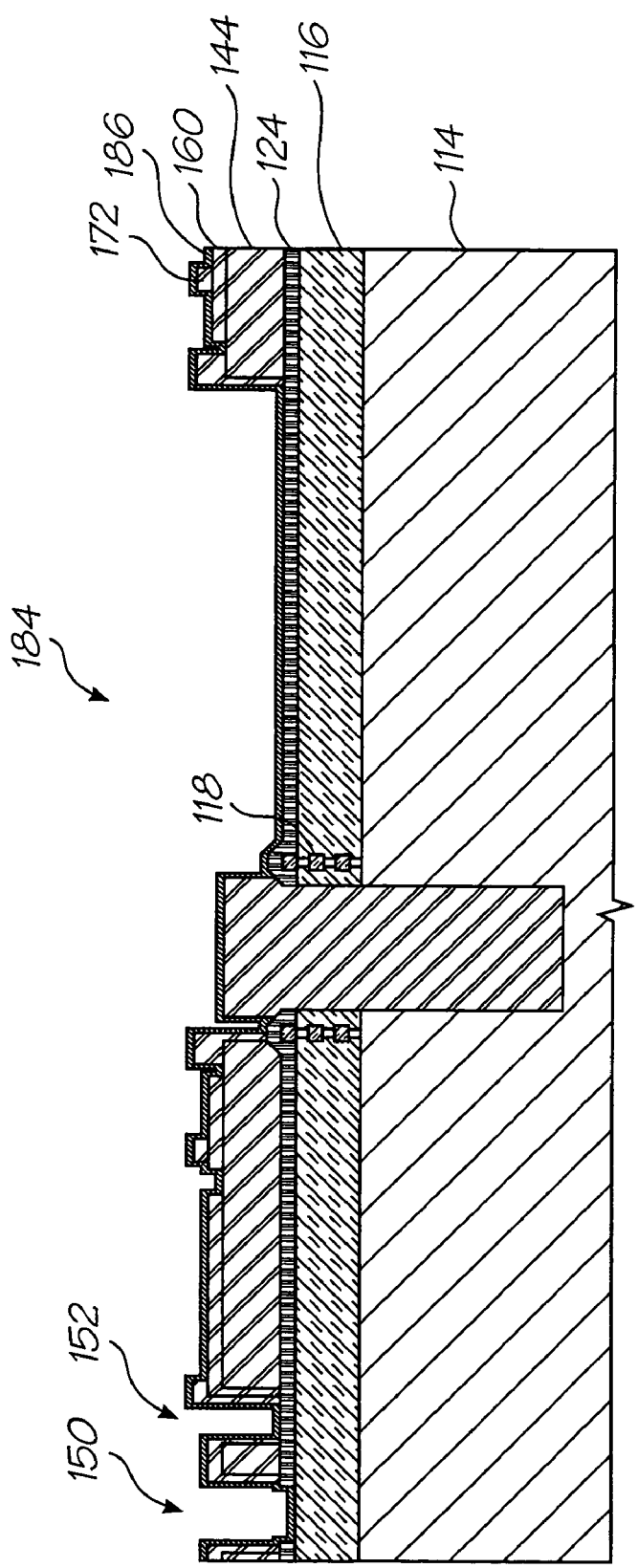
FIG. 27 shows a side sectioned view of the stage of FIG. 26.

In FIGS. 26 and 27, reference numeral 184 generally indicates the structure 170 with a layer of titanium aluminum nitride deposited thereon. With reference to the preceding figures, like reference numerals refer to like parts, unless otherwise specified.

In this stage, initially, approximately 50 Angstroms of titanium aluminum alloy at approximately 200 degrees Celsius are sputtered onto the structure 170 in an argon atmosphere. Thereafter, a nitrogen gas supply is provided and 5000 Angstroms of titanium aluminum is sputtered with the result that titanium aluminum nitride is deposited on the initial titanium aluminum metallic layer.

The initial titanium aluminum metallic layer is essential to inhibit the formation of non-conductive aluminum nitride at the resulting aluminum/titanium aluminum nitride interface.

The titanium aluminum is sputtered from a $Ti_{0.8}Al_{0.2}$ alloy target in a nitrogen atmosphere.

Titanium nitride can also be used for this step, although titanium aluminum nitride is the preferred material.

Possible new CMOS copper barrier materials such as titanium aluminum silicon nitride have potential due to their amorphous nanocomposite nature. In FIGS. 26 and 27, the layer of titanium aluminum nitride is indicated with reference numeral 186.

The deposition thickness can vary by up to 5 percent.

Figure 28:
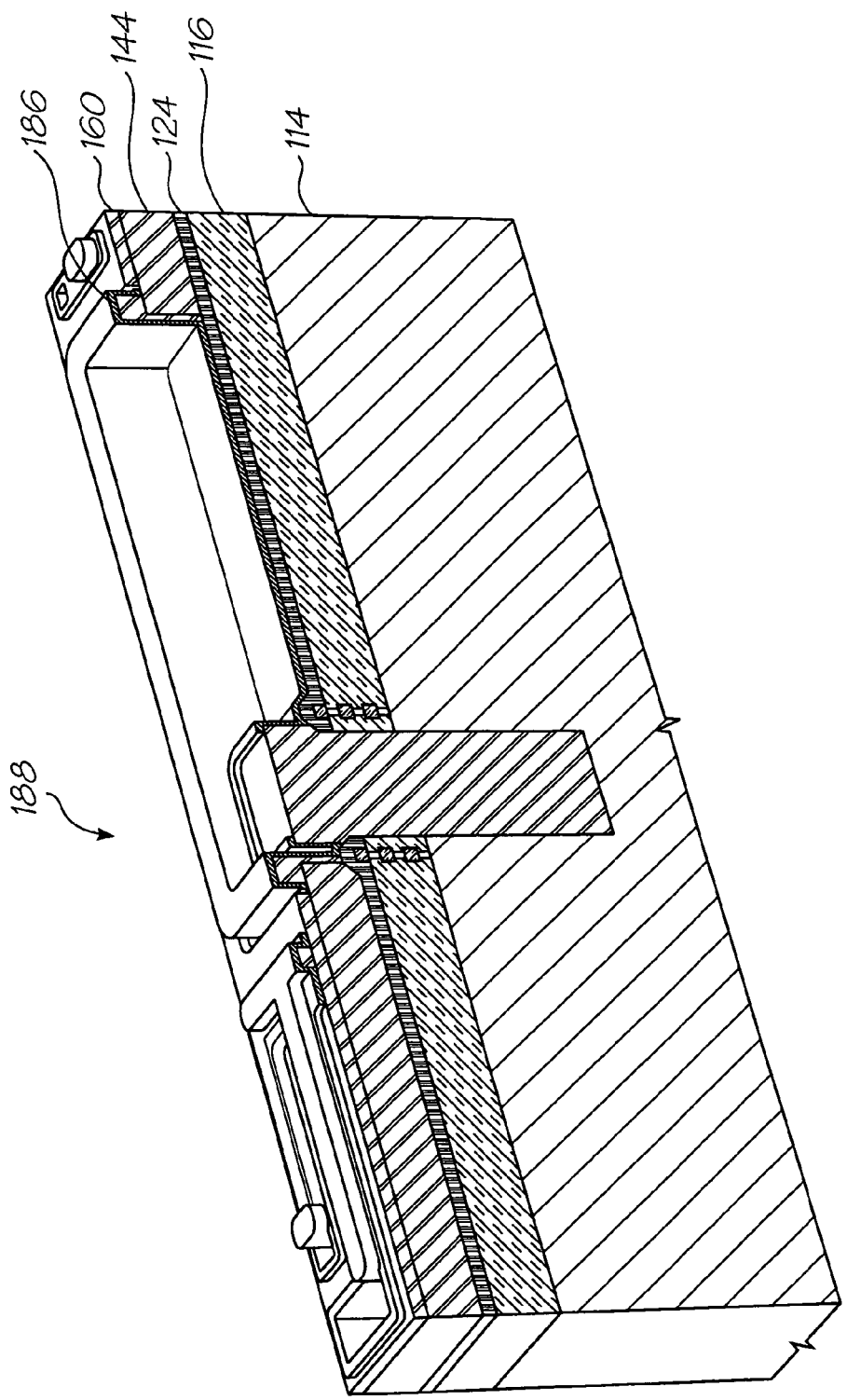
FIG. 28 shows a three-dimensional sectioned view through A—A in FIG. 30 after a selective etching of the first conductive layer.
Figure 29:
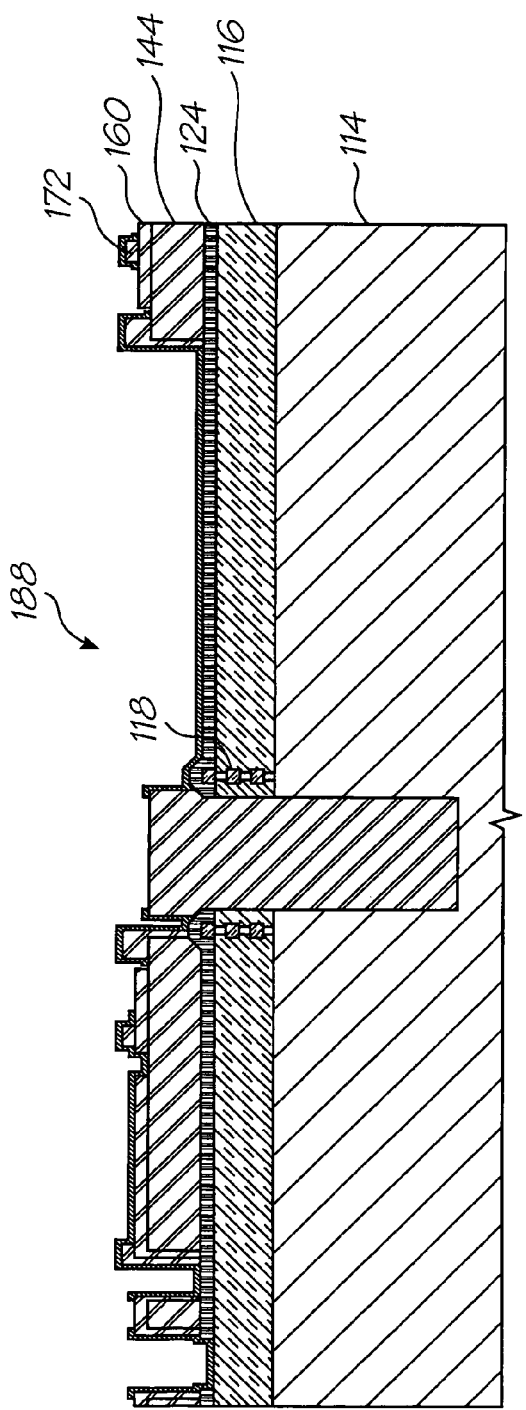
FIG. 29 shows a sectioned side view through B—B in FIG. 30 of the stage of FIG. 28.
Figure 30:
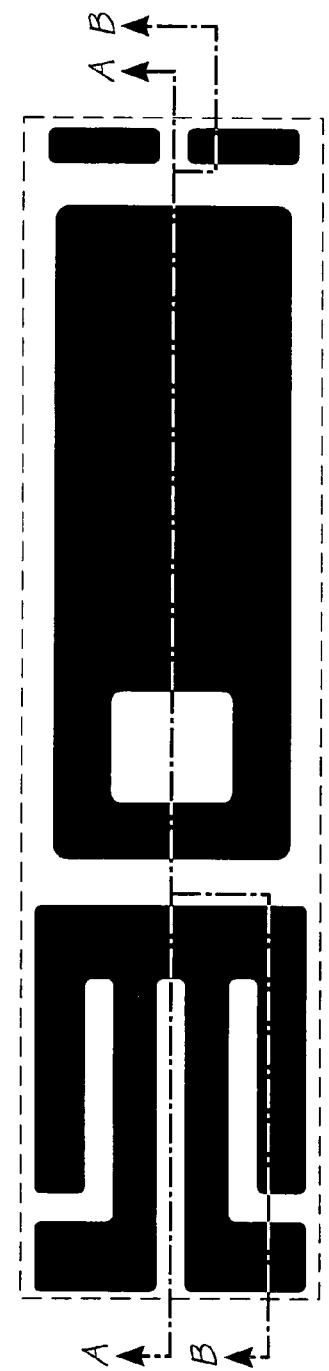
FIG. 30 shows a mask used for selectively etching the first conductive layer.

In FIGS. 28 to 30, reference numeral 188 generally indicates the structure 184 with the titanium aluminum nitride layer 186 etched down to a preceding resist layer. With reference to the preceding figures, like reference numerals refer to like parts, unless otherwise specified.

At this stage, approximately 1 micron of a positive resist material is spun onto the layer 186.

A mask 190 in FIG. 30 is used together with a photolithographic process to image the positive resist material. The resist material is then developed and undergoes a soft bake process.

The photolithographic process is a 0.5 micron or better stepper process. The mask bias is +0.2 micron for the top features only. The alignment of the mask 180 is +/−0.25 micron.

The titanium aluminum nitride layer 186 is then etched to a depth of approximately 1.5 micron. A wet stripping process is then used to remove the resist. This ensures that the sacrificial material is not removed. A brief clean with oxygen plasma can also be carried out. This can remove sacrificial material so should be limited to 0.2 micron or less.

The result of this process is shown in FIGS. 28 and 29. As can be seen, this process forms the anchor portions 32 and the actuator arms 48 together with the bridge portion 50 of the thermal actuator 30. Further, this process forms the titanium aluminum nitride nozzle chamber wall 62. Still further, the result of this process is the formation of the test switch contacts 102.

Figure 31:
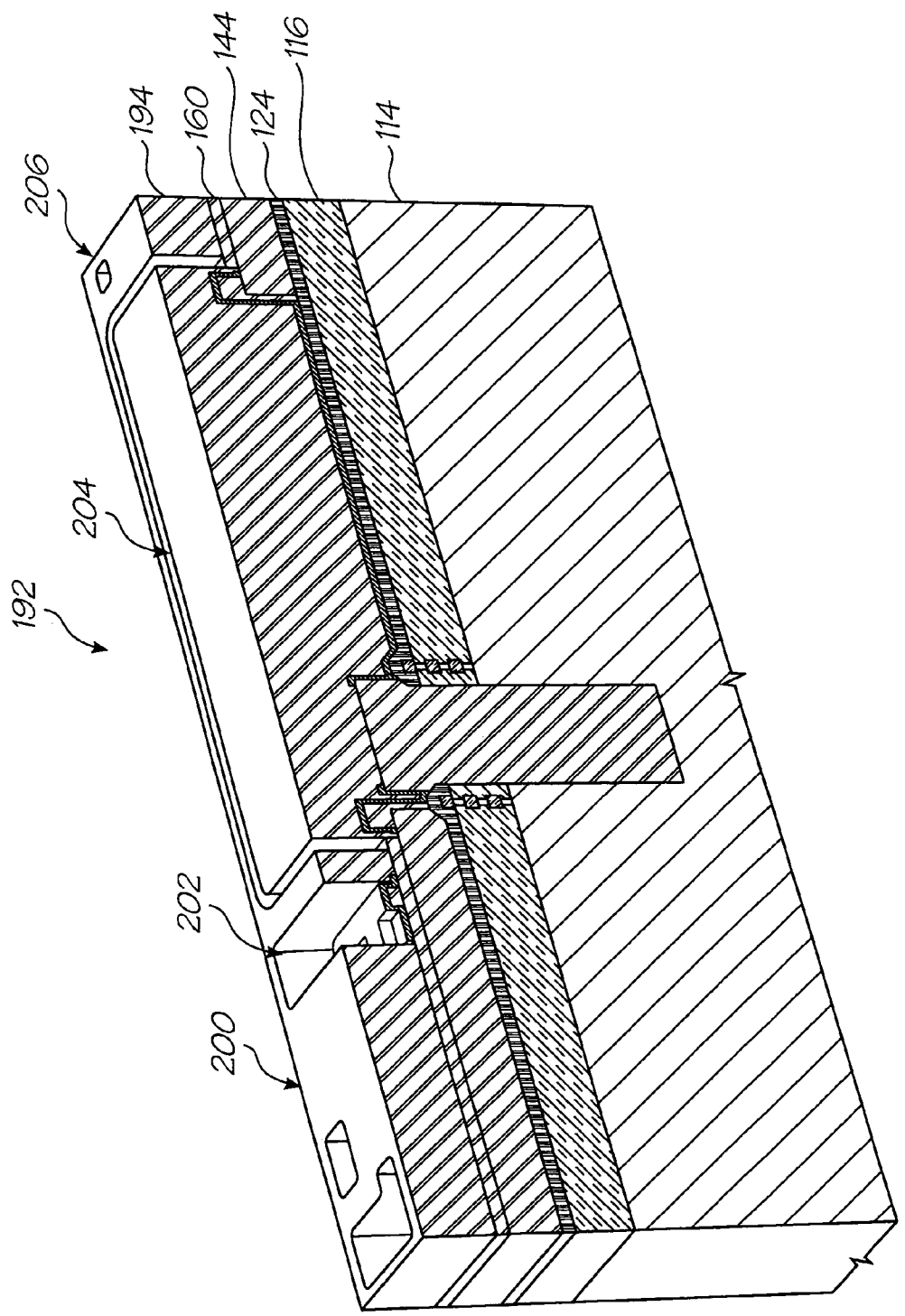
FIG. 31 shows a three-dimensional sectioned view taken through A—A in FIG. 33 of a third sacrificial layer deposited and patterned on the first conductive layer.
Figure 32:
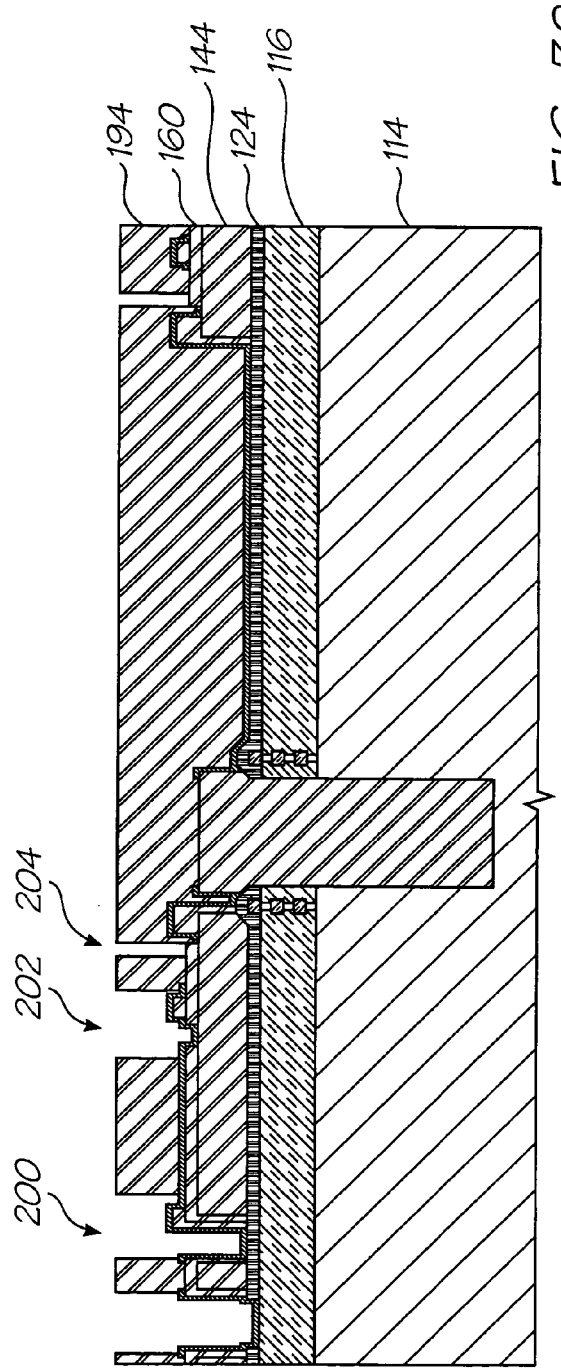
FIG. 32 shows a side sectioned view through B—B in FIG. 33 of the stage of FIG. 31.
Figure 33:
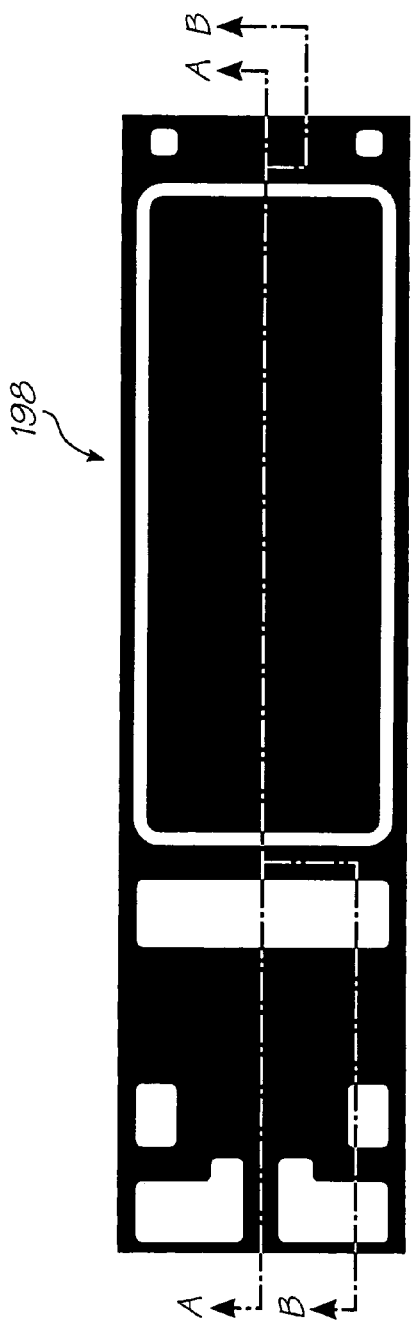
FIG. 33 shows a mask used for depositing and patterning the third sacrificial layer.

In FIGS. 31 to 33, reference numeral 192 generally indicates the structure 188 with a fourth layer 194 of sacrificial resist material positioned on the structure 188. With reference to the preceding figures, like reference numerals refer to like parts, unless otherwise specified.

In this step, approximately 4.7 microns (+/−0.25 microns) of the sacrificial material 194 is spun onto the structure 188.

A mask 198 shown in FIG. 33 is then used together with a photolithographic process to generate an image on the sacrificial material 194. The sacrificial material 194 is a positive resist material and the image generated can be deduced from the mask 198.

The photolithographic process is a 0.5 micron stepper or better process. The mask bias is +0,2 microns. The alignment is +/−0,15 microns.

The image is then developed to provide the structure as can be seen in FIGS. 31 and 32. As can be seen in these drawings, the development of the sacrificial material 194 provides deposition zones 200 for a titanium layer that defines the titanium layer 44 of the vias 42 and which serves to fix the anchor portions 32 of the thermal actuator 30 to the silicon nitride layer 26. The sacrificial material 194 also defines a deposition zone 202 for the titanium layer 44 of the mounting formation 94. Still further, the sacrificial material 194 defines a deposition zone 204 for the titanium of the complementary nozzle chamber walls 76. Still further, the sacrificial material 194 defines deposition zones 206 for the test switch arrangement 100.

Once the sacrificial material 194 has been developed, the material 194 is cured with deep ultraviolet radiation. Thereafter, the sacrificial material 194 is hard baked at approximately 250 degrees Celsius in a controlled atmosphere for six hours. The resist material 194 subsequently shrinks to approximately 4 microns in thickness.

Figure 34:
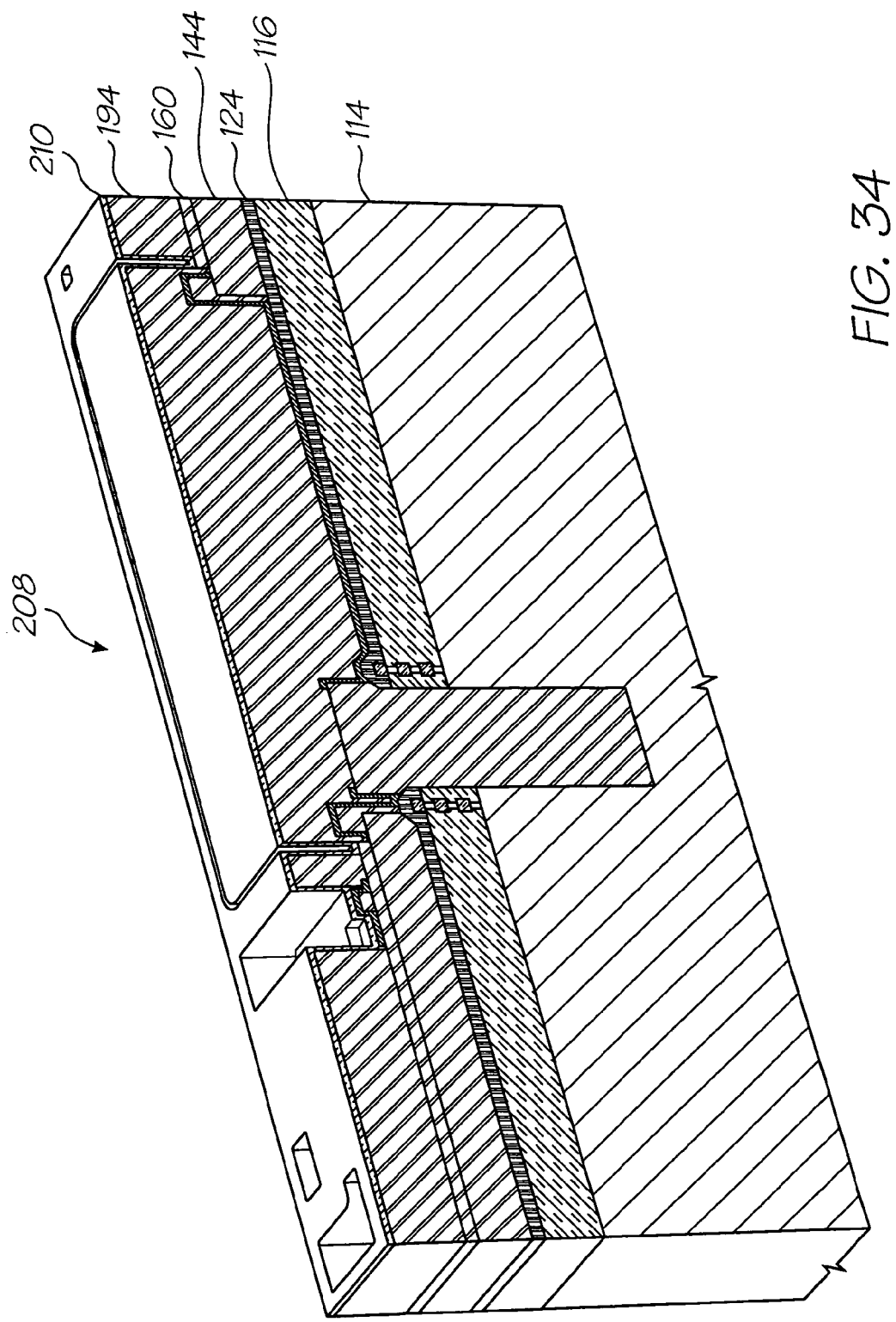
FIG. 34 shows a three-dimensional sectioned view of the stage of FIG. 31 with a second layer of conductive material deposited on the third sacrificial layer.
Figure 35:
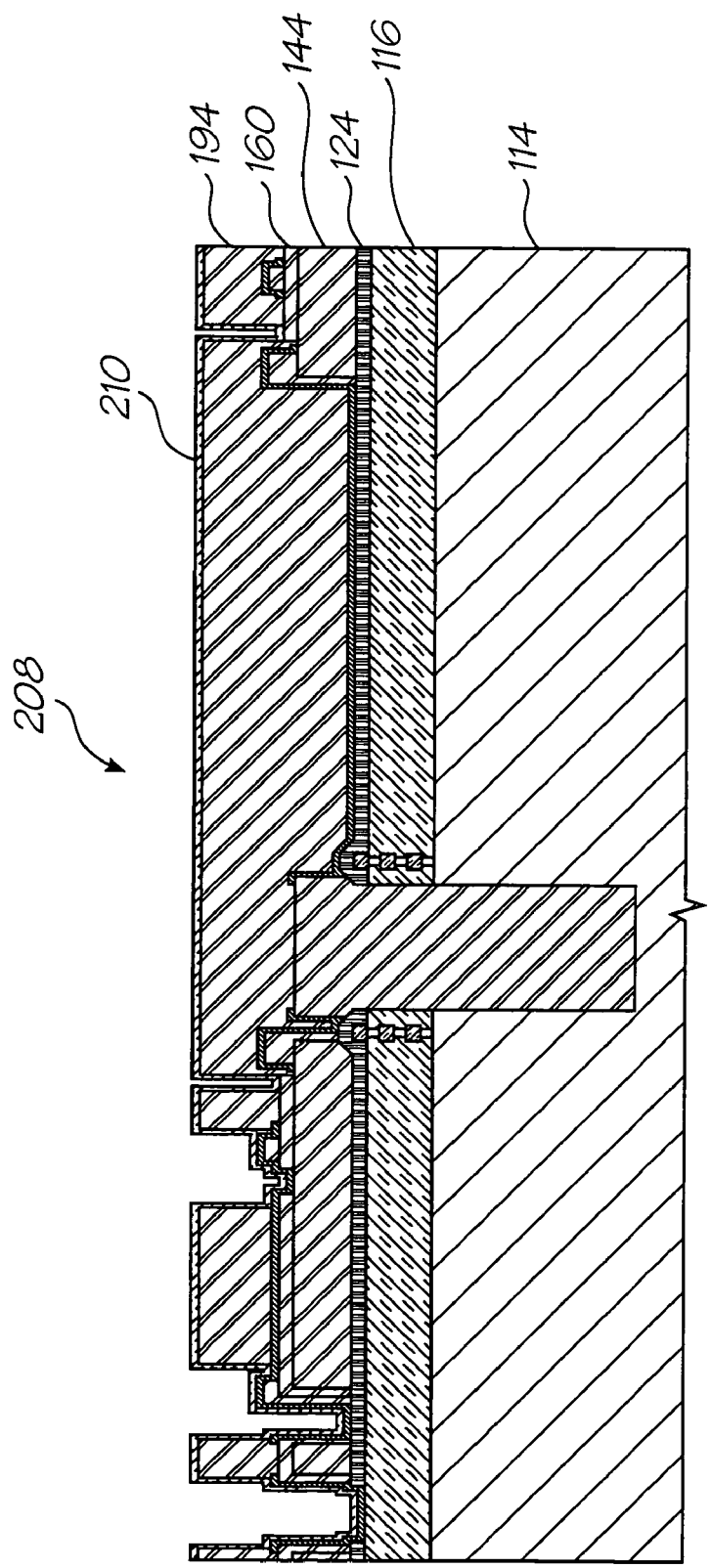
FIG. 35 shows a side sectioned view of the stage of FIG. 34.

In FIGS. 34 and 35, reference numeral 208 generally indicates the structure 192 with a layer 210 of titanium deposited thereon.

At this stage, approximately 0.5 micron of titanium is sputtered on to the structure 192 at approximately 200 degrees Celsius in an argon atmosphere.

It is important to note that the mechanical properties of this layer are not important. Instead of titanium, the material can be almost any inert malleable metal that is preferably highly conductive. Platinum or gold can be used in conjunction with a lift-off process. However, the use of gold will prevent subsequent steps being performed in the CMOS fabrication. Ruthenium should not be used as it oxidizes in subsequent oxygen plasma etch processes which are used for the removal of sacrificial materials.

The deposition thickness can vary by 30% from 0.5 micron and remain adequate. A deposition thickness of 0.25 micron should be achieved in any holes.

Figure 36:
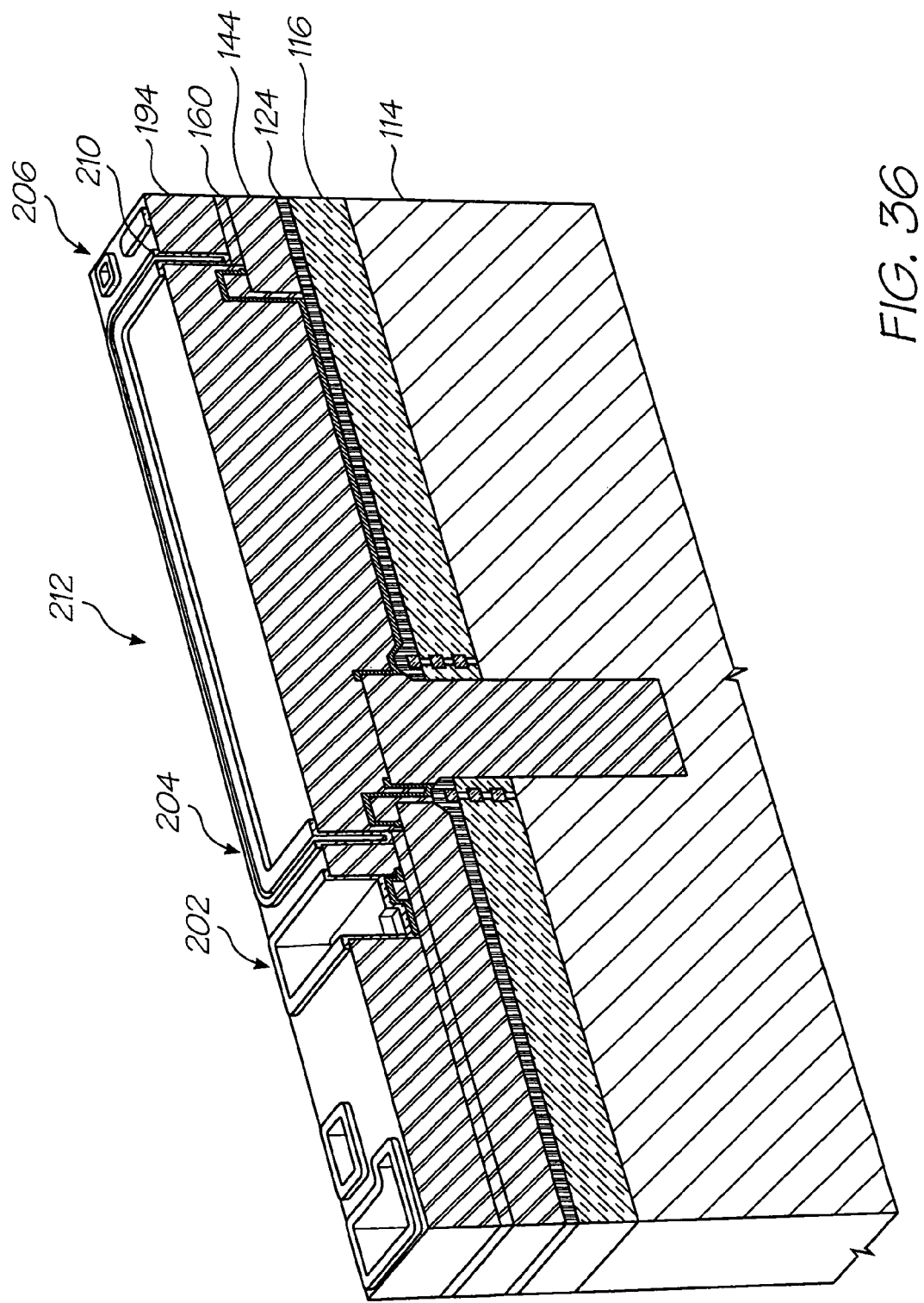
FIG. 36 shows a three-dimensional sectioned view through A—A of FIG. 38 of the stage of FIG. 34 after a selective etching of the second conductive layer.

In FIGS. 36 to 38, reference numeral 212 generally indicates the structure 208 with the layer 210 of titanium etched down to the sacrificial layer 194.

At this stage, approximately 1 micron of resist material is spun on to the layer 210. A mask 214 shown in FIG. 38 is then used together with a photolithographic process to form an image on the layer 210.

The resist material is a positive resist material. It follows that the image can be deduced from the mask 214. It should be noted that all vertical geometry is masked. It follows that there are no etches of sidewalls.

The photolithographic process is a 1.0 micron stepper process or better. Further, the mask bias is +0.3 micron and the alignment of the mask is +/−0.25 micron.

The resist material is developed and undergoes a soft bake process. The titanium layer 210 is etched down to the preceding sacrificial layer 194. The sacrificial layer 194 was hard baked. This hard baking process inhibits the sacrificial layer 194 from being etched together with the titanium layer 210.

The etching process is planar and the lithographic process is therefore not critical.

The resist material is then removed with a wet stripping process. This ensures that the sacrificial material is not also removed. Thereafter, the front side of the structure is cleaned in oxygen plasma, if necessary. It should be noted that oxygen plasma cleaning would strip the resist material. It follows that the oxygen plasma stripping or cleaning should be limited to 0.2 micron or less.

The result of this process can clearly be seen in FIGS. 36 and 37. In particular, the deposition zones 200, 202, 204, 206 are now each covered with a layer of titanium, the purpose of which has been described earlier in this specification.

Figure 39:
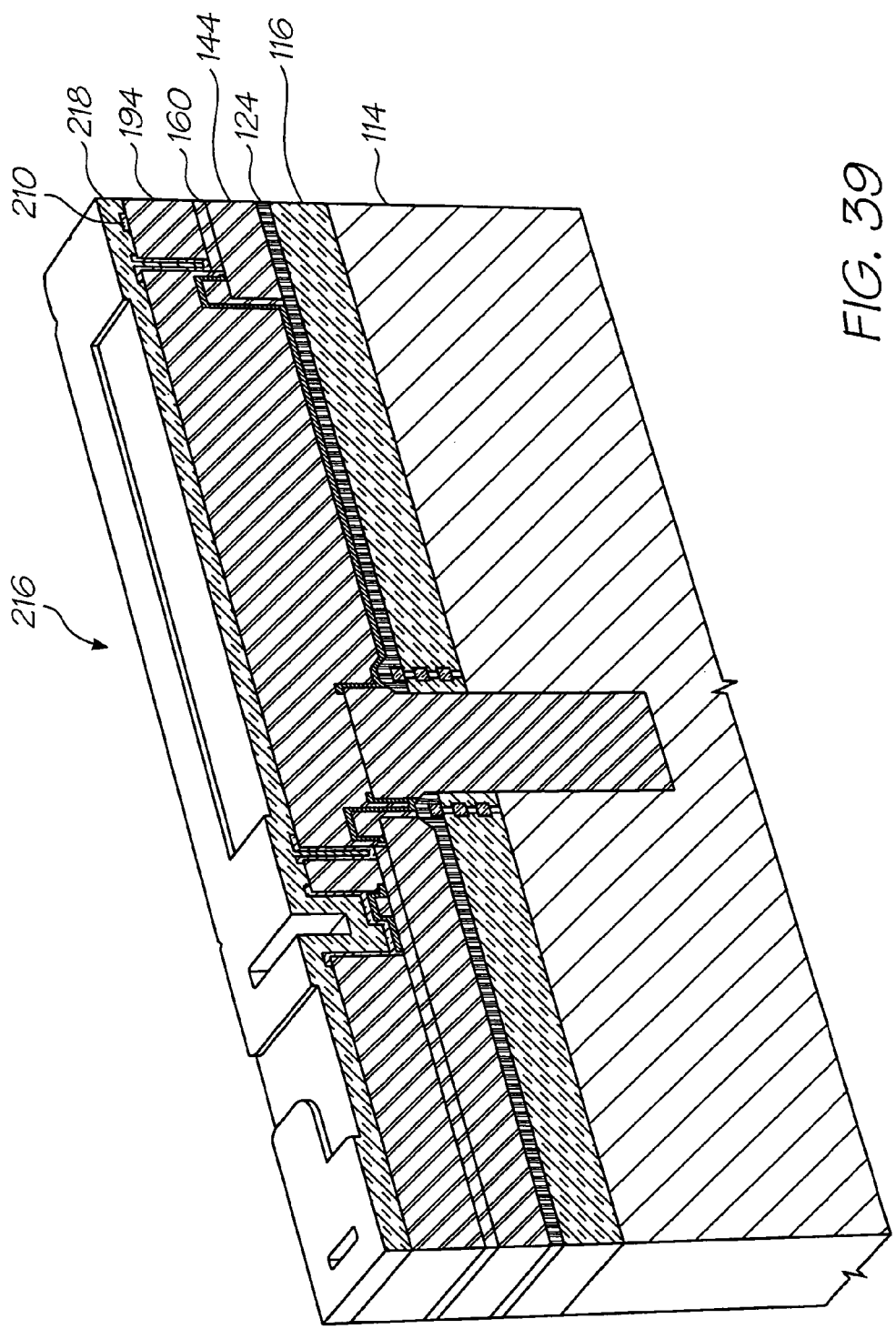
FIG. 39 shows a three-dimensional sectioned view of the stage of FIG. 36 with a dielectric layer deposited on the second conductive layer.
Figure 40:
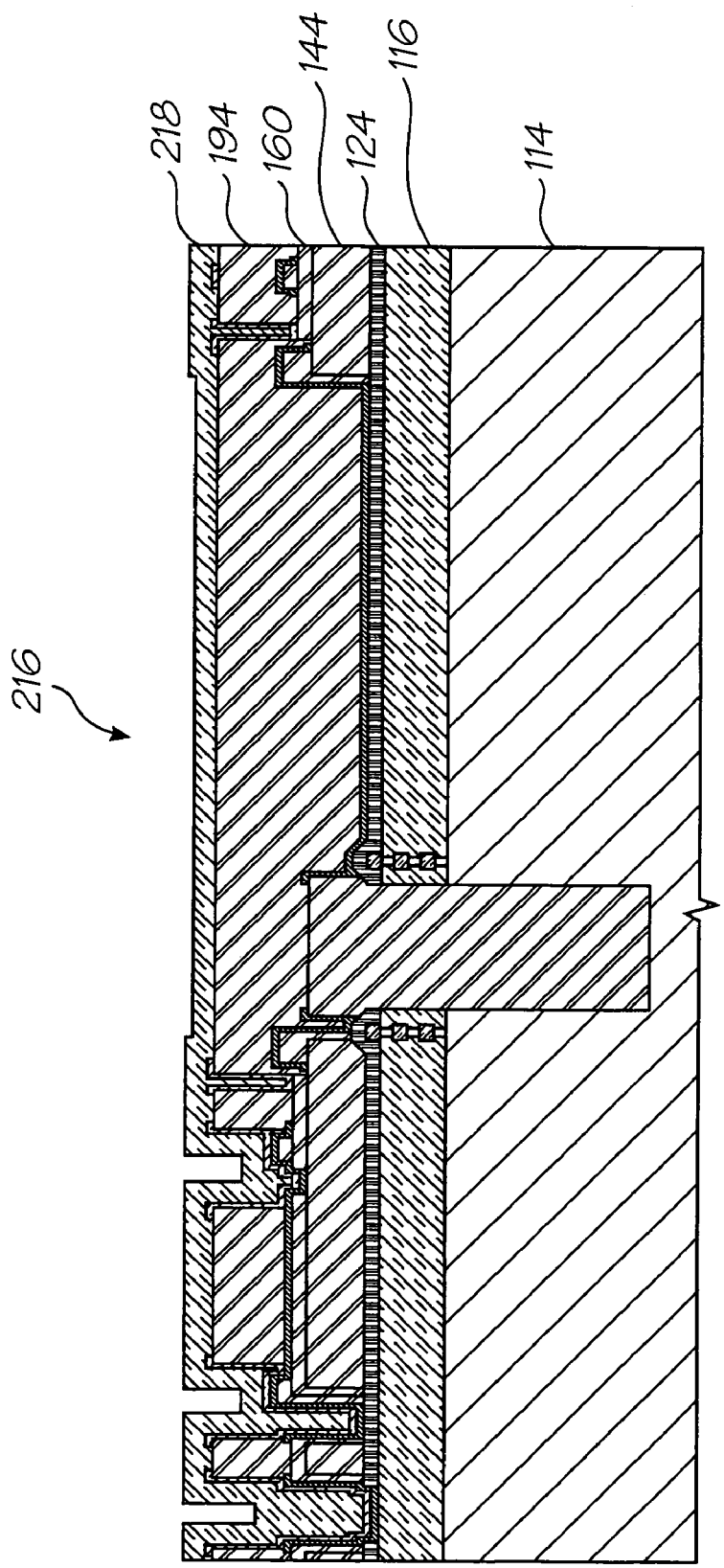
FIG. 40 shows a side sectioned view of the stage of FIG. 39.

In FIGS. 39 and 40, reference numeral 216 generally indicates the structure 212 with a layer 218 of silicon nitride deposited thereon. With reference to the preceding figures, like reference numerals refer to like parts, unless otherwise specified.

At this stage, the layer 218 of low temperature silicon nitride having a thickness of approximately 1.5 microns is deposited through ICP chemical vapor deposition (CVD) on the structure 212 at approximately 200° C.

Any suitably strong, chemically inert dielectric material could be used instead. The material properties of this layer are not especially important. The silicon nitride does not need to be densified. It follows that high temperature deposition and annealing are not required. Furthermore, this deposition process should be approximately conformal but this is not particularly critical. Still further, any keyholes that may occur are acceptable.

Figure 41:
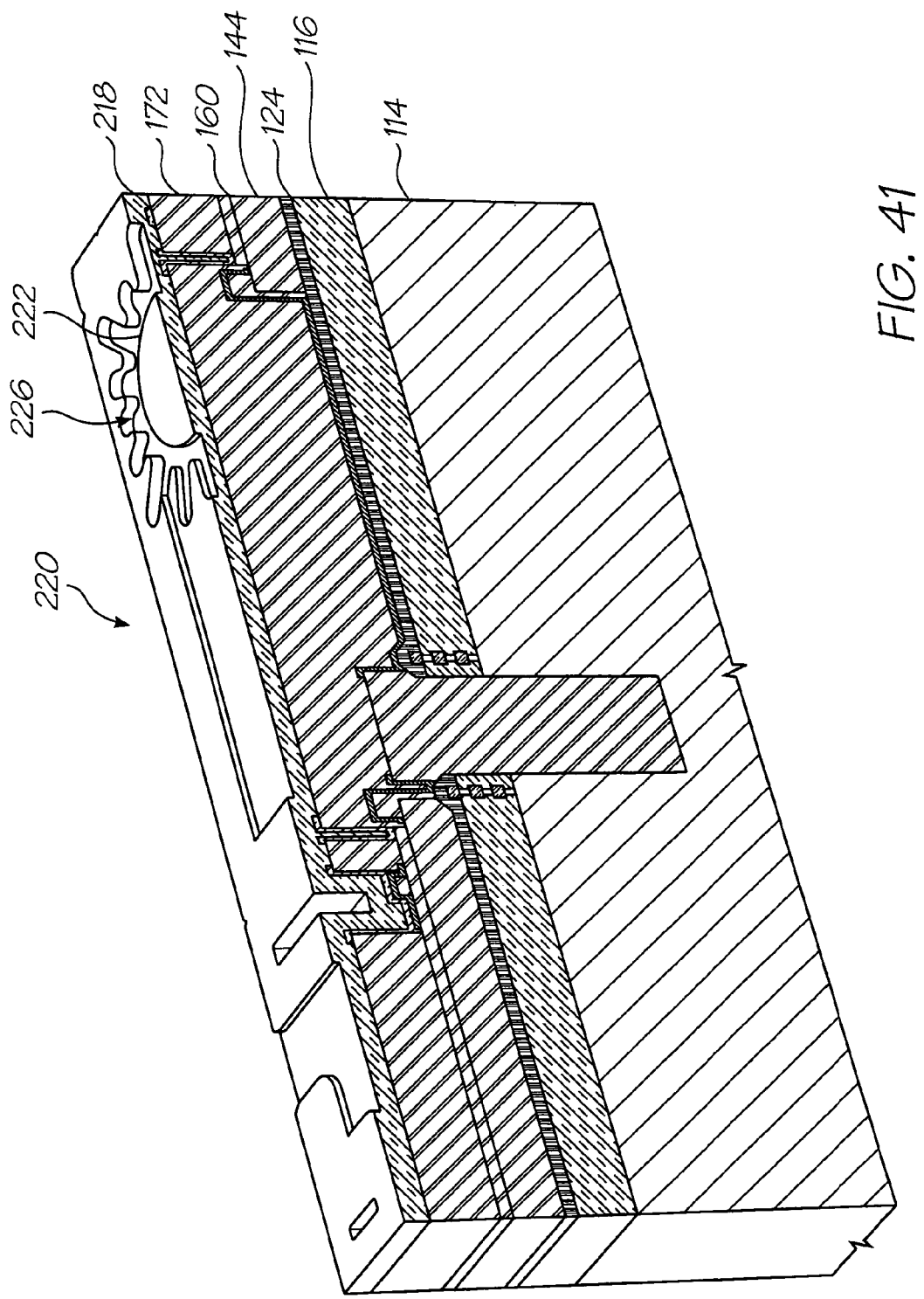
FIG. 41 shows a three-dimensional sectioned view through A—A in FIG. 43 of the stage of FIG. 39 after a selective etching of the dielectric layer.
Figure 42:
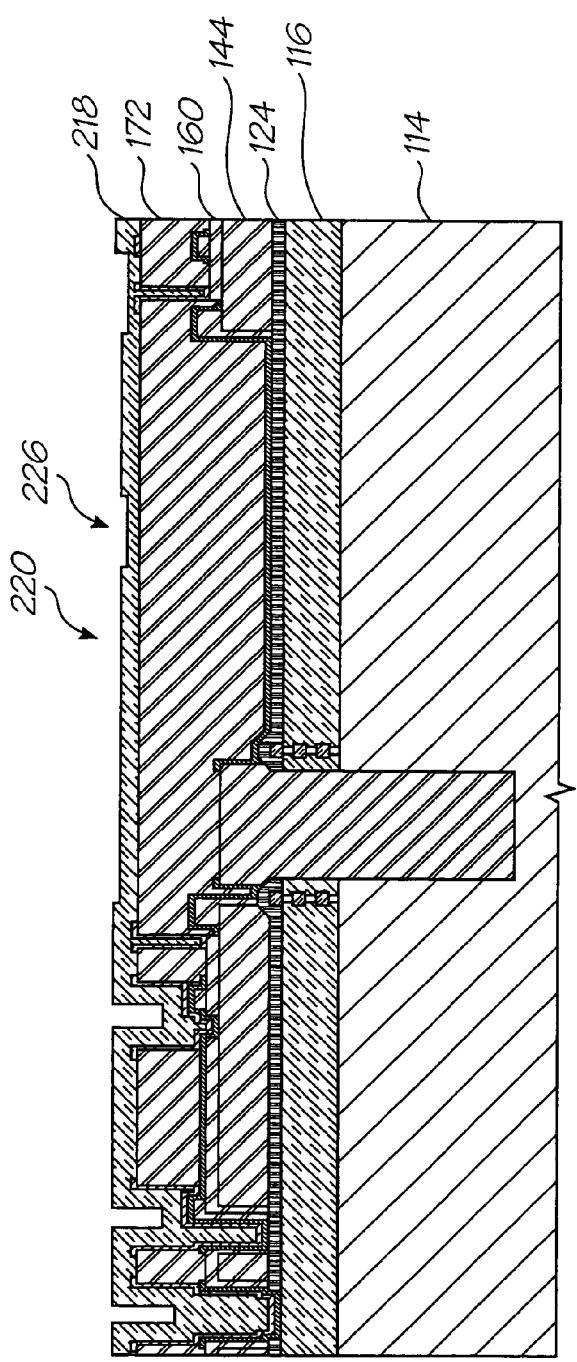
FIG. 42 shows a side sectioned view through B—B in FIG. 43 of the stage of FIG. 41.
Figure 43:
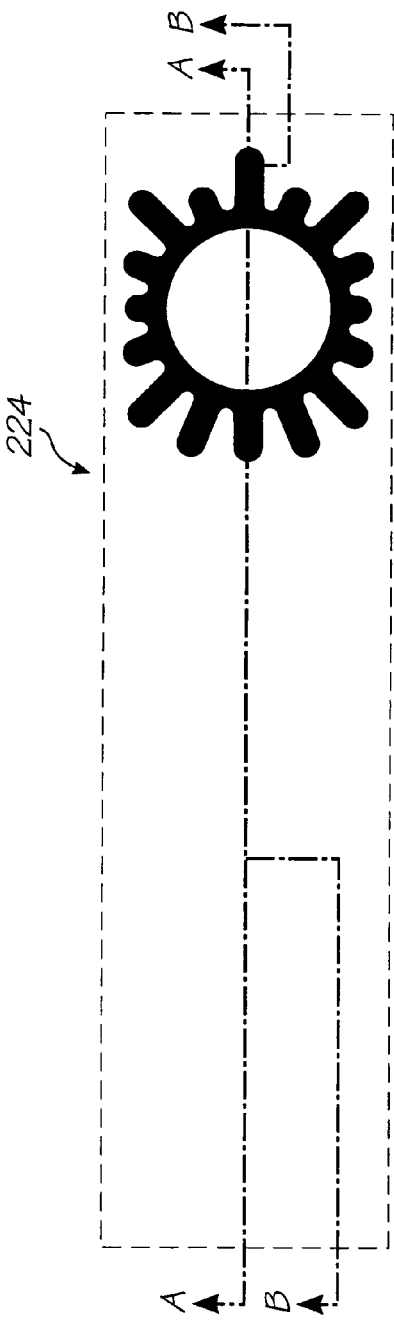
FIG. 43 shows a mask used in the selective etching of the dielectric layer.

In FIGS. 41 to 43, reference numeral 220 generally indicates the structure 216 with a nozzle rim 222 etched into the layer 218. With reference to the preceding figures, like reference numerals refer to like parts, unless otherwise specified.

In this step, approximately 1 micron of resist material is spun on to the structure 216. A mask 224 in FIG. 43 is used together with a photolithographic process to form an image of the nozzle rim 222 on the resist material.

The photolithographic process is a 1.0 micron stepper process or better. Further, the mask bias is +0.2 microns and the alignment is +/−0.25 microns.

The resist material is developed and undergoes a soft bake process. The resist material is a positive resist material and it follows that the resultant image can be easily deduced from the mask 224.

The layer 218 of silicon nitride is then etched to a depth of 0.6 micron +/−0.2 micron so that a recess 226 to be positioned about the nozzle rim 212 is formed.

It will be appreciated that this process is an initial stage in the formation of the roof member 74 as described earlier.

The resist material is wet or dry stripped.

Figure 44:
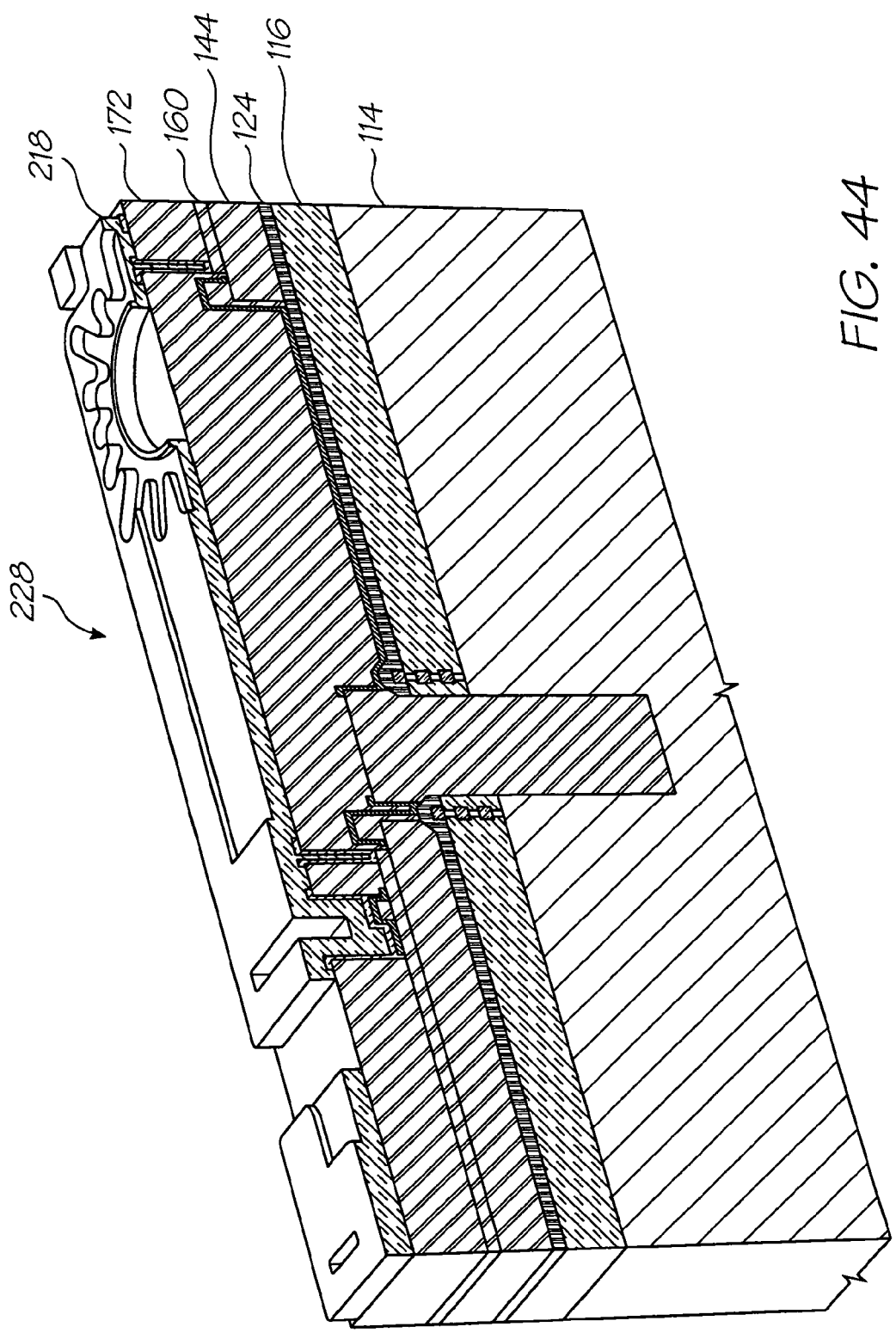
FIG. 44 shows a three-dimensional sectioned view through A—A in FIG. 46 of the stage of FIG. 41 after a further selective etching of the dielectric layer.
Figure 45:
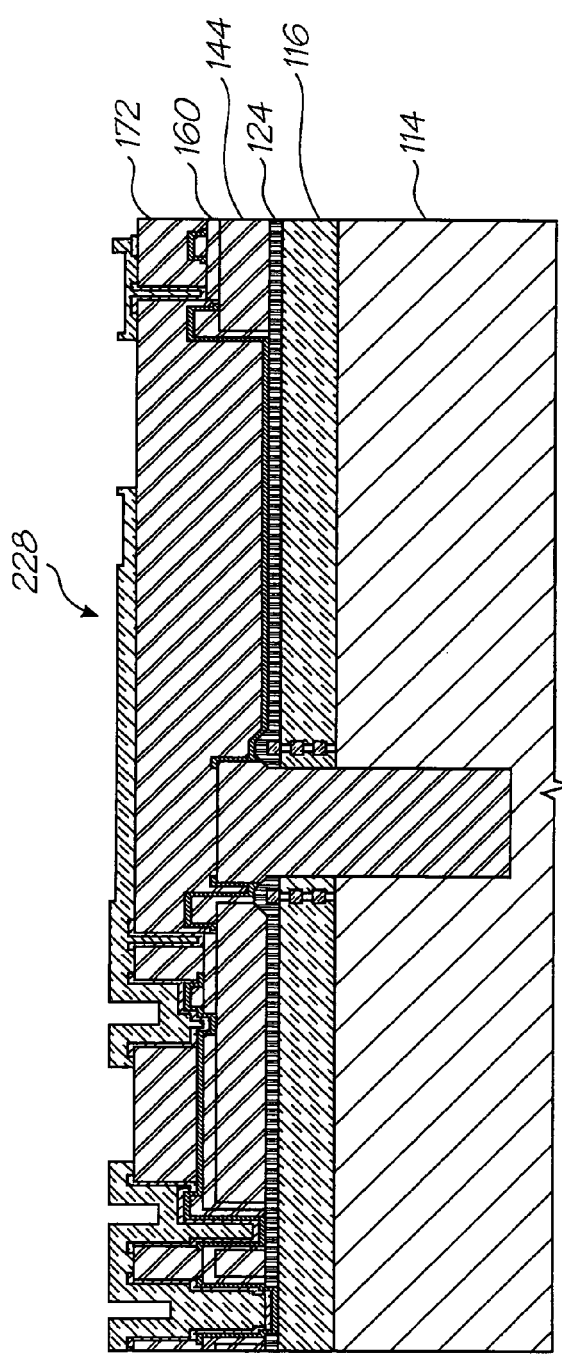
FIG. 45 shows a side sectioned view through B—B in FIG. 46.
Figure 46:
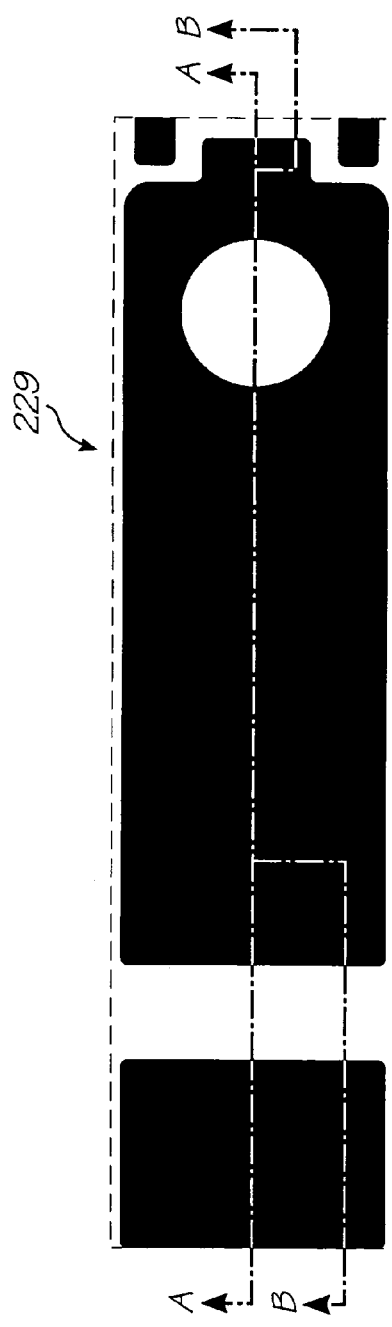
FIG. 46 shows a mask used for the further selective etching of the dielectric layer.

In FIGS. 44 to 46, reference numeral 228 generally indicates the structure 220 subsequent to the layer 218 of silicon nitride being subjected to a further etching process. With reference to the preceding figures, like reference numerals refer to like parts, unless otherwise specified.

At this stage, approximately 1.0 micron of resist material is spun onto the structure 220. A mask 229 shown in FIG. 46 is used together with a photolithographic process to form an image on the layer 218.

The resist material is a positive resist material. It follows that the image can easily be deduced from the mask 229.

The photolithographic process is a 0.5 micron stepper process or better. Further, the mask bias is +0.2 micron and the alignment is +/−0.15 micron.

The image is then developed and undergoes a soft bake process. Subsequently, a timed etch of the silicon nitride takes place to a nominal depth of approximately 1.5 microns.

The result of this process is clearly indicated in FIGS. 44 and 45. As can be seen, this process results in the sandwiching effect created with the anchor portions 32 of the thermal actuator 30, as described earlier in the specification. Furthermore, the silicon nitride of the mounting formation 94 is formed. Still further, this process results in the formation of the roof member 74 and the extended portion 104 of the roof structure 72. Still further, development of the image results in the creation of the ink ejection port 88.

It is to be noted that alignment with the previous etch is important.

At this stage, it is not necessary to strip the resist material.

Figure 47:
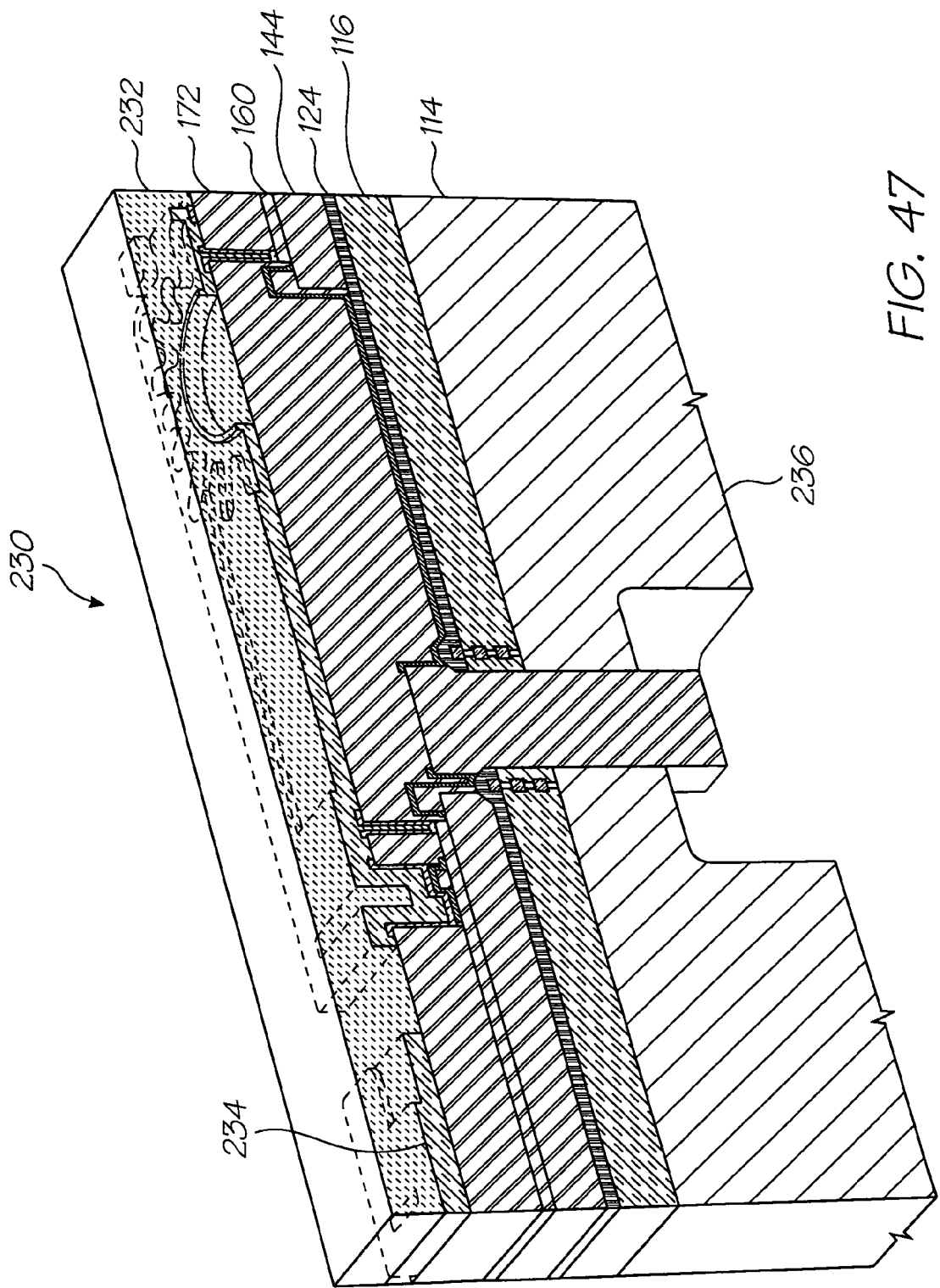
FIG. 47 shows a three-dimensional sectioned view through A—A in FIG. 49 of the stage of FIG. 44 with a resist layer deposited on the dielectric layer and subsequent to a preliminary back etching of the wafer substrate.
Figure 48:
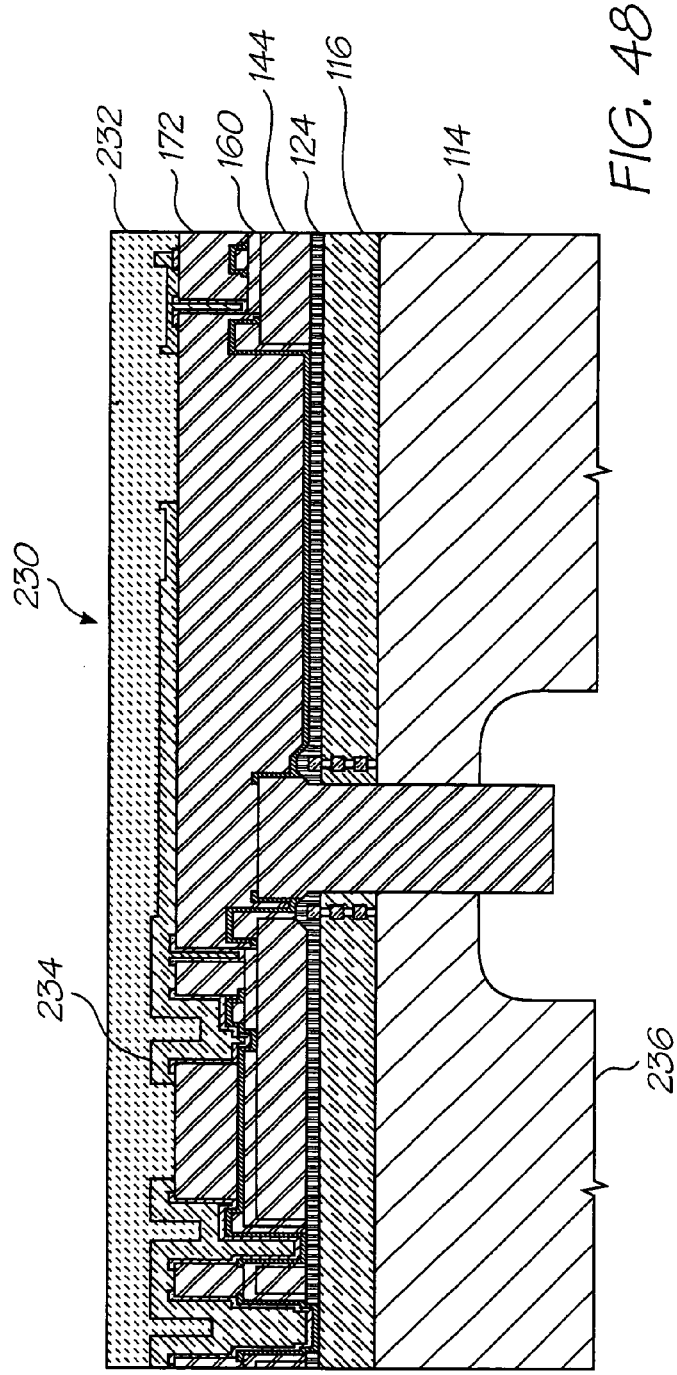
FIG. 48 shows a side sectioned view taken through B—B in FIG. 49 of the stage of FIG. 47.
Figure 49:
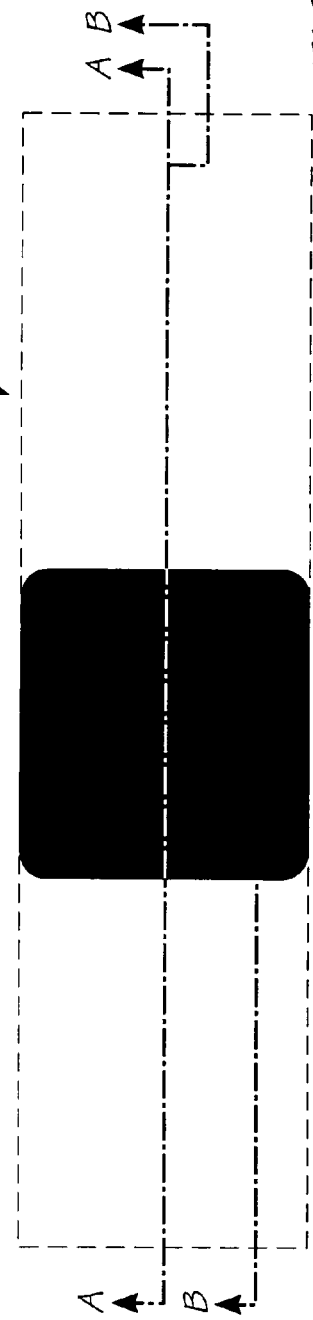
FIG. 49 shows a mask used for the preliminary back etching of the wafer substrate.

In FIGS. 47 to 49, reference numeral 230 generally indicates the stage of FIG. 44 in which the wafer substrate 114 is thinned and subjected to a back etching process.

During this step, 5 microns (+/−2 microns) of resist 232 are spun on to a front side 234 of the structure of FIG. 44. This serves to protect the front side 234 during a subsequent grinding operation.

A back side 236 of the CMOS wafer substrate 114 is then coarsely ground until the wafer 114 reaches a thickness of approximately 260 microns. The back side 236 is then finely ground until the wafer 114 reaches a thickness of approximately 220 microns. The depth of the grinding operations depends on the original thickness of the wafer 114.

After the grinding operations, the back side 236 is subjected to a plasma thinning process that serves to thin the wafer 114 further to approximately 200 microns. An apparatus referred to as a Tru-Sce TE-200INT or equivalent can carry out the plasma thinning process.

The plasma thinning serves to remove any damaged regions on the back side 236 of the wafer 114 that may have been caused by the grinding operations. The resultant smooth finish serves to improve the strength of the printhead chip 12 by inhibiting breakage due to crack propagation.

At this stage, approximately 4 microns of resist material is spun on to the back side 236 of the wafer 114 after the thinning process.

A mask 238 shown in FIG. 49 is used to pattern the resist material. The mask bias is zero microns. A photolithographic process using a suitable backside mask aligner is then carried out on the back side 236 of the wafer 114. The alignment is +/−2 microns.

The resultant image is then developed and softbaked. A 190 micron, deep reactive ion etch (DRIE) is carried out on the back side 236. This is done using a suitable apparatus such as an Alcatel 601E or a Surface Technology Systems ASE or equivalent.

This etch creates side walls which are oriented at 90 degrees +/−0.5 degrees relative to the back side 236. This etch also serves to dice the wafer. Still further, this etch serves to expose the sacrificial material positioned in the ink inlet channel 22.

Figure 50:
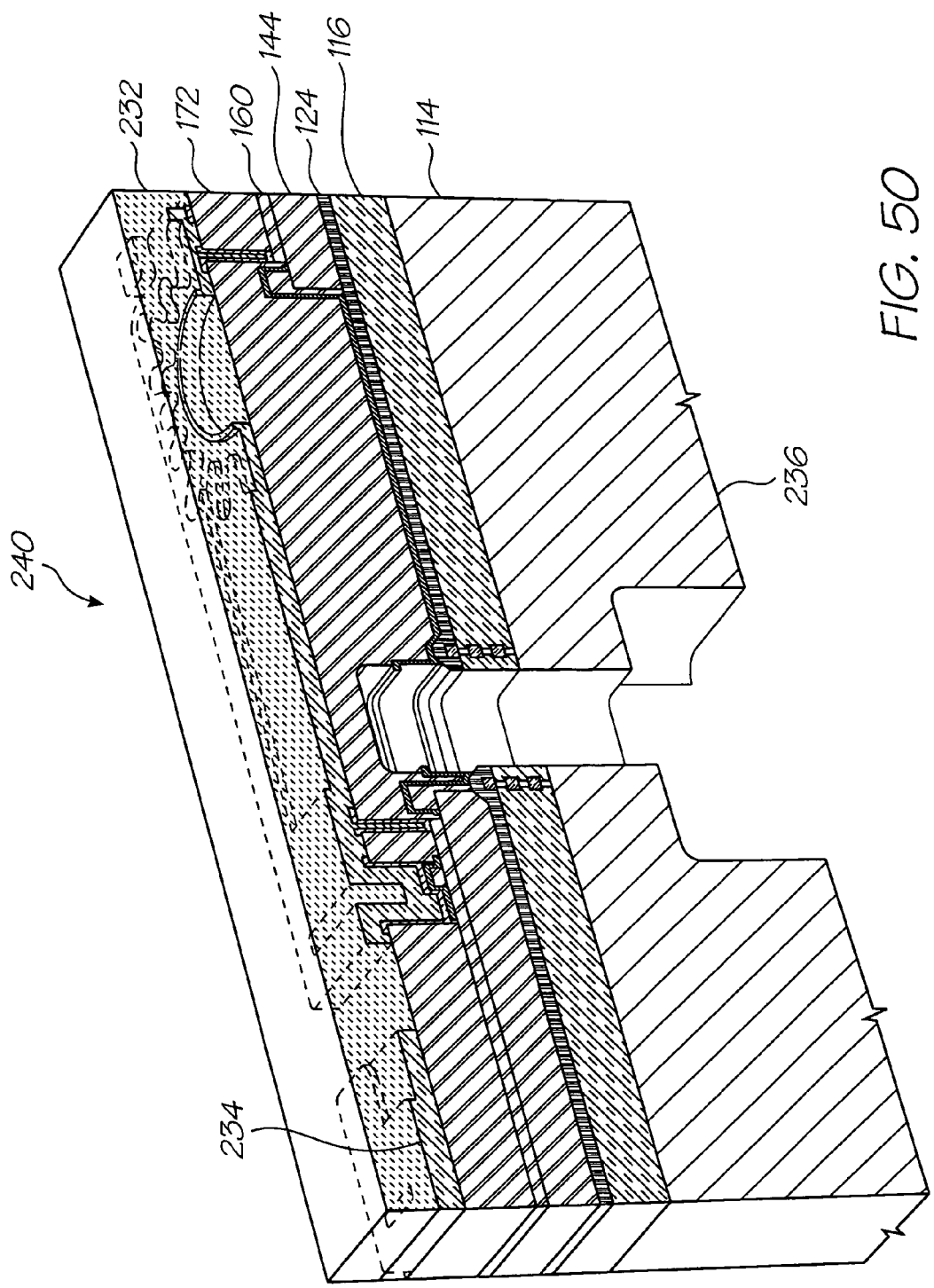
FIG. 50 shows a three-dimensional sectioned view of the stage of FIG. 48 subsequent to a secondary back etching of the material of the first sacrificial layer positioned in an inlet and nozzle chamber of the nozzle arrangement.
Figure 51:
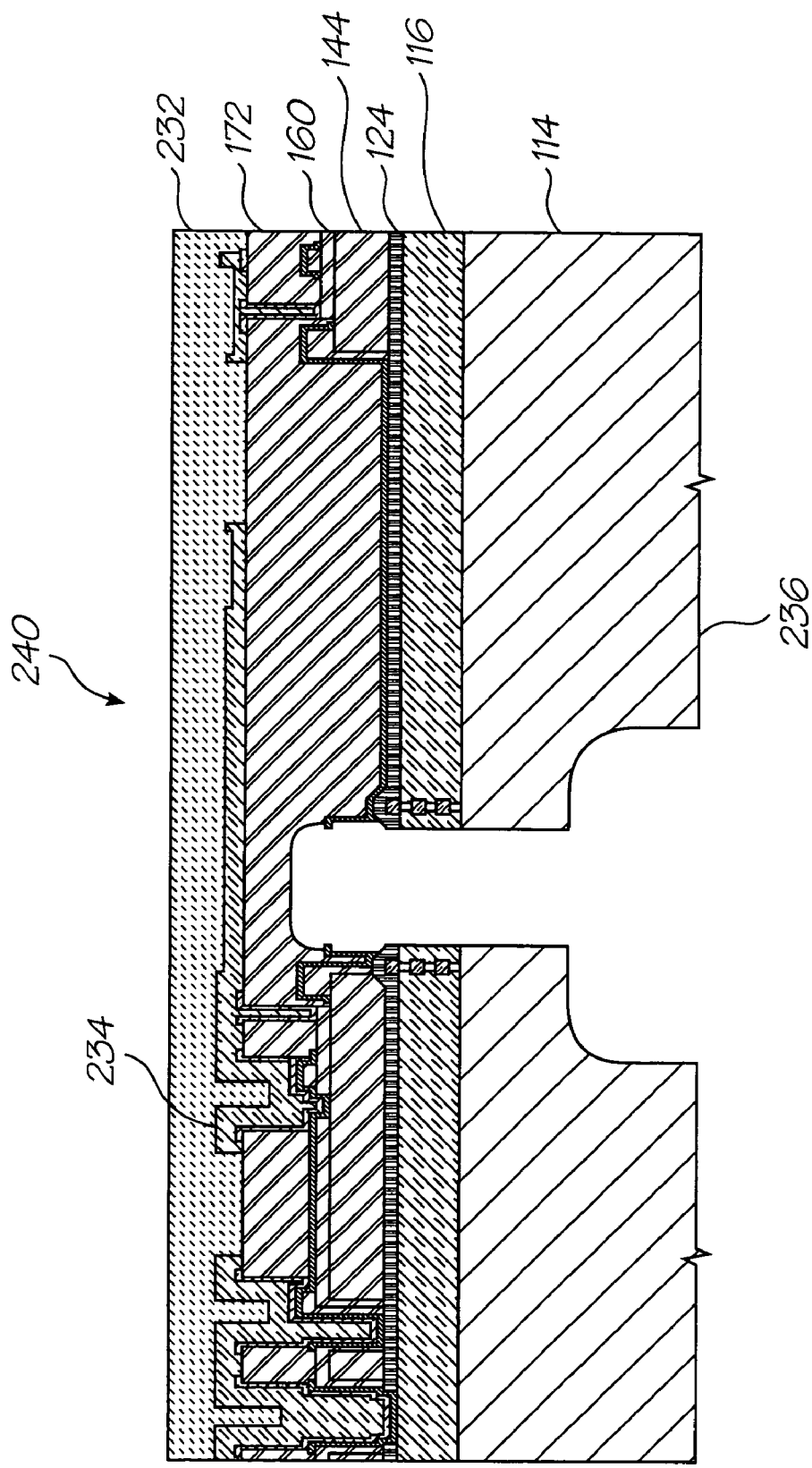
FIG. 51 shows a side sectioned view of the stage of FIG. 50.

In FIGS. 50 and 51, reference numeral 240 generally indicates the structure 230 subjected to an oxygen plasma etch from the back side 236.

In this step, an oxygen plasma etch is carried out to a depth of approximately 25 microns into the ink inlet channel 22 to clear the sacrificial material in the ink inlet channel 22 and a portion of the sacrificial material positioned in the nozzle chamber 75.

Etch depth is preferably 25 microns +/−10 microns. It should be noted that a substantial amount of over etch would not cause significant problems. The reason for this is that this will simply meet with a subsequent front side plasma etch.

Applicant recommends that the equipment for the oxygen plasma etch be a Tepla 300 Autoload PC or equivalent. This provides a substantially damage-free "soft" microwave plasma etch at a relatively slow rate being 100 to 140 nanometers per minute. However, this equipment is capable of etching 25 wafers at once in a relatively low cost piece of equipment.

The oxygen should be substantially pure. The temperature should not exceed 140 degrees Celsius due to a thermally bonded glass handle wafer. The time taken for this step is approximately 2.5 hours. The process rate is approximately 10 wafers per hour.

Figure 52:
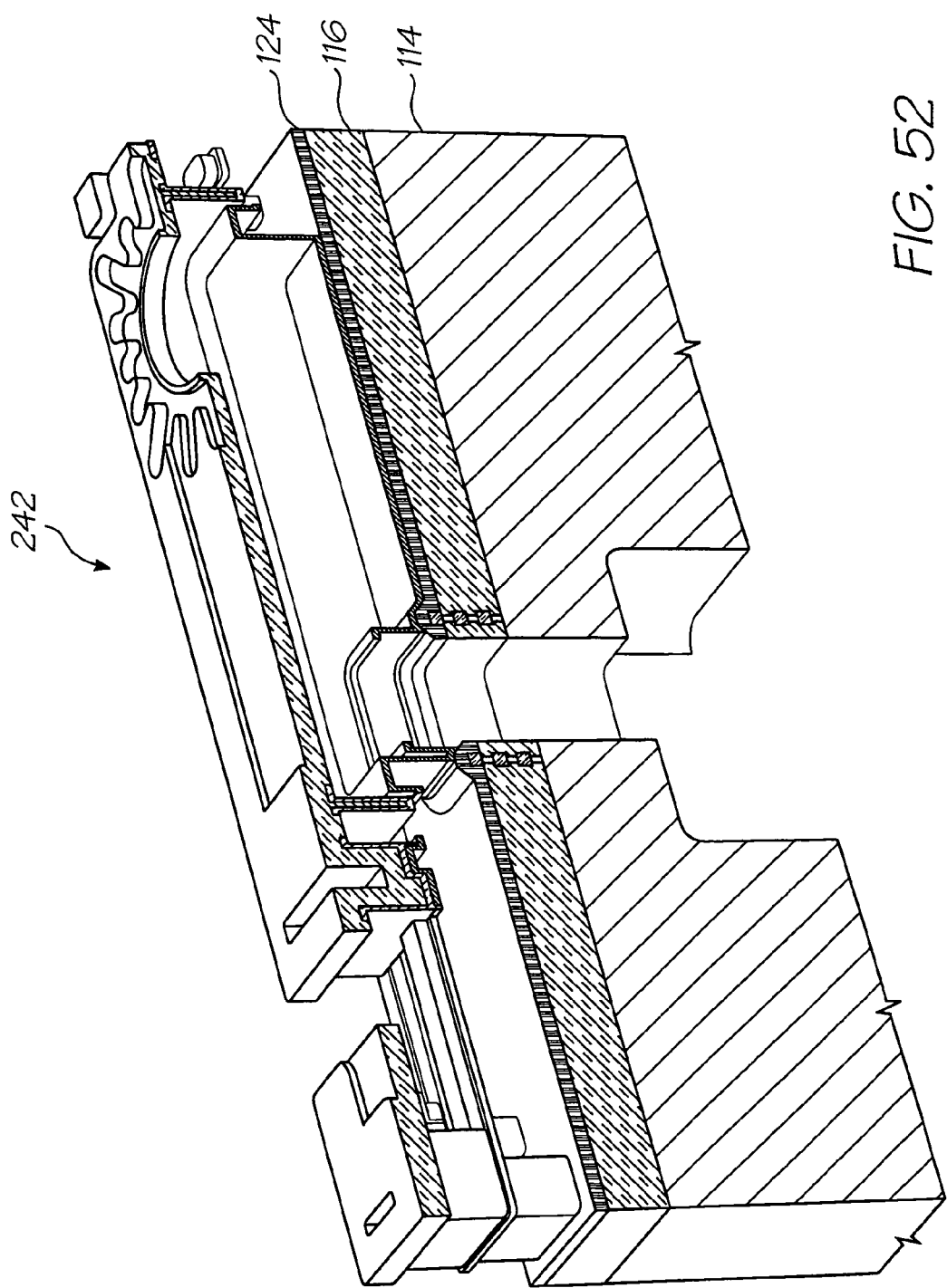
FIG. 52 shows a sectioned three-dimensional view of the stage of FIG. 50 with all the sacrificial material and resist material removed.
Figure 53:
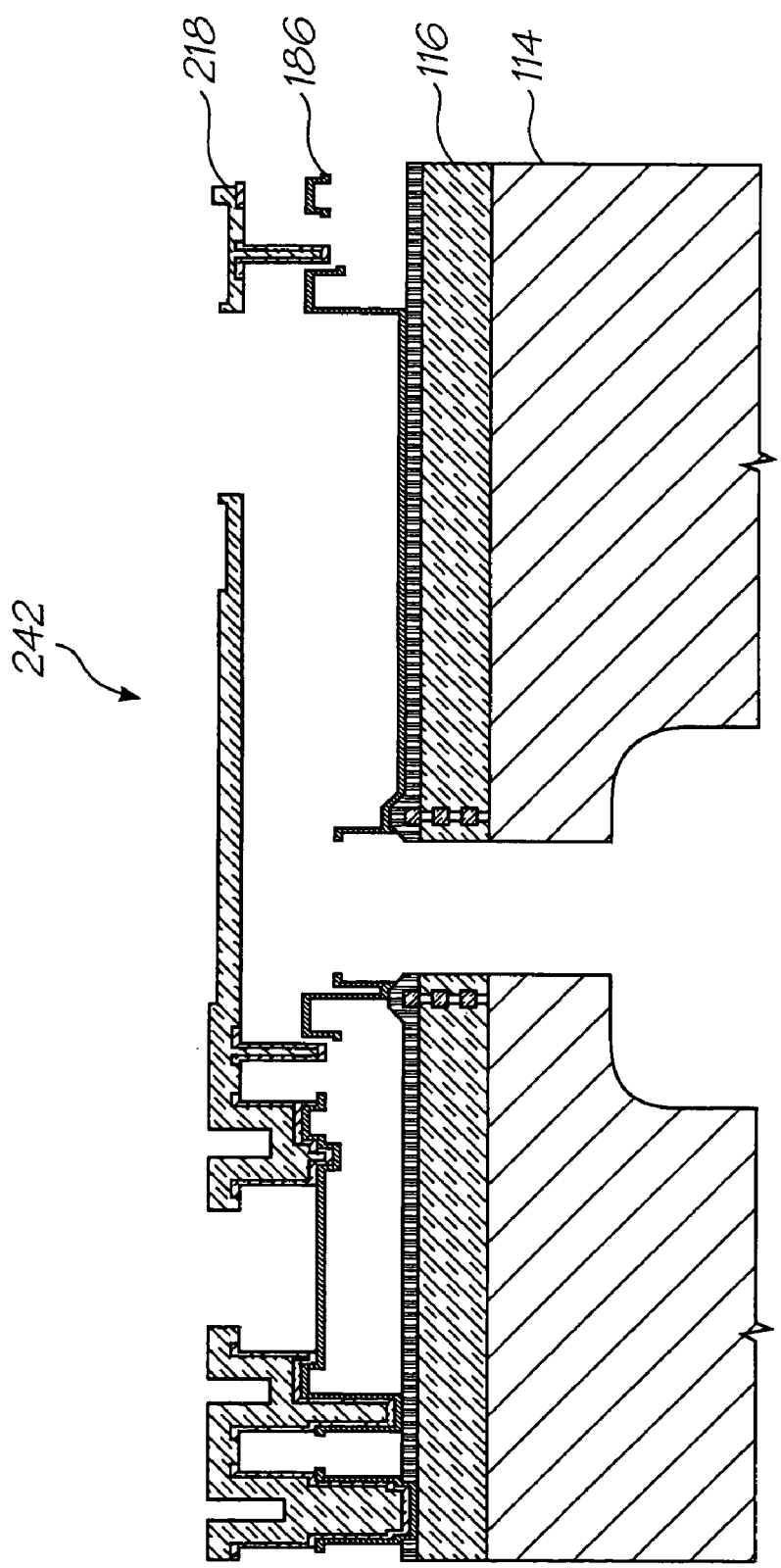
FIG. 53 shows a side sectioned view of the stage of FIG. 52.

In FIGS. 52 and 53, reference numeral 242 generally indicates the structure 240 subsequent to a front side oxygen plasma etch being carried out on the structure 240.

During this step, the structure 240 is subjected to an oxygen plasma etch from the front side 234 to a depth of 20 microns +/−5 microns. Substantial over etch is not a problem, since it simply meets with the previous etch from the back side 236. It should be noted that this etch releases the MEMS devices and so should be carried out just before guard wafer bonding steps to minimize contamination.

The Applicant recommends that an apparatus for this step be a Tepla 300 Autoload PC or equivalent. This provides a substantially damage-free "soft" microwave plasma etch at a relatively slow rate of between 100 and 140 nanometers per minute. The slow rate is countered by the fact that up to 25 wafers can be etched at once in a relatively low cost piece of equipment.

The oxygen should be substantially pure. The temperature should not exceed 160 degrees Celsius. The process takes about two hours and the process rate is approximately 12.5 wafers per hour.

During testing, the nozzle arrangement 10 was actuated with approximately 130 nanojoules for a duration of approximately 0.8 microseconds.

It should be noted that the test switch arrangement 100 does not quite close under normal operation. However, when the nozzle arrangement 10 is operated without ink or with a more energetic pulse, the test switch arrangement 100 closes.

It was found that the ejection of ink occurred approximately 4 microseconds after the start of an actuation pulse. Drop release is caused by the active return of the actuator to the quiescent position as the actuator cools rapidly.

Figure 54:
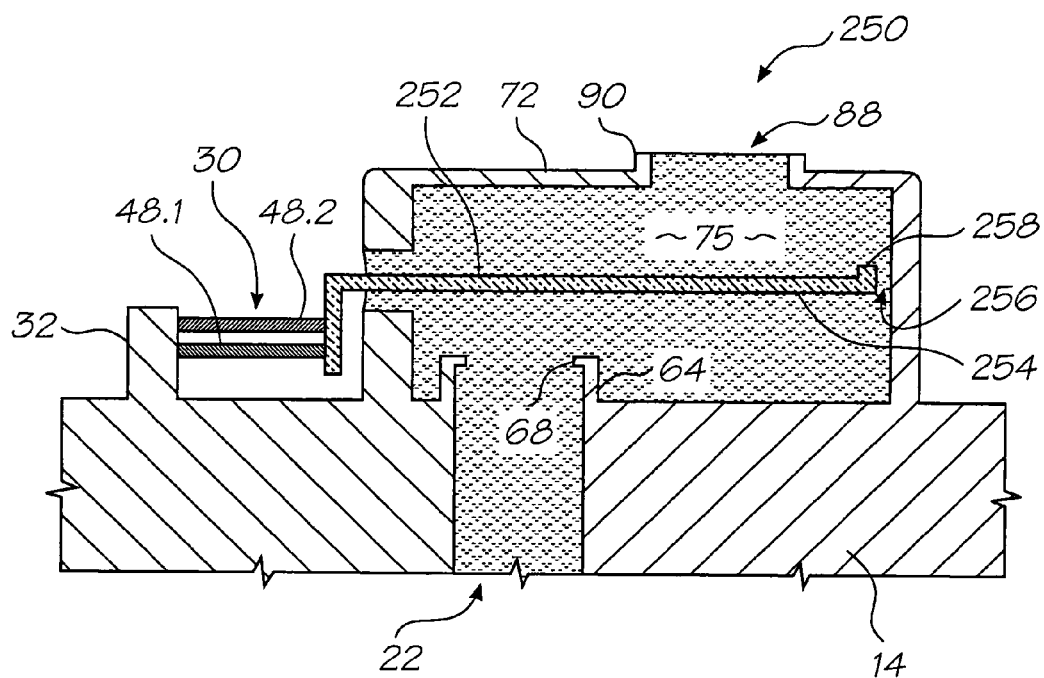
FIG. 54 shows a simplified side sectioned view of an alternative embodiment of a nozzle arrangement according to the invention, in a quiescent state.
Figure 55:
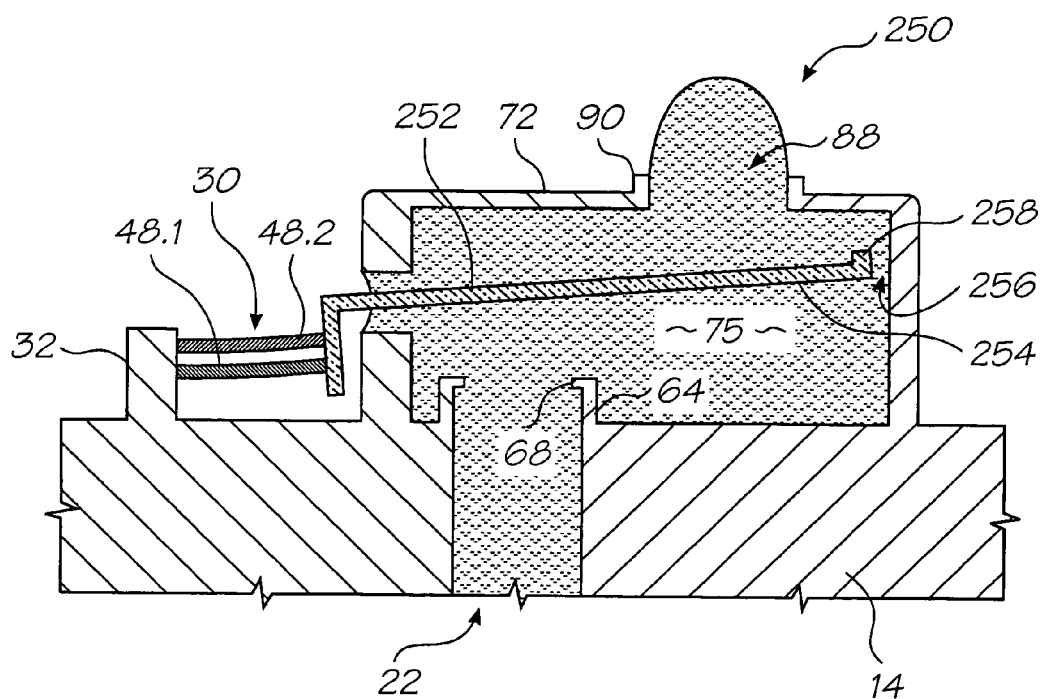
FIG. 55 shows a side sectioned view of the nozzle arrangement of FIG. 54, during actuation.

Turning to FIGS. 54 and 55, there is shown an alternative embodiment of the invention in which reference numerals used in other Figures are used to indicate like features. It will be appreciated that FIGS. 54 and 55 are schematic in nature, in order to illustrate the operation of the embodiment in its simplest form, and are not intended to represent actual structural details, including the specifics of construction type and materials choice. Those skilled in the art will be able to determine appropriate construction techniques and material choices by referring to the main embodiment and other construction techniques described in the cross-referenced documents.

The nozzle arrangement 250 of FIGS. 54 and 55 differs from the main embodiment in that the roof structure 72 is fixed in position relative to the substrate 14. The thermal actuator 30 is attached to a dynamic structure 252 that includes an operative end 254 that is enclosed within the nozzle chamber 75.

In operation, the operative end 254 of the dynamic structure 252 moves up (rather than down, as in the earlier-described embodiment) relative to the substrate 14, which causes an increase in fluid pressure in the region between the operative end 254 and the roof portion 72. Whilst there is a gap 256 between an edge 258 of the operative end 254 and the walls of the nozzle chamber 75, this is considerably smaller in area than the ink ejection port 88. Accordingly, whilst there is some back-leakage of ink past the operative end 254 through the gap 256 during actuation, considerably more ink is caused to bulge out of the ink ejection port 88, as shown in FIG. 55.

As drive current through the active portions 28.1 is stopped, the operative end 254 stops moving towards the roof portion, then begins to move back towards the quiescent position shown in FIG. 54. This causes a bulging, thinning, and breaking of the ink extending from the nozzle as shown in FIG. 5A, such that an ink droplet continues to move away from the ink ejection port 88.

Refill takes place in a similar way to that described in the main embodiment, and the nozzle arrangement is then ready to fire again.

Although the invention has been described with reference to a number of specific embodiments, it will be appreciated by those skilled in the art that the invention can be embodied in many other forms.

What is claimed is:

1. A nozzle arrangement for an inkjet printhead, the nozzle arrangement including:
   (a) a nozzle chamber for holding ink;
   (b) an actuator in fluid communication with the nozzle chamber, the actuator being moveable with respect to the nozzle chamber upon actuation by passing an electric current through a portion of the actuator to cause differential thermal expansion in the actuator;
   (c) a fluid ejection port in fluid communication with the nozzle chamber for allowing ejection of ink upon movement of an operative portion of the actuator relative to the nozzle chamber during actuation, the fluid ejection port defining an ejection axis generally perpendicular to a plane within which the fluid ejection port is disposed; and
   (d) an inlet channel in fluid communication with the nozzle chamber for supplying ink thereto from an ink supply;
      wherein the inlet channel is positioned for supplying ink to refill the nozzle chamber at a position radially displaced from the ejection axis.

2. A nozzle arrangement according to claim 1, wherein the inlet channel is orientated such that the ink enters the nozzle chamber along an inlet axis that is substantially parallel to, but displaced from, the ejection axis.

3. A nozzle arrangement according to claim 1, wherein the fluid ejection port is formed in a roof portion that at least partially defines the nozzle chamber, the nozzle arrangement being configured such that, upon actuation, an operative portion of the actuator is moved relative to the fluid ejection port, thereby causing the ink to be ejected from the fluid ejection port.

4. A nozzle arrangement according to claim 1, in which:
   at least part of the operative portion of the actuator defines a roof portion that at least partially defines the nozzle chamber; and
   the fluid ejection port is formed in the roof portion;
   wherein the nozzle arrangement is configured such that, upon actuation, the roof portion, and thereby the fluid ejection port, are moved relative to the nozzle chamber, thereby causing the ink to be ejected from the fluid ejection port.

5. A nozzle arrangement according to claim 1, configured such that, upon return of the actuator to a quiescent position after actuation and ejection of the ink through the fluid ejection port, the nozzle chamber is refilled with ink via the inlet channel.

6. A nozzle arrangement according to claim 5, wherein the nozzle chamber is refilled with ink from the inlet channel due to a reduction in pressure within the nozzle chamber caused by surface tension of a concave ink meniscus across the fluid ejection port after ink ejection.

7. A nozzle arrangement according to claim 1, wherein the actuator comprises at least one passive anchor and at least one active anchor, wherein the active anchor is resistively heatable by means of the electric current to cause thermal expansion relative to the passive anchor.

8. A nozzle arrangement according to claim 1, wherein the actuator is moveable within a plane upon actuation, the plane intersecting and being parallel with the ejection axis.

9. A nozzle arrangement according to claim 8, wherein the actuator is mounted to flex about an anchor point upon actuation.

10. A nozzle arrangement according to claim 9, wherein the inlet channel is located in a plane that is parallel to both the inlet channel axis and the ejection axis and which intersects both axes.

11. A nozzle arrangement according to claim 1, wherein the actuator is rotatably moved about a pivot region upon actuation and the inlet channel is disposed closer to the pivot region than to the ejection port.

12. A nozzle arrangement for an inkjet printhead, the nozzle arrangement including:
   (a) a nozzle chamber for holding ink;
   (b) an actuator in fluid communication with the nozzle chamber, the actuator being moveable with respect to the nozzle chamber upon actuation;
   (c) a fluid ejection port in fluid communication with the nozzle chamber for allowing ejection of ink upon movement of an operative portion of the actuator relative to the nozzle chamber during actuation, the fluid ejection port defining an ejection axis generally perpendicular to a plane within which the fluid ejection port is disposed;
   (d) an inlet channel in fluid communication with the nozzle chamber for supplying ink thereto from an ink supply; and
   (e) a raised rib formation disposed on a floor or wall of the nozzle chamber adjacent the inlet channel, for impeding backflow of ink during the actuation,
      wherein the inlet channel is positioned for supplying ink to refill the nozzle chamber at a position radially displaced from the ejection axis.

13. A nozzle arrangement according to claim 12, wherein the rib formation at least partially encircles the inlet channel.

14. A nozzle arrangement according to claim 13, wherein the rib formation comprises a collar that encircles the inlet channel.

15. A nozzle arrangement according to claim 14, wherein the rib formation comprises a radially inward-extending lip.

* * * * *